US011535520B1

(12) United States Patent
Chapman

(10) Patent No.: US 11,535,520 B1
(45) Date of Patent: *Dec. 27, 2022

(54) LEACHED SUPERABRASIVE ELEMENTS AND SYSTEMS, METHODS AND ASSEMBLIES FOR PROCESSING SUPERABRASIVE MATERIALS

(71) Applicant: US Synthetic Corporation, Orem, UT (US)

(72) Inventor: Mark Pehrson Chapman, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 116 days.

This patent is subject to a terminal disclaimer.

(21) Appl. No.: 16/909,838

(22) Filed: Jun. 23, 2020

Related U.S. Application Data

(63) Continuation of application No. 15/158,533, filed on May 18, 2016, now Pat. No. 10,723,626.

(Continued)

(51) Int. Cl.
  *C01B 32/26* (2017.01)
  *C25C 7/00* (2006.01)
  *C25C 1/00* (2006.01)

(52) U.S. Cl.
  CPC .............. *C01B 32/26* (2017.08); *C25C 1/00* (2013.01); *C25C 7/00* (2013.01)

(58) Field of Classification Search
  CPC .............. C25C 1/00; C25C 7/00; C01B 32/26
  See application file for complete search history.

(56) References Cited

U.S. PATENT DOCUMENTS

| 3,136,615 | A | ‡ | 6/1964 | Wentorf, Jr. | ............. | B24D 3/08 |
| | | | | | | 51/307 |
| 3,141,746 | A | ‡ | 7/1964 | De Lai | ..................... | B01J 3/065 |
| | | | | | | 51/309 |

(Continued)

FOREIGN PATENT DOCUMENTS

| EP | 0196777 | 10/1986 |
| EP | 0300699 | 1/1989 |

(Continued)

OTHER PUBLICATIONS

Nakamura, T. et al.; Study on th eHeat Deterioration Mechanism of Sintered Diamond; Program and Abstracts of the 27th High Pressure Conference of Japan; Oct. 13-15, 1986; Sapporo.

(Continued)

*Primary Examiner* — Pegah Parvini
*Assistant Examiner* — Ross J Christie
(74) *Attorney, Agent, or Firm* — PCFB LLC

(57) ABSTRACT

A method of processing a polycrystalline diamond body includes positioning an electrode near the polycrystalline diamond body such that a gap is defined between the electrode and the polycrystalline diamond body, the polycrystalline diamond body having a metallic material disposed in interstitial spaces defined within the polycrystalline diamond body. The method includes applying a voltage between the electrode and the polycrystalline diamond body, and passing a processing solution through the gap. The electrode is a cathode and the polycrystalline diamond body is an anode. An assembly for processing a polycrystalline diamond body includes the polycrystalline diamond body, an electrode positioned such that a gap is defined between the electrode and the polycrystalline diamond body, a processing solution passing through the gap such that the processing solution is in electrical communi- (Continued)

cation with each of the polycrystalline diamond body and the electrode, and at least one power source.

20 Claims, 32 Drawing Sheets

Related U.S. Application Data

(60) Provisional application No. 62/168,902, filed on May 31, 2015.

(56) References Cited

U.S. PATENT DOCUMENTS

| | | | | |
|---|---|---|---|---|
| 3,233,988 | A | ‡ | 2/1966 | Wentorf, Jr. ............ B24D 3/008 51/307 |
| 3,458,421 | A | ‡ | 7/1969 | Dahms ................ G01N 27/333 204/280 |
| 3,745,623 | A | ‡ | 7/1973 | Wentorf, Jr. ............ B23B 27/20 407/11 |
| 4,108,614 | A | ‡ | 8/1978 | Mitchell ................. B22F 7/06 51/295 |
| 4,151,686 | A | ‡ | 5/1979 | Lee ..................... B01J 3/062 264/33 |
| 4,224,380 | A | ‡ | 9/1980 | Bovenkerk ............. B01J 3/062 428/54 |
| 4,255,165 | A | ‡ | 3/1981 | Dennis ................. B01J 3/062 175/42 |
| 4,268,276 | A | ‡ | 5/1981 | Bovenkerk ............. B01J 3/062 175/42 |
| 4,288,248 | A | ‡ | 9/1981 | Bovenkerk ............. B01J 3/062 419/11 |
| 4,303,442 | A | ‡ | 12/1981 | Hara ................... B01J 3/062 419/10 |
| 4,311,490 | A | ‡ | 1/1982 | Bovenkerk ............. B01J 3/062 51/307 |
| 4,373,593 | A | ‡ | 2/1983 | Phaal .................. B23B 27/145 175/43 |
| 4,387,287 | A | ‡ | 6/1983 | Marazzi ................ B23H 9/00 219/69 |
| 4,410,054 | A | ‡ | 10/1983 | Nagel ................... E21B 4/003 175/10 |
| 4,412,980 | A | ‡ | 11/1983 | Tsuji ................... B01J 3/062 423/44 |
| 4,468,138 | A | ‡ | 8/1984 | Nagel ................... F16C 17/04 384/30 |
| 4,481,016 | A | ‡ | 11/1984 | Campbell ............... B21C 3/025 51/293 |
| 4,486,286 | A | ‡ | 12/1984 | Lewin .................. A61L 27/303 204/19 |
| 4,504,519 | A | ‡ | 3/1985 | Zelez ................... C03C 17/22 204/17 |
| 4,522,633 | A | ‡ | 6/1985 | Dyer .................... C09K 3/14 51/307 |
| 4,525,179 | A | ‡ | 6/1985 | Gigl .................... B01J 3/062 219/69 |
| 4,534,773 | A | ‡ | 8/1985 | Phaal .................. B01J 3/062 175/40 |
| 4,556,403 | A | ‡ | 12/1985 | Almond ................ B24D 3/14 51/308 |
| 4,560,014 | A | ‡ | 12/1985 | Geczy .................. E21B 4/00 175/10 |
| 4,570,726 | A | ‡ | 2/1986 | Hall ................... E21B 10/5735 175/42 |
| 4,572,722 | A | ‡ | 2/1986 | Dyer .................... B24D 3/10 51/309 |
| 4,604,106 | A | ‡ | 8/1986 | Hall ..................... B28D 1/121 51/293 |
| 4,605,343 | A | ‡ | 8/1986 | Hibbs, Jr. .............. B24D 99/00 125/39 |
| 4,606,738 | A | ‡ | 8/1986 | Hayden ................. F01D 9/042 51/295 |
| 4,621,031 | A | ‡ | 11/1986 | Scruggs ............... B23K 35/001 148/40 |
| 4,636,253 | A | ‡ | 1/1987 | Nakai .................. B01J 3/062 75/239 |
| 4,645,977 | A | ‡ | 2/1987 | Kurokawa ............. C23C 16/26 118/50 |
| 4,662,348 | A | ‡ | 5/1987 | Hall ..................... B24B 1/00 125/30 |
| 4,664,705 | A | ‡ | 5/1987 | Horton .................. B01J 3/062 264/12 |
| 4,670,025 | A | ‡ | 6/1987 | Pipkin ................... B24D 3/08 51/295 |
| 4,707,384 | A | ‡ | 11/1987 | Schachner ............ C23C 16/0272 427/24 |
| 4,726,718 | A | ‡ | 2/1988 | Meskin ................ E21B 10/5676 125/39 |
| 4,731,296 | A | ‡ | 3/1988 | Kikuchi ................. B22F 7/06 125/39 |
| 4,738,322 | A | ‡ | 4/1988 | Hall ..................... E21B 10/20 175/37 |
| 4,766,040 | A | ‡ | 8/1988 | Hillert .................. C22C 27/00 428/55 |
| 4,776,861 | A | ‡ | 10/1988 | Frushour ................ B24D 3/00 51/293 |
| 4,784,023 | A | ‡ | 11/1988 | Dennis .................. B22F 7/06 175/42 |
| 4,792,001 | A | ‡ | 12/1988 | Zijsling ............... E21B 10/5673 175/43 |
| 4,793,828 | A | ‡ | 12/1988 | Burnand ................ B01J 3/062 51/293 |
| 4,797,241 | A | ‡ | 1/1989 | Peterson ................ B01J 3/062 264/12 |
| 4,802,539 | A | ‡ | 2/1989 | Hall ..................... E21B 10/20 175/37 |
| 4,807,402 | A | ‡ | 2/1989 | Rai ...................... B24D 3/00 51/293 |
| 4,811,801 | A | ‡ | 3/1989 | Salesky ................. E21B 10/56 175/43 |
| 4,828,582 | A | ‡ | 5/1989 | Frushour ................ B24D 3/00 51/293 |
| 4,844,185 | A | ‡ | 7/1989 | Newton, Jr. ............ E21B 10/43 175/43 |
| 4,854,405 | A | ‡ | 8/1989 | Stroud .................. E21B 10/52 175/37 |
| 4,861,350 | A | ‡ | 8/1989 | Phaal ................... B23P 15/28 51/307 |
| 4,871,377 | A | ‡ | 10/1989 | Frushour ............... B24D 3/007 51/309 |
| 4,899,922 | A | ‡ | 2/1990 | Slutz ................... B23K 35/322 228/12 |
| 4,913,247 | A | ‡ | 4/1990 | Jones ................... E21B 10/54 175/43 |
| 4,919,220 | A | ‡ | 4/1990 | Fuller .................. E21B 10/567 175/43 |
| 4,940,180 | A | ‡ | 7/1990 | Martell ................. B24D 3/10 228/12 |
| 4,943,488 | A | ‡ | 7/1990 | Sung .................... B22F 7/06 125/30 |
| 4,944,772 | A | ‡ | 7/1990 | Cho ..................... B24D 3/06 51/293 |
| 4,976,324 | A | ‡ | 12/1990 | Tibbitts ............... E21B 10/5673 175/42 |
| 5,011,514 | A | ‡ | 4/1991 | Cho ..................... B24D 3/08 51/295 |
| 5,016,718 | A | ‡ | 5/1991 | Tandberg ............... E21B 10/04 175/33 |
| 5,027,912 | A | ‡ | 7/1991 | Juergens ............. E21B 10/5676 175/42 |
| 5,030,276 | A | ‡ | 7/1991 | Sung .................... B22F 7/06 175/43 |
| 5,092,687 | A | ‡ | 3/1992 | Hall ..................... E21B 4/003 384/30 |
| 5,096,465 | A | ‡ | 3/1992 | Chen ................... B23B 27/148 51/293 |
| 5,116,568 | A | | 5/1992 | Sung et al. |

(56) References Cited

U.S. PATENT DOCUMENTS

| | | | | |
|---|---|---|---|---|
| 5,120,327 A ‡ | 6/1992 | Dennis | ...................... | B22F 7/06 407/11 |
| 5,127,923 A ‡ | 7/1992 | Bunting | ................. | B24D 3/007 51/293 |
| 5,135,061 A ‡ | 8/1992 | Newton, Jr. | .......... | B23B 27/148 175/42 |
| 5,154,245 A ‡ | 10/1992 | Waldenstrom | ...... | E21B 10/5676 175/42 |
| 5,176,720 A ‡ | 1/1993 | Martell | ...................... | B22F 7/06 51/293 |
| 5,186,725 A ‡ | 2/1993 | Martell | ................ | C09K 3/1418 51/293 |
| 5,199,832 A ‡ | 4/1993 | Meskin | ................ | E21B 10/5676 175/37 |
| 5,205,684 A ‡ | 4/1993 | Meskin | ................ | E21B 10/5676 175/37 |
| 5,213,248 A ‡ | 5/1993 | Horton | ................. | B23K 20/025 228/44 |
| 5,238,074 A ‡ | 8/1993 | Tibbitts | ................... | E21B 10/46 175/42 |
| 5,264,283 A ‡ | 11/1993 | Waldenstrom | ...... | E21B 10/5676 428/40 |
| 5,337,844 A ‡ | 8/1994 | Tibbitts | ................. | E21B 10/567 175/43 |
| 5,355,969 A ‡ | 10/1994 | Hardy | ................... | B23B 27/146 175/43 |
| 5,364,192 A ‡ | 11/1994 | Damm | ................... | F16C 33/043 384/42 |
| 5,368,398 A ‡ | 11/1994 | Damm | ................... | F16C 33/043 384/30 |
| 5,370,195 A ‡ | 12/1994 | Keshavan | ............ | E21B 10/5673 175/42 |
| 5,379,853 A ‡ | 1/1995 | Lockwood | .......... | E21B 10/5673 175/42 |
| 5,399,247 A * | 3/1995 | Carey | ................. | C02F 1/46109 205/688 |
| 5,439,492 A ‡ | 8/1995 | Anthony | ................. | C23C 16/01 51/295 |
| 5,447,208 A ‡ | 9/1995 | Lund | ....................... | B24B 53/02 175/42 |
| 5,460,233 A ‡ | 10/1995 | Meany | ................ | E21B 10/5673 175/42 |
| 5,464,068 A ‡ | 11/1995 | Najafi-Sani | ........... | E21B 10/445 175/37 |
| 5,468,268 A ‡ | 11/1995 | Tank | ....................... | C22C 26/00 51/293 |
| 5,480,233 A ‡ | 1/1996 | Cunningham | .......... | E21B 4/003 384/30 |
| 5,496,638 A ‡ | 3/1996 | Waldenstrom | ...... | C23C 14/5806 428/40 |
| 5,496,639 A ‡ | 3/1996 | Connell | ............... | H01Q 15/141 343/89 |
| 5,505,748 A ‡ | 4/1996 | Tank | ........................ | B01J 3/062 51/293 |
| 5,510,193 A ‡ | 4/1996 | Cerutti | ..................... | B01J 3/062 428/55 |
| 5,523,121 A ‡ | 6/1996 | Anthony | ................ | C23C 16/01 427/24 |
| 5,524,719 A ‡ | 6/1996 | Dennis | ...................... | B22F 7/06 175/43 |
| 5,544,713 A ‡ | 8/1996 | Dennis | ................ | E21B 10/5673 175/42 |
| 5,560,716 A ‡ | 10/1996 | Tank | ........................ | E21B 4/003 384/49 |
| 5,607,024 A ‡ | 3/1997 | Keith | ...................... | E21B 10/43 175/43 |
| 5,620,302 A ‡ | 4/1997 | Garrison | ................ | F01D 25/32 415/16 |
| 5,620,382 A ‡ | 4/1997 | Cho | ....................... | A63B 53/04 473/33 |
| 5,624,068 A ‡ | 4/1997 | Waldenstrom | .......... | B23P 15/28 228/26 |
| 5,645,617 A ‡ | 7/1997 | Frushour | ................... | B22F 7/06 125/39 |
| 5,653,300 A ‡ | 8/1997 | Lund | ................... | E21B 10/5673 175/42 |
| 5,667,028 A ‡ | 9/1997 | Truax | ..................... | B23P 15/28 175/42 |
| 5,718,948 A ‡ | 2/1998 | Ederyd | ................. | C23C 16/271 427/24 |
| 5,722,497 A ‡ | 3/1998 | Gum | ....................... | E21B 10/16 175/37 |
| 5,722,499 A ‡ | 3/1998 | Nguyen | ................. | E21B 10/567 175/43 |
| 5,759,216 A | 6/1998 | Kanada et al. | | |
| 5,759,219 A ‡ | 6/1998 | Rink | ................... | B01D 39/2027 280/73 |
| 5,776,615 A ‡ | 7/1998 | Wong | ................. | C23C 14/0021 428/21 |
| 5,833,021 A ‡ | 11/1998 | Mensa-Wilmot | ....... | E21B 10/55 175/43 |
| 5,875,862 A ‡ | 3/1999 | Jurewicz | ............. | E21B 10/5735 175/43 |
| 5,897,942 A ‡ | 4/1999 | Karner | ............... | C23C 16/0272 407/11 |
| 5,944,129 A ‡ | 8/1999 | Jensen | ................ | E21B 10/5673 175/43 |
| 5,954,147 A ‡ | 9/1999 | Overstreet | ............ | E21B 10/567 175/37 |
| 5,967,250 A ‡ | 10/1999 | Lund | .................... | E21B 10/567 175/42 |
| 5,979,578 A ‡ | 11/1999 | Packer | .................. | E21B 10/567 175/43 |
| 6,009,963 A ‡ | 1/2000 | Chaves | ................ | E21B 10/5676 175/43 |
| 6,063,333 A ‡ | 5/2000 | Dennis | .................... | B22F 3/105 419/6 |
| 6,123,612 A ‡ | 9/2000 | Goers | ................... | B24B 53/017 451/54 |
| 6,126,741 A ‡ | 10/2000 | Jones | ...................... | C30B 29/04 117/7 |
| 6,145,608 A ‡ | 11/2000 | Lund | ...................... | B23B 27/145 175/42 |
| 6,193,001 B1‡ | 2/2001 | Eyre | ..................... | E21B 10/5735 175/42 |
| 6,234,261 B1‡ | 5/2001 | Evans | ..................... | E21B 10/46 156/15 |
| 6,248,447 B1‡ | 6/2001 | Griffin | ................... | C04B 37/021 175/43 |
| 6,269,894 B1‡ | 8/2001 | Griffin | ................... | E21B 10/567 175/43 |
| 6,290,726 B1‡ | 9/2001 | Pope | ....................... | A61L 27/08 623/22 |
| 6,315,065 B1‡ | 11/2001 | Yong | .................... | E21B 10/573 175/42 |
| 6,332,503 B1‡ | 12/2001 | Pessier | .................... | E21B 10/16 175/33 |
| 6,344,149 B1‡ | 2/2002 | Oles | ..................... | C04B 41/5338 216/10 |
| 6,367,568 B2‡ | 4/2002 | Steinke | .................... | E21B 10/16 175/33 |
| 6,410,085 B1‡ | 6/2002 | Griffin | ...................... | B22F 7/06 427/24 |
| 6,435,058 B1‡ | 8/2002 | Matthias | ................... | B22F 7/06 76/108 |
| 6,481,511 B2‡ | 11/2002 | Matthias | ................... | B22F 7/06 175/43 |
| 6,528,159 B1‡ | 3/2003 | Kanada | ................. | C04B 41/009 427/30 |
| 6,544,308 B2‡ | 4/2003 | Griffin | ................... | C04B 37/021 428/40 |
| 6,550,556 B2‡ | 4/2003 | Middlemiss | ............ | B23C 5/202 175/43 |
| 6,562,462 B2‡ | 5/2003 | Griffin | ................. | C04B 37/021 428/21 |
| 6,585,064 B2‡ | 7/2003 | Griffin | ................. | C04B 37/021 175/32 |

(56) References Cited

U.S. PATENT DOCUMENTS

| | | | | |
|---|---|---|---|---|
| 6,589,640 B2 ‡ | 7/2003 | Griffin | C04B 37/021 | 428/21 |
| 6,592,985 B2 ‡ | 7/2003 | Griffin | C04B 37/021 | 428/21 |
| 6,601,662 B2 ‡ | 8/2003 | Matthias | B22F 7/06 | 175/37 |
| 6,739,214 B2 ‡ | 5/2004 | Griffin | C04B 37/021 | 428/21 |
| 6,749,033 B2 ‡ | 6/2004 | Griffin | C04B 37/021 | 175/42 |
| 6,793,681 B1 ‡ | 9/2004 | Pope | A61F 2/30767 | 623/22 |
| 6,797,326 B2 ‡ | 9/2004 | Griffin | C04B 37/021 | 216/10 |
| 6,861,098 B2 ‡ | 3/2005 | Griffin | E21B 10/567 | 216/10 |
| 6,878,447 B2 ‡ | 4/2005 | Griffin | C04B 37/021 | 428/21 |
| 6,892,836 B1 ‡ | 5/2005 | Eyre | E21B 10/5735 | 175/42 |
| 6,904,984 B1 ‡ | 6/2005 | Estes | E21B 10/5673 | 175/43 |
| 6,935,444 B2 ‡ | 8/2005 | Lund | E21B 10/567 | 175/42 |
| 6,962,214 B2 ‡ | 11/2005 | Hughes | C04B 41/53 | 175/10 |
| 6,991,049 B2 ‡ | 1/2006 | Eyre | E21B 10/5735 | 175/43 |
| 7,350,601 B2 ‡ | 4/2008 | Belnap | B22F 7/06 | 175/37 |
| 7,377,341 B2 ‡ | 5/2008 | Middlemiss | B22F 7/062 | 175/37 |
| 7,493,973 B2 ‡ | 2/2009 | Keshavan | B24D 3/10 | 175/43 |
| 7,506,698 B2 ‡ | 3/2009 | Eyre | E21B 10/006 | 175/42 |
| 7,517,589 B2 ‡ | 4/2009 | Eyre | C22C 26/00 | 407/11 |
| 7,568,534 B2 ‡ | 8/2009 | Griffin | E21B 10/567 | 175/43 |
| 7,608,333 B2 ‡ | 10/2009 | Eyre | C22C 26/00 | 428/40 |
| 77,608,333 | 10/2009 | Eyre | | |
| 7,730,977 B2 ‡ | 6/2010 | Achilles | B23B 27/148 | 175/43 |
| 7,740,673 B2 ‡ | 6/2010 | Eyre | C22C 26/00 | 51/309 |
| 7,754,333 B2 ‡ | 7/2010 | Eyre | C22C 26/00 | 428/40 |
| 7,757,785 B2 ‡ | 7/2010 | Zhang | E21B 10/55 | 175/57 |
| 7,757,791 B2 ‡ | 7/2010 | Belnap | B22F 7/06 | 175/43 |
| 7,866,418 B2 ‡ | 1/2011 | Bertagnolli | F16C 33/26 | 175/42 |
| 7,972,395 B1 ‡ | 7/2011 | Dadson | B24D 99/005 | 51/293 |
| 8,020,642 B2 ‡ | 9/2011 | Lancaster | E21B 10/46 | 175/43 |
| 8,147,572 B2 ‡ | 4/2012 | Eyre | E21B 10/567 | 51/307 |
| 8,172,012 B2 ‡ | 5/2012 | Achilles | C23C 30/005 | 175/43 |
| 8,297,382 B2 ‡ | 10/2012 | Bertagnolli | E21B 10/567 | 175/42 |
| 8,309,050 B2 ‡ | 11/2012 | Keshavan | E21B 10/55 | 423/44 |
| 8,323,367 B1 ‡ | 12/2012 | Bertagnolli | B24D 3/007 | 51/307 |
| 8,328,891 B2 ‡ | 12/2012 | Zhang | C22C 26/00 | 51/293 |
| 8,469,121 B2 ‡ | 6/2013 | Lancaster | B24D 99/005 | 175/43 |
| 8,596,387 B1 ‡ | 12/2013 | Sani | C22C 26/00 | 175/43 |
| 8,951,317 B1 ‡ | 2/2015 | Mukhopadhyay | E21B 10/46 | 51/295 |
| 9,352,450 B1 * | 5/2016 | Vail | B08B 7/0021 | |
| 2005/0115744 A1 ‡ | 6/2005 | Griffin | E21B 10/567 | 175/43 |
| 2005/0129950 A1 ‡ | 6/2005 | Griffin | C04B 37/021 | 428/40 |
| 2005/0139397 A1 ‡ | 6/2005 | Achilles | B22F 7/02 | 175/43 |
| 2005/0230156 A1 ‡ | 10/2005 | Belnap | C22C 1/058 | 175/37 |
| 2005/0263328 A1 ‡ | 12/2005 | Middlemiss | B22F 7/06 | 175/43 |
| 2006/0060390 A1 ‡ | 3/2006 | Eyre | B24D 3/10 | 175/43 |
| 2006/0060391 A1 ‡ | 3/2006 | Eyre | E21B 10/567 | 175/43 |
| 2006/0086540 A1 ‡ | 4/2006 | Griffin | E21B 10/567 | 175/42 |
| 2006/0162969 A1 ‡ | 7/2006 | Belnap | B22F 7/06 | 175/43 |
| 2007/0039762 A1 ‡ | 2/2007 | Achilles | B23B 27/148 | 175/43 |
| 2007/0181348 A1 ‡ | 8/2007 | Lancaster | E21B 10/46 | 175/43 |
| 2007/0187155 A1 ‡ | 8/2007 | Middlemiss | E21B 10/5676 | 175/42 |
| 2009/0152016 A1 ‡ | 6/2009 | Eyre | E21B 10/006 | 175/42 |
| 2010/0266816 A1 ‡ | 10/2010 | Eyre | C22C 26/00 | 428/15 |
| 2011/0023375 A1 ‡ | 2/2011 | Sani | C04B 35/645 | 51/297 |
| 2011/0056141 A1 ‡ | 3/2011 | Miess | F16C 33/26 | 51/295 |
| 2012/0247029 A1 ‡ | 10/2012 | Eyre | E21B 10/567 | 51/309 |
| 2013/0001100 A1 * | 1/2013 | Thigpen | C25F 3/02 | 204/243.1 |
| 2013/0291447 A1 ‡ | 11/2013 | Mazyar | B24D 3/10 | 51/309 |
| 2013/0340352 A1 * | 12/2013 | Eve | B01J 3/06 | 562/584 |
| 2016/0289079 A1 ‡ | 10/2016 | Weaver | B05B 13/0228 | |

FOREIGN PATENT DOCUMENTS

| | | |
|---|---|---|
| EP | 0329954 | 8/1989 |
| EP | 0500253 | 8/1992 |
| EP | 0585631 | 3/1994 |
| EP | 0595630 | 5/1994 |
| EP | 0612868 | 8/1994 |
| EP | 0617207 | 9/1994 |
| EP | 0787820 | 8/1997 |
| EP | 0860515 | 8/1998 |
| EP | 1190791 | 3/2002 |
| GB | 1349385 | 4/1974 |
| GB | 2048927 | 12/1980 |
| GB | 2268768 | 1/1994 |
| GB | 2323398 | 9/1998 |
| GB | 2418215 | 3/2006 |
| GB | 2422394 | 7/2006 |
| JP | 59-35066 | 2/1984 |
| JP | 61-67740 | 10/1984 |
| JP | 59-219500 | 12/1984 |
| JP | 07-62468 | 3/1985 |
| JP | 61-125739 | 6/1986 |
| JP | 63-069971 | 9/1986 |
| JP | 63-55161 | 8/1987 |
| JP | 07-156003 | 11/1993 |
| JP | 11-245103 | 9/1999 |
| JP | 2000-087112 | 3/2000 |
| RU | 2034937 | 5/1995 |

(56) References Cited

FOREIGN PATENT DOCUMENTS

| | | |
|---|---|---|
| RU | 566439 | 7/2000 |
| WO | 93/23204 | 11/1993 |
| WO | 96/34131 | 10/1996 |
| WO | 00/28106 | 5/2000 |
| WO | 2004/040095 | 5/2004 |
| WO | 2004/106003 | 12/2004 |
| WO | 2004/106004 | 12/2004 |
| WO | 2012/145586 A1 | 10/2012 |

OTHER PUBLICATIONS

Hong, S. et al.; "Dissolution Behavior of Fine Particles of Diamond Under High Pressure Sintering Conditions;" Journal of Material Science Letters 10; pp. 164-166; 1991.

\* cited by examiner
‡ imported from a related application

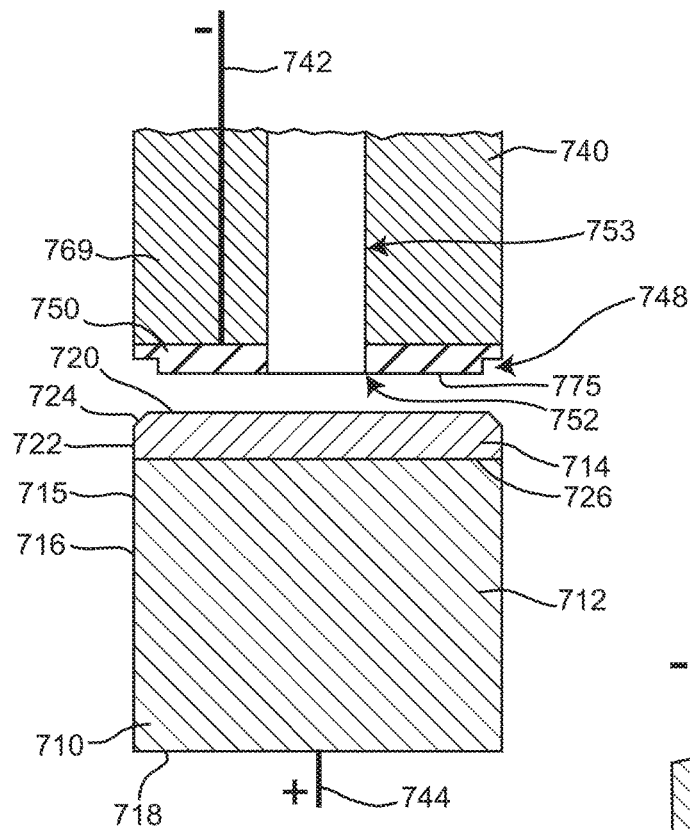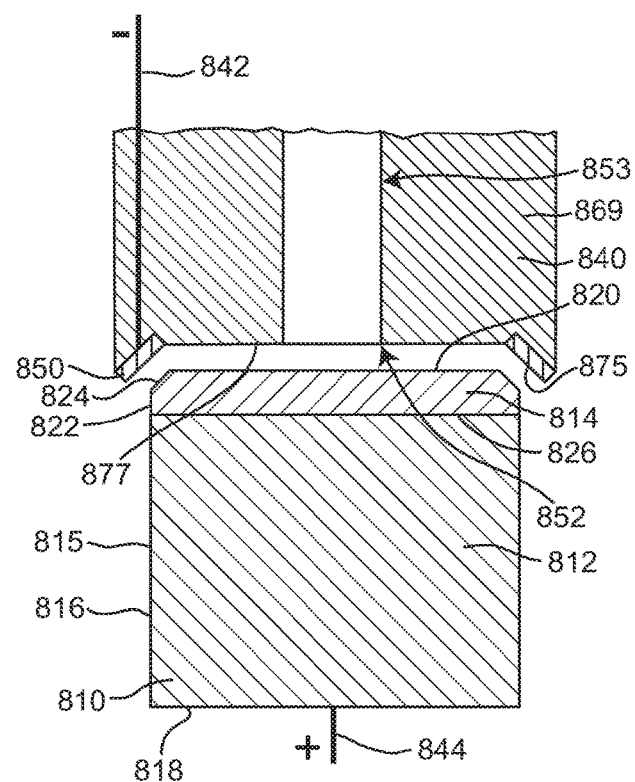

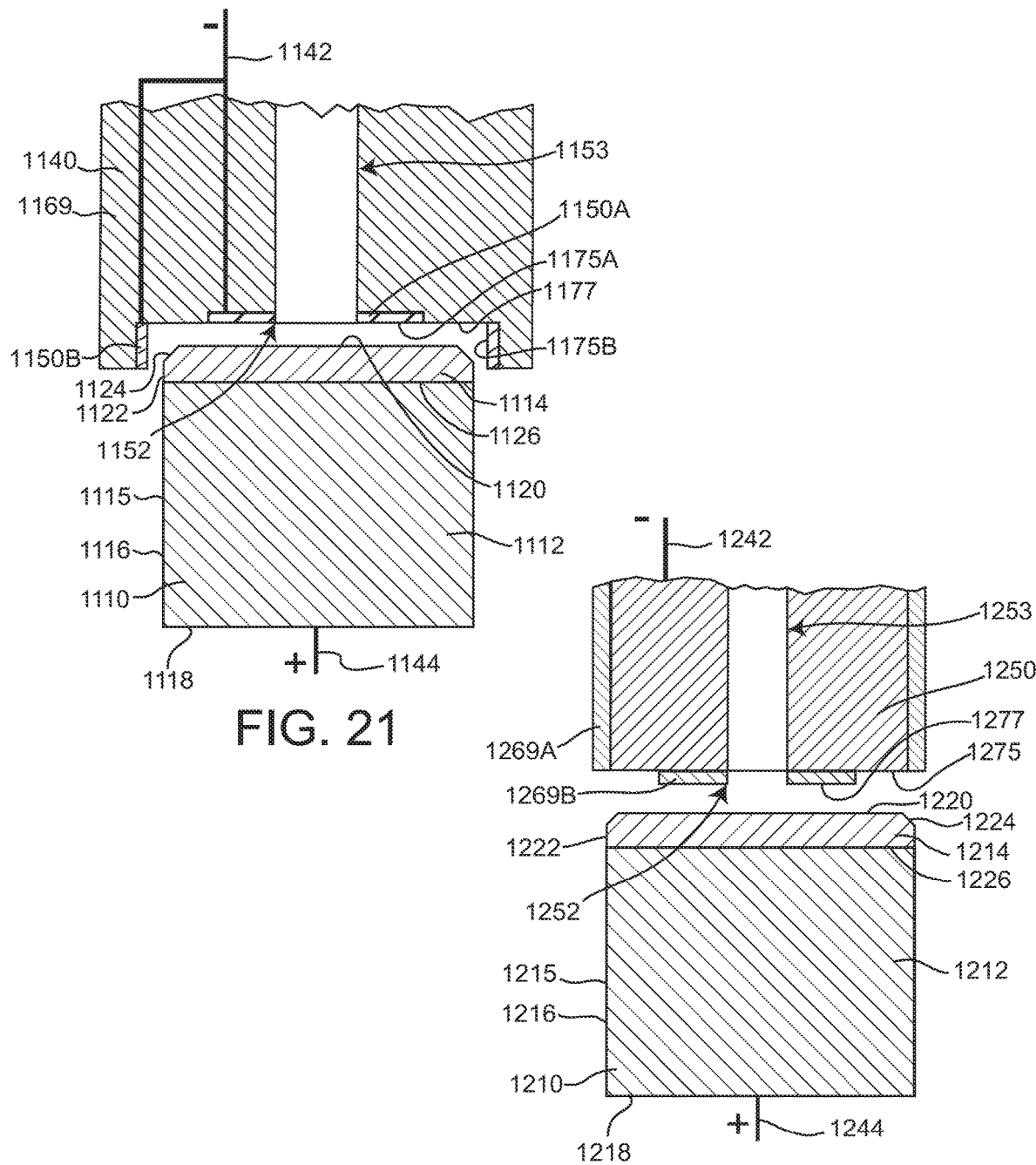

LEACHED SUPERABRASIVE ELEMENTS AND SYSTEMS, METHODS AND ASSEMBLIES FOR PROCESSING SUPERABRASIVE MATERIALS

CROSS REFERENCE TO RELATED APPLICATIONS

This application is a non-provisional utility application which claims the benefit of U.S. Provisional Patent Application No. 62/168,902, titled "LEACHED SUPERABRASIVE ELEMENTS AND SYSTEMS, METHODS AND ASSEMBLIES FOR PROCESSING SUPERABRASIVE MATERIALS" and filed 31 May 2015, the disclosure of which is hereby incorporated, in its entirety, by this reference.

BACKGROUND

Wear-resistant, superabrasive materials are traditionally utilized for a variety of mechanical applications. For example, polycrystalline diamond ("PCD") materials are often used in drilling tools (e.g., cutting elements, gage trimmers, etc.), machining equipment, bearing apparatuses, wire-drawing machinery, and in other mechanical systems. Conventional superabrasive materials have found utility as superabrasive cutting elements in rotary drill bits, such as roller cone drill bits and fixed-cutter drill bits. A conventional cutting element may include a superabrasive layer or table, such as a PCD table. The cutting element may be brazed, press-fit, or otherwise secured into a preformed pocket, socket, or other receptacle formed in the rotary drill bit. In another configuration, the substrate may be brazed or otherwise joined to an attachment member such as a stud or a cylindrical backing. Generally, a rotary drill bit may include one or more PCD cutting elements affixed to a bit body of the rotary drill bit.

As mentioned above, conventional superabrasive materials have found utility as bearing elements, which may include bearing elements utilized in thrust bearing and radial bearing apparatuses. A conventional bearing element typically includes a superabrasive layer or table, such as a PCD table, bonded to a substrate. One or more bearing elements may be mounted to a bearing rotor or stator by press-fitting, brazing, or through other suitable methods of attachment. Typically, bearing elements mounted to a bearing rotor have superabrasive faces configured to contact corresponding superabrasive faces of bearing elements mounted to an adjacent bearing stator.

Cutting elements having a PCD table may be formed and bonded to a substrate using an ultra-high pressure, ultra-high temperature ("HPHT") sintering process. Often, cutting elements having a PCD table are fabricated by placing a cemented carbide substrate, such as a cobalt-cemented tungsten carbide substrate, into a container or cartridge with a volume of diamond particles positioned on a surface of the cemented carbide substrate. A number of such cartridges may be loaded into a HPHT press. The substrates and diamond particle volumes may then be processed under HPHT conditions in the presence of a catalyst material that causes the diamond particles to bond to one another to form a diamond table having a matrix of bonded diamond crystals. The catalyst material is often a metal-solvent catalyst, such as cobalt, nickel, and/or iron, that facilitates intergrowth and bonding of the diamond crystals.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt may act as a catalyst to facilitate the formation of bonded diamond crystals. A metal-solvent catalyst may also be mixed with a volume of diamond particles prior to subjecting the diamond particles and substrate to the HPHT process.

The metal-solvent catalyst may dissolve carbon from the diamond particles and portions of the diamond particles that graphitize due to the high temperatures used in the HPHT process. The solubility of the stable diamond phase in the metal-solvent catalyst may be lower than that of the metastable graphite phase under HPHT conditions. As a result of the solubility difference, the graphite tends to dissolve into the metal-solvent catalyst and the diamond tends to deposit onto existing diamond particles to form diamond-to-diamond bonds. Accordingly, diamond grains may become mutually bonded to form a matrix of polycrystalline diamond, with interstitial regions defined between the bonded diamond grains being occupied by the metal-solvent catalyst. In addition to dissolving carbon and graphite, the metal-solvent catalyst may also carry tungsten, tungsten carbide, and/or other materials from the substrate into the PCD layer of the cutting element.

The presence of the metal-solvent catalyst and/or other materials in the diamond table may reduce the thermal stability of the diamond table at elevated temperatures. For example, the difference in thermal expansion coefficient between the diamond grains and the solvent catalyst is believed to lead to chipping or cracking in the PCD table of a cutting element during drilling or cutting operations. The chipping or cracking in the PCD table may degrade the mechanical properties of the cutting element or lead to failure of the cutting element. Additionally, at high temperatures, diamond grains may undergo a chemical breakdown or back-conversion with the metal-solvent catalyst. Further, portions of diamond grains may transform to carbon monoxide, carbon dioxide, graphite, or combinations thereof, thereby degrading the mechanical properties of the PCD material.

Accordingly, it is desirable to remove metallic materials, such as metal-solvent catalysts, from a PCD material in situations where the PCD material may be exposed to high temperatures. Chemical leaching is often used to dissolve and remove various materials from the PCD layer. For example, chemical leaching may be used to remove metal-solvent catalysts, such as cobalt, from regions of a PCD layer that may experience elevated temperatures during drilling, such as regions adjacent to the working surfaces of the PCD layer.

During conventional leaching of a PCD table, exposed surface regions of the PCD table are immersed in a leaching solution until interstitial components, such as a metal-solvent catalyst, are removed to a desired depth from the exposed surface regions. The process of chemical leaching often involves the use of highly concentrated and/or corrosive solutions, such as aqua regia and mixtures including hydrofluoric acid (HF), to dissolve and remove metal-solvent catalysts from polycrystalline diamond materials. Moreover, in addition to dissolving metal-solvent catalysts from a PCD material, leaching solutions may be difficult to control, may take a long time, and may dissolve any accessible portions of a substrate to which the PCD material is attached. Therefore, improved methods for leaching PCD materials that reduce or mitigate difficulties with conventional leaching are desired.

SUMMARY

The instant disclosure is directed to exemplary methods and assemblies for processing superabrasive elements. In some examples, the method may comprise positioning an electrode near a polycrystalline diamond body such that a gap is defined between the electrode and the polycrystalline diamond body, the polycrystalline diamond body comprising a metallic material disposed in interstitial spaces defined within the polycrystalline diamond body, applying a voltage between the electrode and the polycrystalline diamond body, and passing a processing solution through the gap defined between the electrode and the polycrystalline diamond body. The electrode may be a cathode and the polycrystalline diamond body may be an anode. The polycrystalline diamond material may comprise a metallic material (e.g., cobalt, nickel, iron, and/or tungsten) disposed in interstitial spaces defined within the polycrystalline diamond material.

The processing solution may comprise a suitable solution that leaches the metallic material from interstitial spaces within at least a volume of the polycrystalline diamond material. According to at least one embodiment, the rate at which the processing solution leaches the metallic material from the interstitial spaces within at least the volume of the polycrystalline diamond material is increased in the presence of an electrical current between the polycrystalline diamond material and the electrode. According to various embodiments, the electrode may be disposed near at least the portion of the polycrystalline diamond material. The electrode may be disposed such that the electrode does not directly contact the polycrystalline diamond material. The processing solution may be in electrical communication with each of the electrode and the polycrystalline diamond body during the application of the voltage.

The processing solution may at least partially oxidize the metallic material when the polycrystalline diamond material is processed. According to at least one embodiment, the processing solution may comprise an aqueous solution. According to some embodiments, the processing solution may comprise a buffered or a non-buffered electrolyte solution. For example, the processing solution may comprise the electrolytes at a molar concentration of between approximately 0.01 M and approximately 3 M. In various embodiments, the processing solution may comprise at least one of acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.); the processing solution may additionally or alternatively comprise at least one of an ion, a salt, and an ester of at least one of the foregoing. In various embodiments, the processing solution may comprise a metal salt. The electrode may comprise at least one of copper, tungsten carbide, cobalt, zinc, iron, platinum, palladium, niobium, graphite, graphene, nichrome, gold, and silver. According to various embodiments, a masking layer may be disposed over at least a portion of the polycrystalline diamond material.

In some embodiments, a cation of the metallic material may be present in the processing solution following application of the voltage. The cation of the metallic material may reduced and electrodeposited on the electrode. The processing solution may comprise a first processing solution and the method may further comprise exposing at least the portion of the polycrystalline diamond material to a second processing solution (e.g., a more acidic solution than the first processing solution). At least a portion of the polycrystalline diamond material may be exposed to the second processing solution following exposure of at least the portion of the polycrystalline diamond material to the first processing solution. Additionally, at least the portion of the polycrystalline diamond material may be exposed to the second processing solution prior to exposure of at least the portion of the polycrystalline diamond material to the first processing solution.

In some embodiments, passing the processing solution through the gap defined between the electrode and the polycrystalline diamond body may comprise causing the processing fluid to flow through the gap defined between the electrode and the polycrystalline diamond body. The electrode may be located adjacent to the fluid portion and/or may at least partially define the fluid port. In some embodiments, an electrode for applying the positive charge may abut the polycrystalline diamond material. The polycrystalline diamond element may comprise a polycrystalline diamond table. The polycrystalline diamond table may be bonded to the substrate.

According to some embodiments, a method of processing a superabrasive element may include positioning a first electrode near a first portion of a polycrystalline diamond volume such that a first gap is defined between the first electrode and the polycrystalline diamond volume, the polycrystalline diamond volume comprising a metallic material disposed in interstitial spaces defined within the polycrystalline diamond volume and positioning a second electrode near a second portion of the polycrystalline diamond volume such that a second gap is defined between the second electrode and the polycrystalline diamond volume. The method may further comprise applying a voltage between the first electrode and the second electrode, passing a first processing solution through the first gap, and passing a second processing solution through the second gap.

The polycrystalline diamond volume may be disposed between the first electrode and second electrode. The conductivity of the second processing solution may be lower than the conductivity of the first processing solution. Additionally, the first processing solution may be separated from the second processing solution.

According to at least one embodiment, an assembly for processing a polycrystalline diamond body may include a polycrystalline diamond body comprising a metallic material disposed in interstitial spaces defined within the polycrystalline diamond body, an electrode positioned such that a gap is defined between the electrode and the polycrystalline diamond body, a processing solution flowing through the gap defined between the electrode and the polycrystalline diamond body such that the processing solution is in electrical communication with each of the polycrystalline diamond body and the electrode, and at least one power source configured to apply a voltage between the polycrystalline diamond body and the electrode, wherein the electrode is a cathode and the polycrystalline diamond body is an anode.

Features from any of the disclosed embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

FIG. 17 is a cross-sectional side view of an exemplary superabrasive element disposed near an exemplary electrode assembly according to at least one embodiment.

FIG. 18 is a cross-sectional side view of an exemplary superabrasive element disposed near an exemplary electrode assembly according to at least one embodiment.

FIG. 21 is a cross-sectional side view of an exemplary superabrasive element disposed near an exemplary electrode assembly according to at least one embodiment.

FIG. 22 is a cross-sectional side view of an exemplary superabrasive element disposed near an exemplary electrode assembly according to at least one embodiment.

Figure 1:
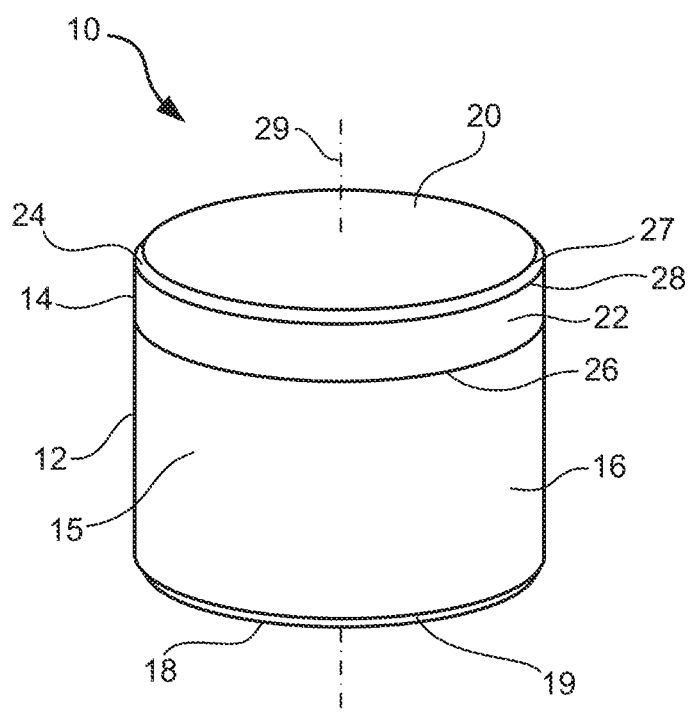
FIG. 1 is a perspective view of an exemplary superabrasive element according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary leached superabrasive elements and leaching systems, methods, and assemblies for processing superabrasive elements. Such superabrasive elements may be used as cutting elements for use in a variety of applications, such as drilling tools, machining equipment, cutting tools, and other apparatuses, without limitation. Superabrasive elements, as disclosed herein, may also be used as bearing elements in a variety of bearing applications, such as thrust bearings, radial bearings, and other bearing apparatuses, without limitation.

The terms "superabrasive" and "superhard," as used herein, may refer to any material having a hardness that is at least equal to a hardness of tungsten carbide. For example, a superabrasive article may represent an article of manufacture, at least a portion of which may exhibit a hardness that is equal to or greater than the hardness of tungsten carbide. Additionally, the term "solvent," as used herein, may refer to a single solvent compound, a mixture of two or more solvent compounds, and/or a mixture of one or more solvent compounds and one or more dissolved compounds. The term "molar concentration," as used herein, may refer to a concentration in units of mol/L at a temperature of approximately 25° C. For example, a solution comprising solute A at a molar concentration of 1 M may comprise 1 mol of solute A per liter of solution. Moreover, the term "cutting," as used herein, may refer to machining processes, drilling processes, boring processes, and/or any other material removal process utilizing a cutting element and/or other cutting apparatus, without limitation.

Figure 2:
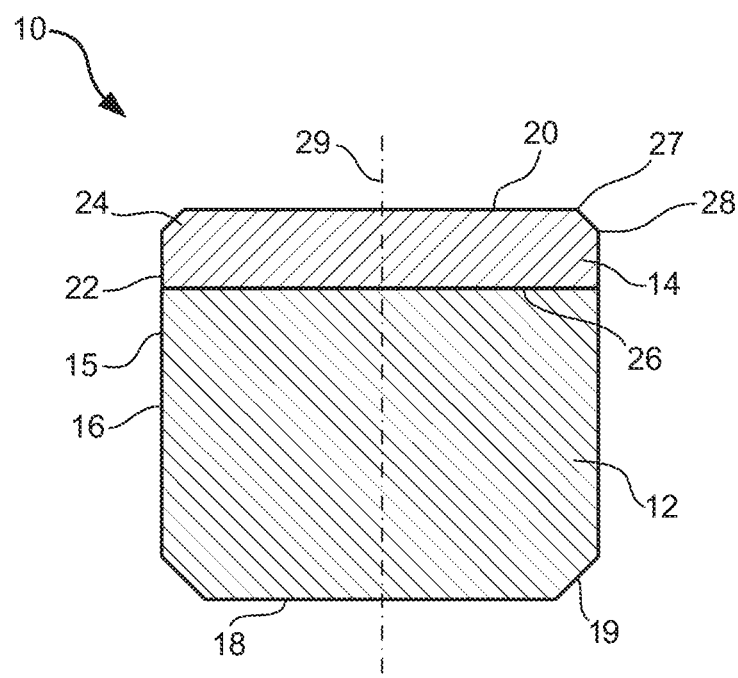
FIG. 2 is a cross-sectional side view of an exemplary superabrasive element according to at least one embodiment.

FIGS. 1 and 2 illustrate an exemplary superabrasive element 10 according to at least one embodiment. As illustrated in FIGS. 1 and 2, superabrasive element 10 may comprise a superabrasive table 14 affixed to or formed upon a substrate 12. Superabrasive table 14 may be affixed to substrate 12 at interface 26, which may be a planar or non-planar interface. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing. At least one edge may be formed at the intersection of chamfer 24 and superabrasive face 20 and/or at the intersection of chamfer 24 and superabrasive side surface 22. For example, cutting element 10 may comprise one or more cutting edges, such as an edge 27 and/or or an edge 28. Edge 27 and/or edge 28 may be formed adjacent to chamfer 24 and may be configured to be exposed to and/or in contact with a mining formation during drilling.

In some embodiments, superabrasive element 10 may be utilized as a cutting element for a drill bit, in which chamfer 24 acts as a cutting edge. The phrase "cutting edge" may refer, without limitation, to a portion of a cutting element that is configured to be exposed to and/or in contact with a subterranean formation during drilling. In at least one embodiment, superabrasive element 10 may be utilized as a bearing element (e.g., with superabrasive face 20 acting as a bearing surface) configured to contact oppositely facing bearing elements.

According to various embodiments, superabrasive element 10 may also comprise a substrate chamfer 13 formed by substrate 12. For example, a chamfer comprising an angular and/or rounded edge may be formed by substrate 12 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Superabrasive element 10 may comprise any suitable size, shape, and/or geometry, without limitation. According to at least one embodiment, at least a portion of superabrasive element 10 may have a substantially cylindrical shape. For example, superabrasive element 10 may comprise a substantially cylindrical outer surface surrounding a central axis 29 of superabrasive element 10, as illustrated in FIGS. 1 and 2. Substrate side surface 16 and superabrasive side surface 22 may, for example, be substantially cylindrical and may have any suitable diameters relative to central axis 29, without limitation. According to various embodiments, substrate side surface 16 and superabrasive side surface 22 may have substantially the same outer diameter relative to central axis 29. Superabrasive element 10 may also comprise any other suitable shape, including, for example, an oval, ellipsoid, triangular, pyramidal, square, cubic, rectangular, and/or composite shape, and/or a combination of the foregoing, without limitation.

According to various embodiments, superabrasive element 10 may also comprise a rear chamfer 19. For example, a rear chamfer 19 comprising an angular and/or rounded edge may be formed by superabrasive element 10 at the intersection of substrate side surface 16 and rear surface 18. Any other suitable surface shape may also be formed at the intersection of substrate side surface 16 and rear surface 18, including, without limitation, an arcuate surface (e.g., a radius, an ovoid shape, or any other rounded shape), a sharp edge, multiple chamfers/radii, a honed edge, and/or combinations of the foregoing.

Substrate 12 may comprise any suitable material on which superabrasive table 14 may be formed. In at least one embodiment, substrate 12 may comprise a cemented carbide material, such as a cobalt-cemented tungsten carbide material and/or any other suitable material. In some embodiments, substrate 12 may include a suitable metal-solvent catalyst material, such as, for example, cobalt, nickel, iron, and/or alloys thereof. Substrate 12 may also include any suitable material including, without limitation, cemented carbides such as titanium carbide, niobium carbide, tantalum carbide, vanadium carbide, chromium carbide, and/or combinations of any of the preceding carbides cemented with iron, nickel, cobalt, and/or alloys thereof. Superabrasive table 14 may be formed of any suitable superabrasive and/or superhard material or combination of materials, including, for example PCD. According to additional embodiments, superabrasive table 14 may comprise cubic boron nitride, silicon carbide, polycrystalline diamond, and/or mixtures or composites including one or more of the foregoing materials, without limitation.

Superabrasive table 14 may be formed using any suitable technique. According to some embodiments, superabrasive table 14 may comprise a PCD table fabricated by subjecting a plurality of diamond particles to an HPHT sintering process in the presence of a metal-solvent catalyst (e.g., cobalt, nickel, iron, or alloys thereof) to facilitate intergrowth between the diamond particles and form a PCD body comprised of bonded diamond grains that exhibit diamond-to-diamond bonding therebetween. For example, the metal-solvent catalyst may be mixed with the diamond particles, infiltrated from a metal-solvent catalyst foil or powder adjacent to the diamond particles, infiltrated from a metal-solvent catalyst present in a cemented carbide substrate, or combinations of the foregoing. The bonded diamond grains (e.g., $sp^3$-bonded diamond grains), so-formed by HPHT sintering the diamond particles, define interstitial regions with the metal-solvent catalyst disposed within the interstitial regions of the as-sintered PCD body. The diamond particles may exhibit a selected diamond particle size distribution. Polycrystalline diamond elements, such as those disclosed in U.S. Pat. Nos. 7,866,418 and 8,297,382, the disclosure of each of which is incorporated herein, in its entirety, by this reference, may have magnetic properties in at least some regions as disclosed therein and leached regions in other regions as disclosed herein.

Following sintering, various materials, such as a metal-solvent catalyst, remaining in interstitial regions within the as-sintered PCD body may reduce the thermal stability of superabrasive table 14 at elevated temperatures. In some examples, differences in thermal expansion coefficients between diamond grains in the as-sintered PCD body and a metal-solvent catalyst in interstitial regions between the diamond grains may weaken portions of superabrasive table 14 that are exposed to elevated temperatures, such as temperatures developed during drilling and/or cutting operations. The weakened portions of superabrasive table 14 may be excessively worn and/or damaged during the drilling and/or cutting operations.

Removing the metal-solvent catalyst and/or other materials from the as-sintered PCD body may improve the heat resistance and/or thermal stability of superabrasive table 14, particularly in situations where the PCD material may be exposed to elevated temperatures. A metal-solvent catalyst and/or other materials may be removed from at least one region of the as-sintered PCD body using any suitable technique, including, for example, electrochemical leaching. In at least one embodiment, a metal-solvent catalyst, such as cobalt, may be removed from at least one region of the as-sintered PCD body, such as one or more regions adjacent to the working surfaces of superabrasive table 14. Removing a metal-solvent catalyst from the as-sintered PCD body may reduce damage to the PCD material of superabrasive table 14 caused by expansion of the metal-solvent catalyst.

At least a portion of a metal-solvent catalyst, such as cobalt, as well as other materials, may be removed from at least a portion of the as-sintered PCD body using any suitable technique, without limitation. For example, electrochemical, chemical and/or gaseous leaching may be used to remove a metal-solvent catalyst from the as-sintered PCD body up to a desired depth from a surface thereof. The as-sintered PCD body may be electrochemically leached by immersion in an acid or acid solution, such as a solution including acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.), in the presence of an electrode, such as copper, tungsten carbide, cobalt, zinc, iron, platinum, palladium, niobium, graphite, graphene, nichrome, gold, and/or silver electrode, wherein a charge, voltage, or potential is applied to the as-sintered PCD body and an opposite charge, voltage, or potential is applied to the electrode or subjected to another suitable process to remove at least a portion of the metal-solvent catalyst from the interstitial regions of the PCD body and form superabrasive table 14 comprising a PCD table. For example, the as-sintered PCD body may be immersed in an acid solution in the presence of an electrode, a positive charge, voltage, or potential may be applied to the as-sintered PCD body and a negative charge, voltage, or potential may be applied to the electrode for a selected amount of time. For example, a PCD body may be positively charged and an electrode may be negatively charged for more than 4 hours, more than 10 hours, between 24 hours to 48 hours, about 2 to about 7 days (e.g., about 3, 5, or 7 days), for a few weeks (e.g., about 4 weeks), or for 1-2 months, depending on the process employed.

Even after leaching, a residual, detectable amount of the metal-solvent catalyst may be present in the at least partially leached superabrasive table 14. It is noted that when the metal-solvent catalyst is infiltrated into the diamond particles from a cemented tungsten carbide substrate including tungsten carbide particles cemented with a metal-solvent catalyst (e.g., cobalt, nickel, iron, or alloys thereof), the infiltrated metal-solvent catalyst may carry tungsten and/or tungsten carbide therewith and the as-sintered PCD body may include such tungsten and/or tungsten carbide therein disposed interstitially between the bonded diamond grains. The tungsten and/or tungsten carbide may be at least partially removed by the selected leaching process or may be relatively unaffected by the selected leaching process.

In some embodiments, only selected portions of the as-sintered PCD body may be leached, leaving remaining portions of resulting superabrasive table 14 unleached. For example, some portions of one or more surfaces of the as-sintered PCD body may be masked or otherwise protected from exposure to a processing solution and/or gas mixture while other portions of one or more surfaces of the as-sintered PCD body may be exposed to or submerged in the processing solution and/or gas mixture. Other suitable techniques may be used for removing a metal-solvent catalyst and/or other materials from the as-sintered PCD body or may be used to accelerate an electrochemical leaching process, as will be described in greater detail below. For example, exposing the as-sintered PCD body to heat, pressure, microwave radiation, and/or ultrasound may be employed to leach or to accelerate an electrochemical leaching process, without limitation. Following leaching, superabrasive table 14 may comprise a volume of PCD material that is at least partially free or substantially free of a metal-solvent catalyst.

The plurality of diamond particles used to form superabrasive table 14 comprising the PCD material may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). More particularly, in various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 15 µm, 12 µm, 10 µm, 8 µm, 4 µm, 2 µm, 1 µm, 0.5 µm, less than 0.5 µm, 0.1 µm, less than 0.1 µm). In another embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes), without limitation. Different sizes of diamond particle may be disposed in different locations within a polycrystalline diamond volume, without limitation. According to at least one embodiment, disposing different sizes of diamond particles in different locations may facilitate control of a leach depth, as will be described in greater detail below.

Figure 3:
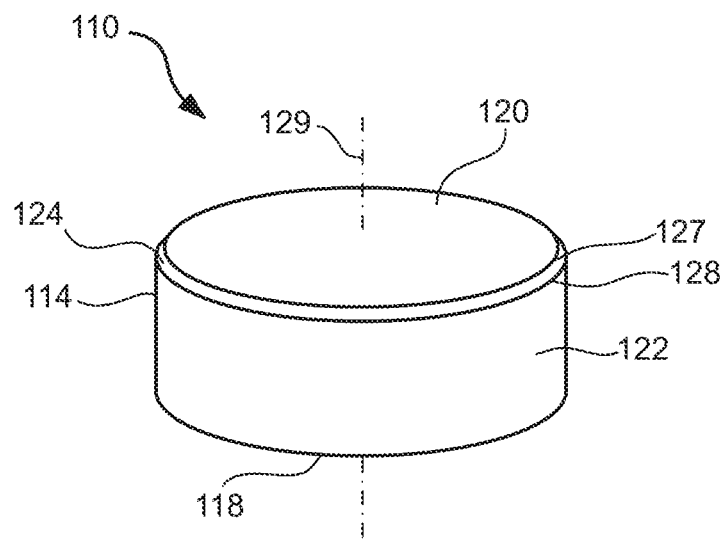
FIG. 3 is a perspective view of an exemplary superabrasive element according to at least one embodiment.
Figure 4:
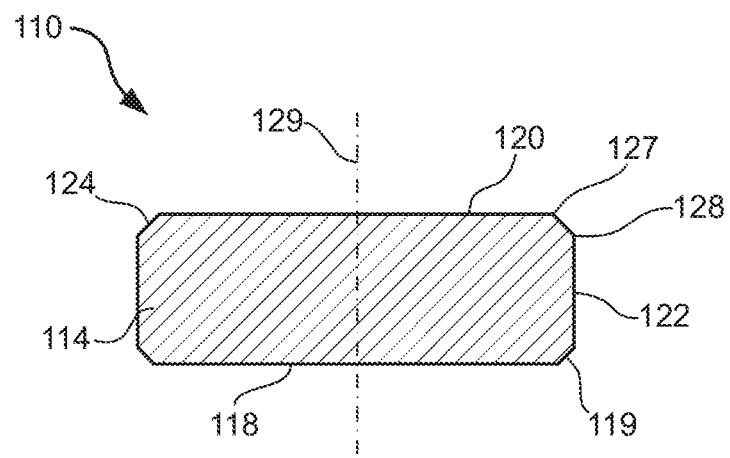
FIG. 4 is a cross-sectional side view of an exemplary superabrasive element according to at least one embodiment.

FIGS. 3 and 4 illustrate an exemplary superabrasive element 110 according to various embodiments. Superabrasive element 110 may comprise a superabrasive table 114 that is not attached to a substrate. As shown in FIGS. 3 and 4, superabrasive element 110 may include a rear surface 118, a superabrasive face 120, and an element side surface 122 formed by superabrasive table 114. Superabrasive element 110 may also comprise a chamfer 124 (i.e., sloped or angled) and/or any other suitable surface shape at the intersection of element side surface 122 and superabrasive face 120, including, without limitation, an arcuate surface (e.g., a radius, an ovoid shape, or any other rounded shape), a sharp edge, multiple chamfers/radii, a honed edge, and/or combinations of the foregoing. At least one edge, such as an edge 127 and/or or an edge 128, may be formed at the intersection of chamfer 124 and each of superabrasive face 120 and element side surface 122, respectively. Element side surface 122 of superabrasive element 110 may radially surround a central axis 129 of superabrasive element 110.

According to various embodiments, superabrasive element 110 may also comprise a rear chamfer 119. For example, a rear chamfer 119 comprising an angular and/or rounded edge may be formed by superabrasive element 110 at the intersection of element side surface 122 and rear surface 118. Any other suitable surface shape may also be formed at the intersection of element side surface 122 and rear surface 118, including, without limitation, an arcuate surface (e.g., a radius, an ovoid shape, or any other rounded shape), a sharp edge, multiple chamfers/radii, a honed edge, and/or combinations of the foregoing.

Superabrasive element 110 may be formed using any suitable technique, including, for example HPHT sintering, as described above. In some examples, superabrasive element 110 may be created by first forming a superabrasive element 10 that includes a substrate 12 and a superabrasive table 14, as detailed above in reference to FIGS. 1 and 2. Once superabrasive element 10 has been produced, superabrasive table 14 may be separated from substrate 12 to form superabrasive element 110. For example, prior to or following leaching, superabrasive table 14 may be separated from substrate 12 using any suitable process, including a lapping process, a grinding process, a wire-electrical-discharge machining ("wire EDM") process, or any other suitable material-removal process, without limitation.

According to some embodiments, superabrasive element 110 may be processed and utilized either with or without an attached substrate. For example, following leaching, superabrasive element may be secured directly to a cutting tool, such as a drill bit, or to a bearing component, such as a rotor or stator. In various embodiments, following leaching, superabrasive element 110 may be attached to a substrate. For example, rear surface 118 of superabrasive element 110 may be brazed, welded, soldered, threadedly coupled, and/or otherwise adhered and/or fastened to a substrate, such as tungsten carbide substrate or any other suitable substrate, without limitation. Polycrystalline diamond elements having pre-sintered polycrystalline diamond bodies including an infiltrant, such as those disclosed in U.S. Pat. No. 8,323,367, the disclosure of which is incorporated herein, in its entirety, by this reference, may be leached a second time according to the processes disclosed herein after reattachment of the pre-sintered polycrystalline diamond bodies.

Figure 5:
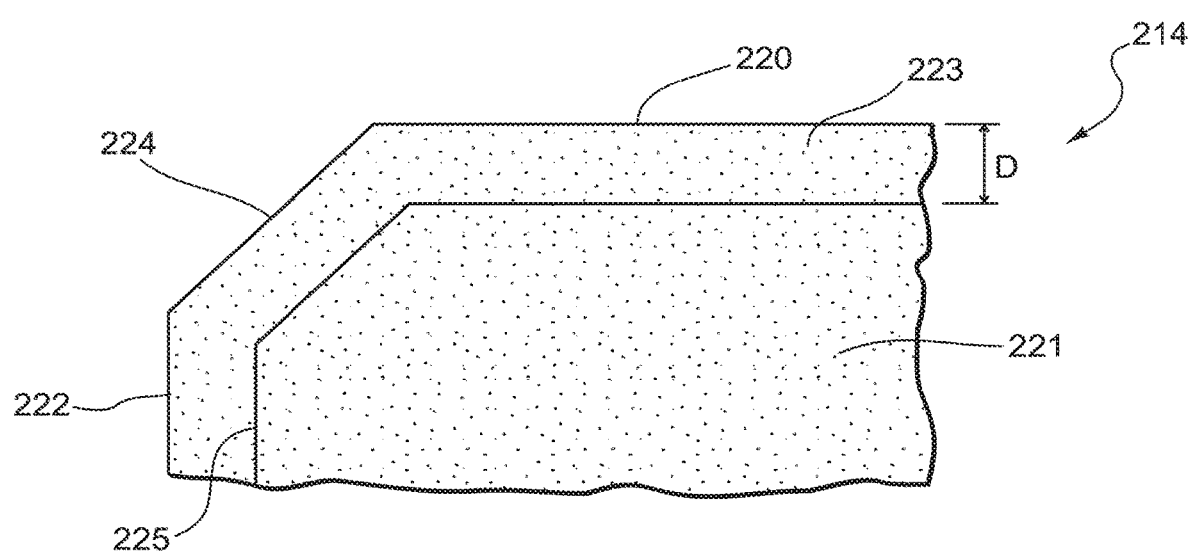
FIG. 5 is a cross-sectional side view of a portion of a superabrasive table according to at least one embodiment.

FIG. 5 is a cross-sectional side view of a portion of an exemplary superabrasive table 214, such as the superabrasive tables 14 and 114 illustrated in FIGS. 1-4. Superabrasive table 14 may comprise a composite material, such as a PCD material. A PCD material may include a matrix of bonded diamond grains and interstitial regions defined between the bonded diamond grains. Such interstitial regions may be at least partially filled with various materials. In some embodiments, a metal-solvent catalyst may be disposed in interstitial regions in superabrasive table 14. Tungsten and/or tungsten carbide may also be present in the interstitial regions.

According to various embodiments, materials may be deposited in interstitial regions during processing of superabrasive table 14. For example, material components of substrate 12 may migrate into a mass of diamond particles used to form a superabrasive table 14 during HPHT sintering. As the mass of diamond particles is sintered, a metal-solvent catalyst may melt and flow from substrate 12 into the mass of diamond particles. As the metal-solvent flows into superabrasive table 14, it may dissolve and/or carry additional materials, such as tungsten and/or tungsten carbide, from substrate 12 into the mass of diamond particles. As the metal-solvent catalyst flows into the mass of diamond particles, the metal-solvent catalyst, and any dissolved and/or undissolved materials, may at least partially fill spaces between the diamond particles. The metal-solvent catalyst may facilitate bonding of adjacent diamond particles to form a PCD layer. Following sintering, any materials, such as, for example, the metal-solvent catalyst, tungsten, and/or tungsten carbide, may remain in interstitial regions within superabrasive table 14.

To improve the performance and heat resistance of a surface of superabrasive table 14, at least a portion of a metal-solvent catalyst, such as cobalt, may be removed from at least a portion of superabrasive table 14. Optionally, tungsten and/or tungsten carbide may be removed from at least a portion of superabrasive table 14. A metal-solvent catalyst, as well as other materials, may be removed from superabrasive table 14 using any suitable technique, without limitation. According to at least one embodiment, superabrasive table 14 may include between approximately 5% and approximately 10% metallic material by weight prior to leaching, without limitation.

For example, electrochemical leaching may be used to remove a metal-solvent catalyst from superabrasive table 214 up to a depth D from a surface of superabrasive table 214, as illustrated in FIG. 5. As shown in FIG. 5, depth D may be measured relative to an external surface of superabrasive table 214, such as superabrasive face 220, superabrasive side surface 222, and/or chamfer 224. In some examples, a metal-solvent catalyst may be removed from superabrasive table 214 up to a depth D of approximately 2500 μm. In additional examples, a metal-solvent catalyst may be removed from superabrasive table 214 up to a depth D of between approximately 100 and 1000 μm.

Following leaching, superabrasive table 214 may comprise a first volume 221 and a second volume 223. Following leaching, superabrasive table 214 may comprise, for example, a first volume 221 that contains a metal-solvent catalyst. An amount of metal-solvent catalyst in first volume 221 may be substantially the same prior to and following leaching. In various embodiments, first volume 221 may be remote from one or more exposed surfaces of superabrasive table 214.

Second volume 223 may comprise a volume of superabrasive table 214 having a lower concentration of the interstitial material than first volume 221. For example, second volume 223 may be substantially free of a metal-solvent catalyst. However, amounts of catalyst may remain within some interstices that are inaccessible to the leaching process. Second volume 223 may extend from one or more surfaces of superabrasive table 214 (e.g., superabrasive face 220, superabrasive side surface 222, and/or chamfer 224) to a depth D from the one or more surfaces. Second volume 223 may be located adjacent one or more surfaces of superabrasive table 214. An amount of metal-solvent catalyst in first volume 221 and/or second volume 223 may vary at different depths in superabrasive table 214.

In at least one embodiment, superabrasive table 214 may include a transition region 225 between first volume 221 and second volume 223. Transition region 225 may include amounts of metal-solvent catalyst varying between an amount of metal-solvent catalyst in first volume 221 and an amount of metal-solvent catalyst in second volume 223. In various examples, transition region 225 may comprise a relatively narrow region between first volume 221 and second volume 223.

Figure 6A:
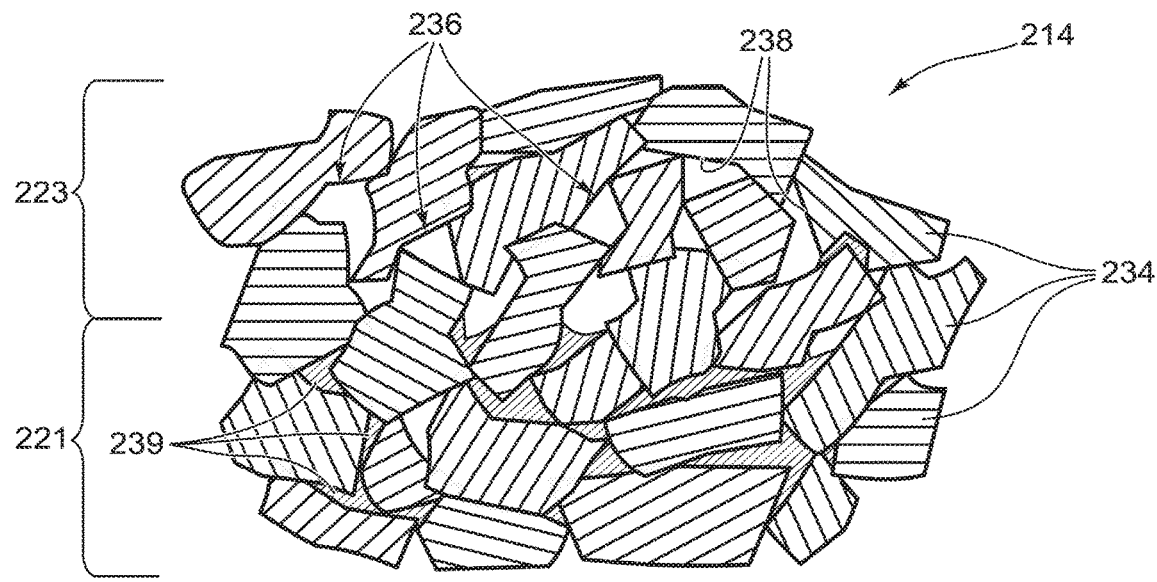
FIG. 6A is a magnified cross-sectional side view of a portion of a superabrasive table according to at least one embodiment.
Figure 6B:
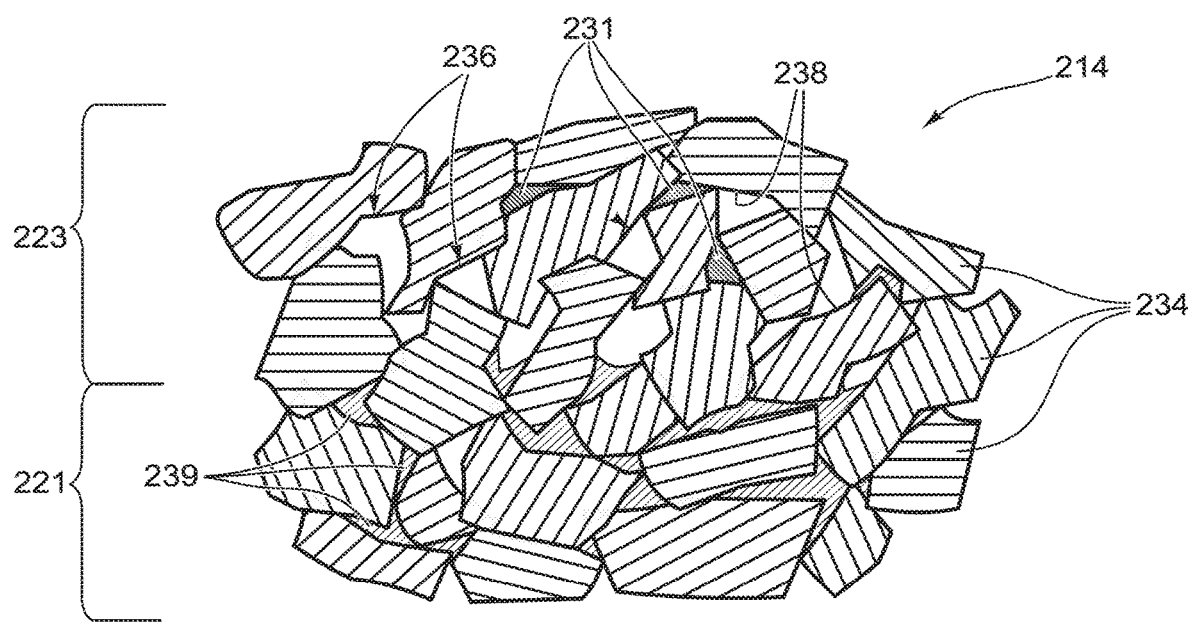
FIG. 6B is a magnified cross-sectional side view of a portion of a superabrasive table according to at least one embodiment.

FIGS. 6A and 6B are magnified cross-sectional side views of a portion of the superabrasive table 214 illustrated in FIG. 5 according to various embodiments. As shown in FIGS. 6A and 6B, superabrasive table 214 may comprise sintered grains 234 and interstitial regions 236 between grains 234 defined by grain surfaces 238. Grains 234 may comprise grains formed of any suitable superabrasive material, including, for example, diamond grains. At least some of grains 234 may be bonded to one or more adjacent grains 234, forming a sintered polycrystalline matrix (e.g., sintered polycrystalline diamond).

Interstitial material 239 may be disposed in at least some of interstitial regions 236. Interstitial material 239 may comprise any suitable material, such as, for example, a metal-solvent catalyst, tungsten, and/or tungsten carbide. As shown in FIG. 6A, interstitial material 239 may not be present in at least some of interstitial regions 236. At least a portion of interstitial material 239 may be removed from at least some of interstitial regions 236 during a leaching procedure. For example, a substantial portion of interstitial material 239 may be removed from second volume 223 during a leaching procedure. Additionally interstitial material 239 may remain in a first volume 221 following a leaching procedure. In some embodiments, as shown in FIG. 6B, at least some of interstitial regions 236 may be partially filled with interstitial material 231 that is not removed by leaching. For example, in one embodiment, cobalt may be substantially removed from at least some of interstitial regions 236 of first volume 221 and/or second volume 223, while tungsten and/or tungsten carbide may remain in the at least some of interstitial regions 236 of first volume 221 and/or second volume 223 (see FIGS. 6A-6B).

In some examples, interstitial material 239 may be removed from table 214 to a depth that improves the performance and/or heat resistance of a surface of superabrasive table 214 to a desired degree. In some embodiments, interstitial material 239 may be removed from superabrasive table 214 to a practical limit. In order to remove interstitial material 239 from superabrasive table 214 to a depth beyond the practical limit, for example, significantly more time, temperature, and/or other process parameter may be required. In some embodiments, interstitial material 239 may be removed from superabrasive table 214 to a practical limit or desired degree where interstitial material remains in at least a portion of superabrasive table 214. In various embodiments, superabrasive table 214 may be fully leached so that interstitial material 239 is substantially removed from a substantial portion of superabrasive table 214.

In at least one embodiment, as will be described in greater detail below, interstitial material 239 may be leached from a superabrasive material, such as a PCD material in superabrasive table 214, by exposing the superabrasive material to a suitable processing solution in the presence of an electrode and applying a charge (e.g., a positive charge) to the interstitial material 239 and an opposite charge (e.g., a negative charge) to the electrode. Put another way, an electrical potential (e.g., a voltage) or charge may be created between interstitial material 239 and an electrode to leach the interstitial material from a body of bonded superabrasive grains. Interstitial material 239 may include a metal-solvent catalyst, such as cobalt, nickel, iron, and/or alloys thereof.

FIGS. 7-29 show exemplary configurations of superabrasive elements and electrode assemblies for leaching the superabrasive elements. The configurations illustrated in these figures may enable selective leaching of portions of the superabrasive elements to form desired leach profiles within the superabrasive elements. While certain configurations of superabrasive elements are shown and described herein for purposes of illustration, the apparatuses and methods described herein may be applied to any superabrasive article having any suitable material, shape, and configuration, without limitation.

The apparatuses and methods disclosed herein may be configured and carried out by any suitable means, without limitation. According to some embodiments, the apparatuses and methods may be configured and carried out utilizing electrochemical machining ("ECM") equipment and/or precise electrochemical machining ("PECM") equipment. Examples of ECM and/or PECM machines that may be suitable for use in configuring any of the apparatuses and performing any of the methods described herein include: PT PECM machine (EMAG Holding Gmbh, Salach, Germany), SFE-4000M ECM machine (Stankofinexpo, LLC. Kirov City, Russia), and PEM 400 PECM machine (PEMTec SNC, Eurozone du Parc à Bois. France).

Figure 7:
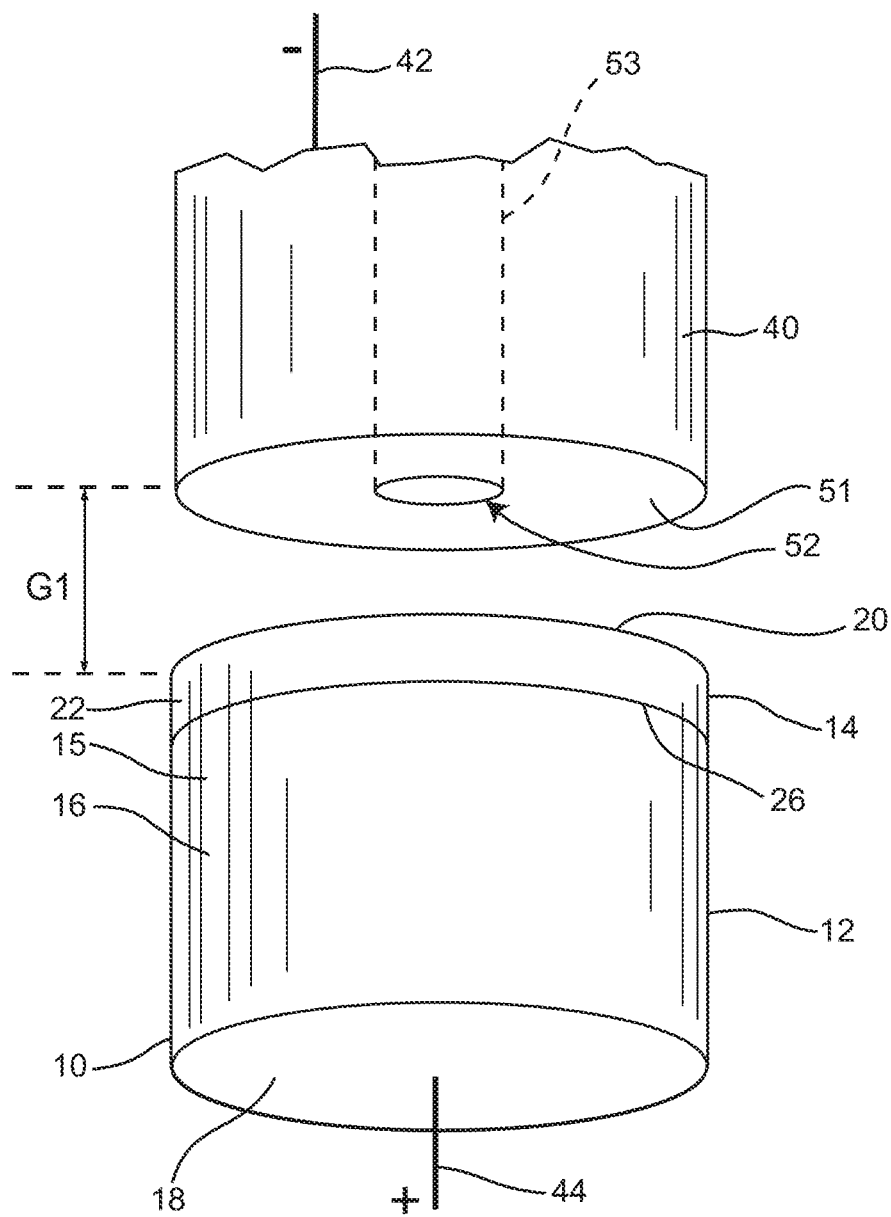
FIG. 7 is a perspective view of an exemplary superabrasive element disposed near an exemplary electrode assembly according to at least one embodiment.
Figure 8:
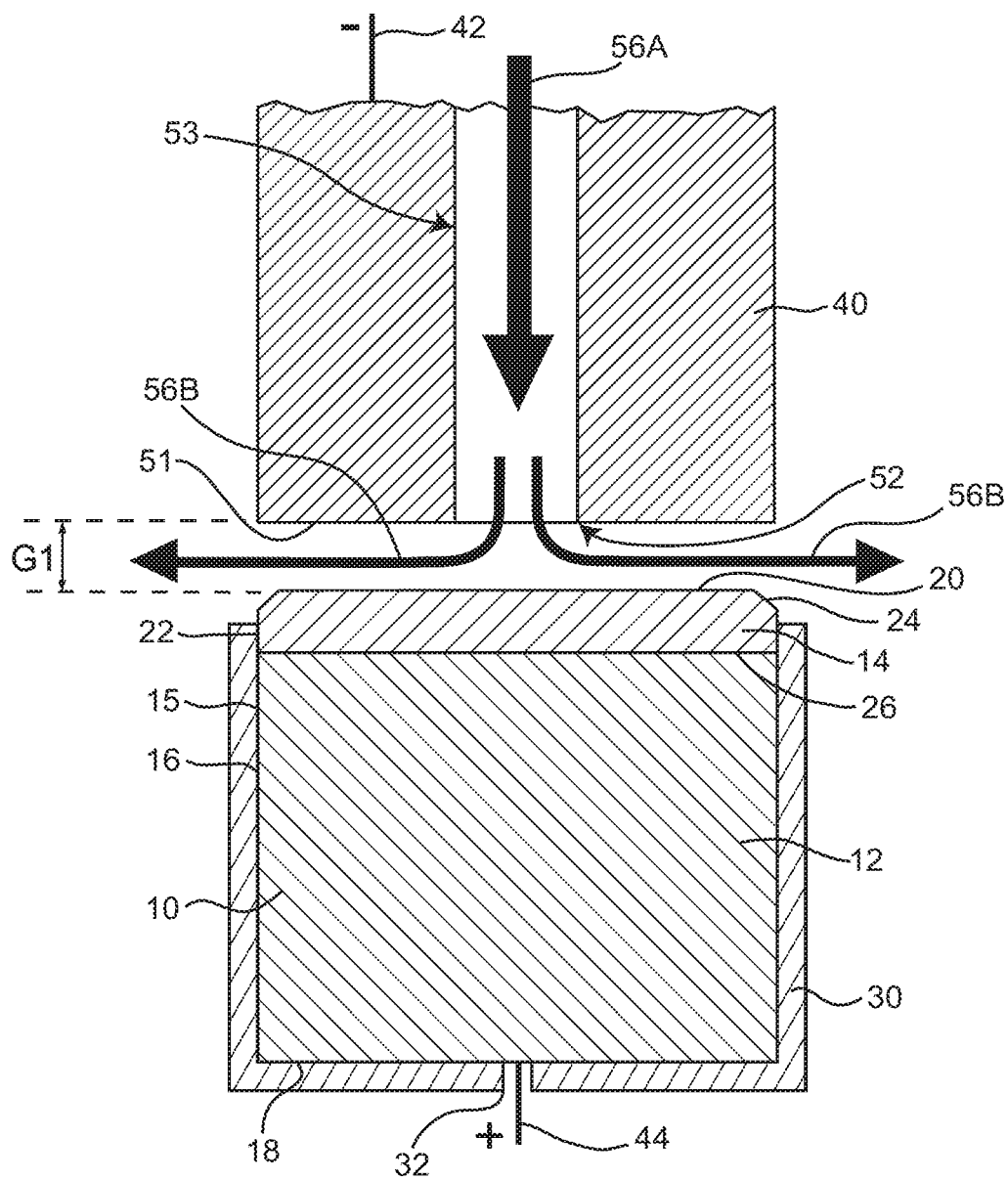
FIG. 8 is a cross-sectional side view of an exemplary superabrasive element disposed near an exemplary electrode assembly according to at least one embodiment.

FIGS. 7 and 8 illustrate an exemplary superabrasive element 10 disposed near an exemplary electrode assembly 40 according to certain embodiments. As illustrated in FIGS. 7 and 8, superabrasive element 10 may comprise a superabrasive table 14 affixed to or formed upon a substrate 12. Superabrasive table 14 may be affixed to substrate 12 along interface 26, which may be a planar or non-planar interface. Superabrasive element 10 may comprise a rear surface 18, a superabrasive face 20, and an element side surface 15. In some embodiments, element side surface 15 may include a substrate side surface 16 formed by substrate 12 and a superabrasive side surface 22 formed by superabrasive table 14. Rear surface 18 may be formed by substrate 12.

Superabrasive element 10 may also comprise a chamfer 24 (i.e., sloped or angled) formed by superabrasive table 14. Chamfer 24 may comprise an angular and/or rounded edge formed at the intersection of superabrasive side surface 22 and superabrasive face 20. Any other suitable surface shape may also be formed at the intersection of superabrasive side surface 22 and superabrasive face 20, including, without limitation, an arcuate surface (e.g., a radius, an ovoid shape, or any other rounded shape), a sharp edge, multiple chamfers/radii, a honed edge, and/or combinations of the foregoing.

According to some embodiments, as illustrated in FIG. 8, superabrasive element 10 may optionally be positioned within protective leaching cup 30 such that protective leaching cup 30 surrounds at least a portion of superabrasive element 10, including substrate 12. When superabrasive element 10 is positioned within protective leaching cup 30, at least a portion of superabrasive element 10, such as superabrasive table 14 and/or substrate 12, may be positioned adjacent to and/or contacting a portion of protective leaching cup 30. For example, protective leaching cup 30 may be configured to contact at least a portion of element side surface 15 of superabrasive element 10, forming a seal between protective leaching cup 30 and superabrasive element 10, where the leaching cup 30 is partially or fully impermeable to various fluids, such as a leaching medium (e.g., a leaching solution).

Protective leaching cup 30 may be formed of any suitable material, without limitation. For example, protective leaching cup 30 may comprise a flexible, elastic, malleable, and/or otherwise deformable material configured to surround and/or contact at least a portion of superabrasive element 10. Protective leaching cup 30 may prevent or limit damage to superabrasive element 10 when at least a portion of superabrasive element 10 is exposed to or submerged in various reactive or conductive agents. For example, protective leaching cup 30 may prevent and/or inhibit a leaching solution from chemically damaging or electrically communicating with certain portions of superabrasive element 10, such as portions of substrate 12, portions of superabrasive table 14, or both, during leaching. Protective leaching cup 30 may be formed with an opening 32 configured to allow electrical conductor 44 to contact rear surface 18 of superabrasive element 10. Optionally, opening 32 may be sealed with a sealant (e.g., silicone, epoxy, etc.) to prevent and/or inhibit the leaching solution from affecting or damaging substrate 12, if necessary.

In various embodiments, protective layer 30 may comprise one or more materials that are substantially inert, not electrically conductive, and/or resistant to acids, bases, and/or other mechanisms that enable a leaching solution to leach superabrasive element 10. In some embodiments, protective layer 30 may comprise one or more materials exhibiting significant stability at various temperatures and/or pressures, including selected temperatures and/or pressures used in leaching and/or otherwise processing superabrasive element 10. In some embodiments, protective leaching cup 30 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 30 may comprise PTFE blended with one or more other polymeric materials. In various embodiments, protective leaching cup 30 may be a metal, a refractory metal (e.g., niobium, tantalum, or zirconium), or another material that is not substantially affected by an electrolytic process used to leach interstitial material from a body of bonded superabrasive grains. By way of example, U.S. Pat. Publication No. 2011/0056141 and U.S. Pat. No. 8,951,317, the disclosure of each of which is incorporated herein, in its entirety, by this reference, disclose protective materials for use in leaching sintered polycrystalline articles as disclosed herein.

Electrode assembly 40 may comprise any suitable size, shape, and/or geometry, without limitation. According to at least one embodiment, at least a portion of electrode assembly 40 may have a substantially cylindrical shape, as illustrated in FIGS. 7 and 8. In some embodiments, electrode assembly 40 may include an electrode comprising an electrically conductive material. For example, as illustrated in FIGS. 7 and 8, at least a portion of electrode assembly 40 disposed near superabrasive element 10 may be substantially composed of a conductive material. In some embodiments, an electrode assembly may include one or more insulated portions, as will be described in greater detail below with reference to FIGS. 12-22.

Electrode assembly 40 may have an electrode surface 51 that faces at least a portion of superabrasive table 14. For example, as illustrated in FIGS. 7 and 8, electrode surface 51 may comprise a generally planar surface that faces superabrasive face 20 of superabrasive table 14. Electrode surface 51 may also comprise any other suitable surface shape, without limitation, including, for example, a non-planar, concave, convex, and/or undulating surface. Electrode surface 51 may be positioned substantially parallel or nonparallel to at least a portion of superabrasive table 14, such as superabrasive face 20.

According to various embodiments, electrode assembly 40 may be disposed near superabrasive element 10. For example, as shown in FIGS. 7 and 8, electrode assembly 40 may be disposed near, but separated from, superabrasive table 14 of superabrasive element 10 such that a gap G1 is defined between electrode surface 51 of electrode assembly 40 and superabrasive face 20 of superabrasive table 14. Electrode assembly 40 may be disposed any suitable distance away from superabrasive element 10. Although not shown, electrode assembly 40 may be disposed near any other suitable portion of superabrasive table 14, such as, for example, superabrasive side surface 22 and/or chamfer 24. Electrode surface 51 may be spaced any suitable distance from superabrasive table 14. For example, a gap between at least a portion of electrode surface 51 and superabrasive table 14 may be between approximately 0.01 mm and approximately 3 mm. In additional embodiments, a gap between at least a portion of electrode surface 51 and superabrasive table 14 may be between approximately 0.05 mm and approximately 2 mm. In some embodiments, a gap between at least a portion of electrode surface 51 and superabrasive table 14 may be between approximately 0.1 mm and approximately 1 mm. In various embodiments, a gap between at least a portion of electrode surface 51 and superabrasive table 14 may be between approximately 0.1 mm and approximately 0.5 mm, may be between approximately 0.5 mm and approximately 1 mm, may be between approximately 1 mm and approximately 1.5 mm, and/or may be between approximately 1.5 mm and approximately 2 mm.

In various embodiments, electrode assembly 40 may be moved with respect to superabrasive table 14 (or vice versa) during processing. For example, electrode assembly 40 may be moved closer to or further away from superabrasive face 20 during processing. In some embodiments, electrode assembly 40 may be tilted and/or rotated (e.g., rotated about central axis 29 shown in FIGS. 1-2) relative to superabrasive table 14. Spacing and/or orientation of electrode surface 51, or at least a selected portion of electrode surface 51, from superabrasive table 14, or at least a selected portion of superabrasive table 14, may be selected to obtain desired leaching depths and/or profiles in superabrasive table 14. According to some embodiments, an amount of material removed from a portion of superabrasive table 14 over time may increase as a distance between a portion of electrode surface 51 and the portion of superabrasive table 14 decreases.

According to at least one embodiment, electrode assembly 40 may include at least one fluid port 52 for discharging, conducting, accepting, and/or otherwise moving a processing fluid. For example, as shown in FIGS. 7 and 8, fluid port 52 may be defined in electrode assembly 40 adjacent to electrode surface 51. Fluid port 52 may be positioned and configured to discharge/pull processing fluid into/from gap G1 defined between electrode surface 51 of electrode assembly 40 and superabrasive face 20 of superabrasive table 14 such that the processing fluid passes over at least a portion of superabrasive face 20, chamfer 24, and/or superabrasive side surface 22. An internal passage 53 that is open to fluid port 52 may be defined within electrode assembly 40. In one embodiment, internal passage 53 may supply a processing fluid from a processing fluid source to fluid port 52. For example, internal passage 53 may be in communication with a pump or other suitable fluid supply apparatus. In some embodiments, the processing fluid used to process superabrasive table 14 may be reused.

In one example, processing fluid may be directed through fluid port 52 in general direction 56A to fluid port 52. Fluid port 52 may be configured to discharge processing fluid in any suitable direction. For example, as shown in FIG. 8, processing fluid that is supplied to fluid port 52 by internal passage 53 may flow generally along direction 56A, which is substantially perpendicular to electrode surface 51 and/or superabrasive face 20, may be discharged from fluid port 52 into gap G1, and the processing fluid may be redirected in various directions (simplistically represented by general directions 56B) between electrode surface 51 of electrode assembly 40 and superabrasive face 20 of superabrasive table 14. Because fluid port 52 illustrated in FIG. 8 is generally centered with respect to electrode surface 51 and superabrasive face 20, the processing fluid may be generally directed radially outward from the center towards the peripheral edges of electrode surface 51 and superabrasive face 20 so as to pass substantially along or between electrode surface 51 and superabrasive face 20.

In various embodiments, electrode assembly 40 and/or superabrasive table 14 may be configured to modify and/or optimize flow characteristics of the processing fluid with respect to one or more portions of superabrasive table 14 as desired. For example fluid port 52 may be disposed at a position that is not generally centered with respect to electrode surface 51 and/or superabrasive face 20. In certain embodiments, fluid port 52 may be configured to receive (i.e., from internal passage 53) and/or discharge the processing fluid in one or more directions that are not substantially perpendicular to electrode surface 51 and/or superabrasive face 20. In at least one embodiment, a plurality of fluid ports 52 and/or internal passages 53 may be defined within electrode assembly 40 for discharging and/or drawing processing fluid with respect to one or more portions of superabrasive table 14. For example, a plurality of fluid ports 52 may be arranged eccentrically in electrode assembly 40 such that the plurality of fluid ports 52 are not arranged evenly or centered about a central axis (e.g., central axis 29 shown in FIGS. 1-2). In various embodiments, electrode assembly 40 may be rotated, tilted, shifted, and/or otherwise moved with respect to superabrasive element 10 prior to, during, and/or following leaching of superabrasive table 14. In certain embodiments, processing fluid may be discharged into and/or drawn away from portions of superabrasive table 14 via one or more ports or conduits external to electrode assembly 40. In some embodiments, the surface shape, roughness, and/or orientation of electrode surface 51 and/or superabrasive face 20 may be configured as desired.

Electrode assembly 40 may have an outer diameter that is substantially the same as the outer diameter of element side surface 15 of superabrasive element 10. In various embodiments, electrode assembly 40 may have an outer diameter that is greater than or less than the outer diameter of element side surface 15. In at least one embodiment, electrode assembly 40 may comprise a conductive metallic material, such as copper, brass, and/or bronze. Electrode assembly 40 may comprise any suitable electrically conductive material, such as, for example, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge, electrical potential, or voltage may be applied between electrode assembly 40 and superabrasive element 10 through electrical conductors (e.g., wires or any suitable electrical conductor) 42 and 44, respectively. For example, in order to conduct a current through a processing solution for processing superabrasive element 10, at least a portion of superabrasive element 10 may be positioned so as to contact the processing solution (e.g., optionally, with a leaching cup 30 as shown in FIG. 8 or other protective covering) and a charge (e.g., a positive charge, voltage, or potential) may be applied between at least a portion of substrate 12 (e.g., rear surface 18) of superabrasive element 10 and electrode assembly 40 through electrical conductor 44 and electrical conductor 42. In at least one embodiment, electrical conductor 44 may be electrically connected to substrate 12 by being electrically connected to (e.g., positioned abutting) substrate 12. In some embodiments, electrical conductor 44 may be directly connected to superabrasive table 14 by being electrically connected to (e.g., positioned abutting) superabrasive table 14. A charge, electrical potential, or voltage applied between electrode assembly 40 and superabrasive element 10 may be applied as direct current ("DC") having a substantially constant voltage waveform and constant polarity, or as alternating current ("AC") having a continually varying voltage waveform and continually varying polarity. In some embodiments, a charge, electrical potential, or voltage applied between electrode assembly 40 and superabrasive element 10 may be applied as a pulsed direct current ("PDC") (e.g., having a continually varying voltage waveform and/or constant polarity).

As processing fluid passes through gap G1, the processing fluid may be in electrical communication with each of electrode assembly 40 and superabrasive table 14. When at least a portion of superabrasive table 14 and at least a portion of electrode assembly 40 are exposed to the processing solution flowing through gap G1 while a voltage is applied between electrode assembly 40 and superabrasive table 14, interstitial materials may be removed from at least a portion of superabrasive table 14 of superabrasive element 10 near electrode assembly 40. As will be discussed in greater detail below, as the voltage is applied to the processing solution, the processing solution may react with or cause removal of materials present in superabrasive table 14, such as a metal solvent catalyst. For example, the reaction of the metal solvent catalyst in the presence of the applied voltage may generate reaction products, which are dissolved in or otherwise carried away by the processing solution and removed from superabrasive table 14. The flow of the processing solution through gap G1 in general directions 56B may enable the processing solution to carry the dissolved reaction products or ions away from the superabrasive table 14, thereby facilitating the continued removal of the solvent catalyst.

Figure 9:
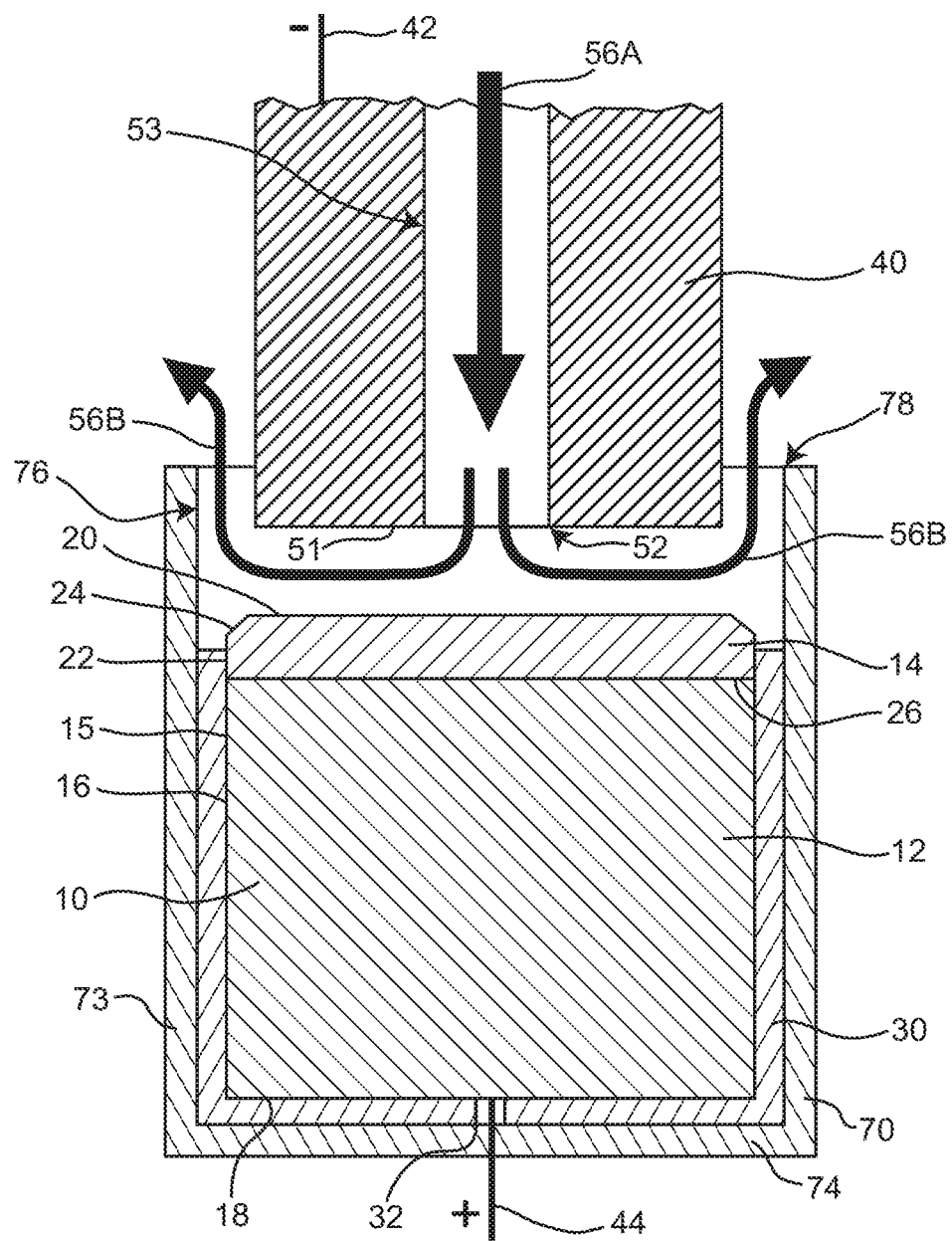
FIG. 9 is a cross-sectional side view of an exemplary superabrasive element disposed near an exemplary electrode assembly and positioned within a processing fixture according to at least one embodiment.

FIG. 9 is a cross-sectional side view of an exemplary leaching assembly according to at least one embodiment. As illustrated in FIG. 9, superabrasive element 10 may be positioned within a protective leaching cup 30 and disposed near electrode assembly 40. Superabrasive element 10, electrode assembly 40, and protective leaching cup 30 may further be positioned within a processing fixture 70.

As shown in FIG. 9, processing fixture 70 may have a rear wall 74 and a side wall 73 defining a cavity 76. Rear wall 74 and side wall 73 may have any suitable shape, without limitation. Processing fixture 70 may include an opening 78 opposite rear wall 74. A processing solution, which is schematically represented as flowing in general directions 56A and 56B, may be discharged from fluid port 52 of electrode assembly 40 such that at least a portion of superabrasive table 14 of superabrasive element 10 is exposed to the processing solution flowing between electrode assembly 40 and superabrasive table 14. Superabrasive element 10 may be positioned in cavity 76 so that superabrasive element 10 is positioned adjacent to or near rear wall 74 of processing fixture 70. In some embodiments, superabrasive element 10 may be positioned and/or secured within processing fixture 70 using any suitable mechanism, without limitation. In some embodiments processing fixture 70 may be larger than leaching cup 30 so that gaps are defined between leaching cup 30 and processing fixture 70. In other embodiments, more than one superabrasive element 10 and protective leaching cup 30 (e.g., 10 or more, 20 or more, etc.) may be placed within a single processing fixture 70 for loading.

According to some embodiments, the processing solution may comprise a conductive solution (e.g., a conductive aqueous solution, a conductive non-aqueous solution, etc.). Solvents in the processing solution may comprise water and/or any other suitable solvent, without limitation. The processing solution may also comprise dissolved electrolytes. Such electrolytes may comprise any suitable electrolyte compounds, including, without limitation, acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and/or any suitable carboxylic acid (e.g., monocarboxylic acid, polycarboxylic acid, etc.), and/or ions, salts, and/or esters of any of the foregoing, and/or any combination of the foregoing. Such electrolytes may be present in the processing solution at any suitable concentration, without limitation. For example, one or more electrolytes may be present in the processing solution at a concentration of, for example, less than approximately 5 M. In certain embodiments, one or more electrolytes may be present in the processing solution at a concentration of, for example, less than approximately 0.01 M. In at least one embodiment, one or more electrolytes may be present in the processing solution at a concentration of, for example, between approximately 0.01 M and approximately 3 M. In some embodiments, one or more electrolytes may be present in the processing solution at a concentration of, for example, between approximately 0.1 M and approximately 1 M. In additional embodiments, one or more electrolytes may be present in the processing solution at a concentration of, for example, between approximately 0.2 M and approximately 0.4 M. In at least one embodiment, one or more electrolytes may be present in the processing solution at a concentration of, for example, approximately 0.3 M. Any of the processing solutions, electrodes, methods, and apparatuses for leaching polycrystalline diamond materials, such as those disclosed in U.S. Provisional Patent Application No. 62/062,533, the disclosure of which is incorporated herein, in its entirety, by this reference, may be used in the methods and apparatuses disclosed herein.

The processing solution may have a pH of between approximately 1 and approximately 12. In certain embodiments, the processing solution may have a pH below approximately 1. In some embodiments, the processing solution may have a pH of between approximately 5 and approximately 8. In at least one embodiment, for example, the processing solution may have a pH of between approximately 6 and approximately 7. A pH of the solution may be selected to prevent and/or inhibit plating of materials (e.g., ion) onto at least a portion of electrode assembly 40 and/or to prevent and/or inhibit corrosion of at least a portion of electrode assembly 40 and/or fixture 70.

In some embodiments, the processing solution may include metal salts, such as sodium salts, cobalt salts, iron salts, nickel salts, copper salts, and/or any other suitable transition metal salts, and/or any other suitable metal ion salts, without limitation. Such metal salts may include, for example, sodium chloride, sodium nitrate, cobalt chloride, cobalt nitrate, iron chloride, and/or any other suitable metal salts, without limitation. One or more metal salts may be present in the processing solution at any suitable concentration, including, for example, a concentration of less than approximately 2 M. In at least one embodiment, one or more metal salts may be present in the processing solution at a concentration of, for example, between approximately 0.01 M and approximately 1 M. In some embodiments, one or more metal salts may be present in the processing solution at a concentration of, for example, between approximately 0.03 M and approximately 0.5 M. In additional embodiments, one or more metal salts may be present in the processing solution at a concentration of, for example, between approximately 0.3 M and approximately 0.10 M. In certain embodiments, one or more metal salts may be present in the processing solution at a concentration of, for example, between approximately 1 M and approximately 8 M. In at least one embodiment, for example, one or more compounds may be dissolved in the processing solution at a concentration of, for example, approximately 2 M.

The processing solution may further include any other suitable components, without limitation, including, for example, a buffering agent (e.g., boric acid, an amine compound such as ethylenediamine, triethanolamine, ethanolamine, etc.), a pH control agent (e.g., sodium hydroxide, etc.), and/or a conducting agent (e.g., sodium sulfate, ammonium citrate, etc.). In some examples, the processing solution may comprise an acid (e.g., a mineral acid) suitable for increasing the solubility of a metallic material, such as cobalt or any other material, with respect to the processing solution, including, for example, nitric acid, hydrochloric acid, phosphoric acid, sulfuric acid, boric acid, hydrofluoric acid, and/or any combination of the foregoing mineral acids. The acid may be selected for its ability to attack and/or dissolve a metallic material within superabrasive table 14. The processing solution may carry the dissolved metallic material out of superabrasive table 14. In some examples, a suitable acid may be configured to increase the solubility of a metallic material or oxides thereof, such as cobalt or cobalt oxide, in the processing mixture, thereby facilitating leaching of the metallic material from superabrasive table 14 using the processing mixture. In additional examples, an acid may be configured to increase the solubility of iron, tungsten, and/or nickel (or oxides thereof) in the processing mixture.

The processing solution may comprise a complexing agent dissolved in the solvent. The complexing agent may comprise a compound suitable for forming metal complexes with various interstitial materials, including, for example, tungsten and/or tungsten carbide. The complexing agent may form metal complexes with tungsten and/or tungsten carbide present in a superabrasive material, thereby inhibiting or preventing the formation and/or build-up of tungsten oxides, such as $WO_2$, $W_2O_5$, and $WO_3$, in the superabrasive material. Metal complexes formed between the complexing agent and tungsten and/or tungsten carbide may be soluble in the processing solution, thereby enabling the metal complexes to be easily removed from superabrasive table 14. Accordingly, the complexing agent may facilitate the removal of tungsten and/or tungsten carbide from a leached portion of superabrasive table 14, thereby reducing the amount of residual tungsten, tungsten carbide, and/or tungsten oxide present in a leached region of superabrasive table 14. The complexing agent may also facilitate removal of additional metal compounds that may be present in superabrasive table 14. Examples of suitable compounds that may function as complexing agents include, without limitation, phosphoric acid, citric acid, tartaric acid, oxalic acid, ammonium chloride, and/or any combination of the foregoing.

In various embodiments, the processing solution may optionally include one or more of an electrolyte (e.g., acetic acid, ammonium chloride, arsenic acid, ascorbic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, carboxylic acid, etc.), an acid (e.g., nitric acid, hydrochloric acid, phosphoric acid, sulfuric acid, boric acid, hydrofluoric acid, etc.), a metal salt (e.g., cobalt salts, iron salts, etc.), a buffering agent (e.g., boric acid, an amine compound such as ethylenediamine, triethanolamine, ethanolamine, etc.), a pH control agent (e.g., sodium hydroxide, etc.), a conducting agent (e.g., sodium sulfate, ammonium citrate, etc.), a complexing agent (e.g., phosphoric acid, citric acid, tartaric acid, oxalic acid, ammonium chloride, etc.), and/or combinations of the foregoing, without limitation.

Electrode assembly 40 may comprise any suitable size, shape, and/or geometry, without limitation. According to at least one embodiment, at least a portion of electrode assembly 40 may be generally cylindrically shaped. For example, electrode assembly 40 may comprise a substantially cylindrical shape having a circular end periphery or non-circular end periphery. Electrode assembly 40 may comprise a suitable electrically conductive material, such as, for example, a metallic, semi-metallic, and/or graphitic material. For example electrode assembly 40 may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge or voltage may be applied between superabrasive element 10 and electrode assembly 40 through electrical conductors 44 and 42, respectively. For example, in order to conduct a current through the processing solution for processing superabrasive element 10, at least a portion of superabrasive element 10 may be positioned in the processing solution and a charge or voltage may be applied to at least a portion of superabrasive element 10 (e.g., rear surface 18 of substrate 12) through electrical conductor 44. For example, at least a portion of superabrasive element 10 may act as an anode and electrode assembly 40 may act as a cathode. In at least one embodiment, electrical conductor 44 may be electrically connected to substrate 12 by being electrically connected to (e.g., positioned abutting) substrate 12. In some embodiments, electrical conductor 44 may be directly connected to superabrasive table 14 by being electrically connected to (e.g., positioned abutting and/or disposed at least partially within) superabrasive table 14.

According to some embodiments, a direct current ("DC") voltage of less than approximately 10 V may be applied between electrode assembly 40 and superabrasive element 10. In some embodiments, a DC voltage of between approximately 0.01 V and approximately 35 V may be applied between electrode assembly 40 and superabrasive element 10. In some embodiments, a DC voltage of between approximately 2 V and approximately 5 V may be applied between electrode assembly 40 and superabrasive element 10. In some embodiments, a DC voltage of between approximately 0.1 V and approximately 3 V may be applied between electrode assembly 40 and superabrasive element 10. In additional embodiments, a DC voltage of between approximately 0.4 V and approximately 2.4 V may be applied between electrode assembly 40 and superabrasive element 10. In various embodiments a DC voltage applied between electrode assembly 40 and superabrasive element 10 may be between approximately 2 V and approximately 5 V, between approximately 5 V and approximately 10 V, between approximately 10 V and approximately 15 V, between approximately 15 V and approximately 20 V, between approximately 20 V and approximately 25 V, between approximately 25 V and approximately 30 V, and/or between approximately 30 V and approximately 35 V.

In some embodiments, a DC voltage of approximately 0.5 V, 0.6 V, 0.7 V, 0.8 V, 0.9 V, or 1.0 V may be applied between electrode assembly 40 and superabrasive element 10. In various embodiments, a voltage applied between electrode assembly 40 and superabrasive element 10 may be changed one or more times while superabrasive element 10 is exposed to or is submerged in the processing solution. For example, the electrical conductivity of the processing solution may change and/or the proximity of electrode assembly 40 to a substantial volume of metallic materials within superabrasive table 14 may decrease (e.g., due to increasing leach depth relative to surface portions of superabrasive table 14) during processing of superabrasive element 10 such that different magnitudes of voltage are selected over time (e.g., to maintain a desired current flow between superabrasive element 10 and electrode assembly 40). In some embodiments, the magnitude of voltage may be increased one or more times during leaching of superabrasive table 14. Any of the voltages disclosed herein may be employed relative to any of the embodiments disclosed herein (e.g., with any electrode disclosed herein). A charge, electrical potential, or voltage applied between electrode assembly 40 and superabrasive element 10 may be applied as a DC, AC, or PDC waveform.

According to some embodiments, a current of between approximately 0.05 A and approximately 40.000 A may be applied between electrode assembly 40 and superabrasive element 10 while superabrasive element 10 is exposed to or is submerged in the processing solution. In some embodiments, a current of between approximately 0.1 A and approximately 500 A may be applied between electrode assembly 40 and superabrasive element 10. In various embodiments, a current of between approximately 1 A and approximately 100 A may be applied between electrode assembly 40 and superabrasive element 10. In additional embodiments, a current of between approximately 4 A and approximately 50 A may be applied between electrode assembly 40 and superabrasive element 10. In some embodiments, a current of approximately 0.096 A, 1.2 A, 1.7 A, 3.7 A, 8 A, 100 A, 141 A, or 307 A may be applied between electrode assembly 40 and superabrasive element 10. According to at least one embodiment, a current density of between approximately 0.01 A/mm$^2$ and approximately 50 A/mm$^2$ may be applied between electrode assembly 40 and superabrasive element 10. In certain embodiments, a current density of between approximately 0.1 A/mm$^2$ and approximately 5 A/mm$^2$ may be applied between electrode assembly 40 and superabrasive element 10. Any of the electrical currents and/or current densities disclosed herein may be employed relative to any of the embodiments disclosed herein (e.g., with any electrode disclosed herein).

When the processing solution flows between superabrasive element 10 and electrode assembly 40 such that at least a portion of superabrasive table 14 and electrode assembly 40 are exposed to the processing solution and a voltage is applied between electrode assembly 40 and superabrasive table 14, interstitial materials may be removed from at least a portion of superabrasive table 14. For example, a metallic material, such as cobalt, present in at least a portion of superabrasive table 14 may be electrolytically oxidized in the presence of an electrical current flowing between superabrasive element 10 and electrode assembly 40. The oxidized metallic material may be incorporated into the processing solution as dissolved metal cations, which are carried with the flowing processing solution.

In some embodiments, after the metal cations (e.g., cobalt cations) are carried away from superabrasive table 14 by the processing solution, the metal cations may be removed so as to enable the processing solution to be reused. In at least one embodiment, dissolved metal cations may be reduced at a separate cathode that is positioned away from superabrasive table 14 and electrode assembly 40 to form a metal coating on a surface portion of the separate cathode.

In additional embodiments, the dissolved metal cations may be combined with other suitable agents to form a precipitate that may be removed from the processing solution. For example, after the processing solution is removed from superabrasive table 14, suitable ions and/or ion forming compounds may be added to the processing solution comprising the dissolved metal cations to form a solid precipitate that is separated from the processing solution by, for instance, allowing the precipitate to settle out of the solution or by filtering the precipitate from the solution. Example of compounds that may be introduced to the processing solution to form a precipitate with the dissolved metal cations (e.g., cobalt cations) may include, without limitation, ammonia, sodium hydroxide, ammonium hydroxide, sodium carbonate, sodium sulphite, ammonium thiocyanate, ammonium phosphate, sodium tetraborate, sodium silicate, potassium ferro (II) cyanide, potassium ferri(III) cyanide, sodium vanadate, potassium permanganate, sodium biselenite, potassium thiocyanate, and/or any other suitable compounds.

In additional embodiments, at least a portion of superabrasive element 10 may act as a cathode and electrode assembly 40 may act as an anode. A metallic material present in superabrasive table 14 may be reduced to form metallic ions, such as metal anions, that are dissolved in the processing solution. For example, cobalt present in superabrasive table 14 may be reduced to form cobalt ions, including, without limitation, cobalt hydroxide ions. In some embodiments, after the dissolved metal anions are carried away from superabrasive table 14 by the processing solution, the dissolved metal anions may be removed so as to enable the processing solution to be reused. For example, the dissolved metal anions may be electrodeposited on a separate anode (e.g., through oxidation onto a surface portion of the anode). In additional embodiments, the dissolved metal anions may be combined with other suitable agents to form a precipitate that may be removed from the processing solution.

According to various embodiments, superabrasive table 14 may be exposed to or submerged in the processing solution at a desired temperature and/or pressure prior to and/or during leaching. Exposing superabrasive table 14 to a selected temperature and/or pressure during leaching may increase the depth to which superabrasive table 14 may be leached. Exposing superabrasive table 14 to a selected temperature and/or pressure during leaching may decrease an amount of time required to leach superabrasive table 14 to a desired degree.

In various examples, at least a portion of superabrasive element 10 and the processing solution may be heated to and/or maintained at a temperature of between approximately 15° C. and approximately 280° C. during leaching. According to additional embodiments, at least a portion of a superabrasive element 10 and the processing solution may be heated to and/or maintained at a temperature of between approximately 20° C. and approximately 95° C. during leaching. For example, at least a portion of a superabrasive element 10 and the processing solution may be heated to and/or maintained at a temperature of approximately 25° C. In some embodiments, at least a portion of a superabrasive element 10 and the processing solution may be heated to and/or maintained at a temperature of between approximately 20° C. and approximately 50° C. during leaching.

In various embodiments, at least a portion of superabrasive element 10 and the processing solution may be exposed to and/or maintained at a pressure of between approximately 0 bar and approximately 100 bar during leaching. In additional embodiments, at least a portion of superabrasive element 10 and the processing solution may be exposed to and/or maintained at a pressure of between approximately 20 bar and approximately 80 bar during leaching. In at least one embodiment, at least a portion of superabrasive element 10 and the processing solution may be exposed to and/or maintained at a pressure of between approximately 0.5 bar and approximately 20 bar during leaching. For example, 0.5 bar may be generated within the processing solution to cause the flow through the gap (e.g., through the electrode and/or fluid port).

According to additional embodiments, at least a portion of superabrasive element 10 and the processing solution may be exposed to at least one of microwave radiation, and/or ultrasonic energy. By exposing at least a portion of superabrasive element 10 to microwave radiation, induction heating, and/or ultrasonic energy as superabrasive element 10 is exposed to or is submerged in the processing solution, the rate at which superabrasive table 14 is leached may be increased.

Figure 10A:
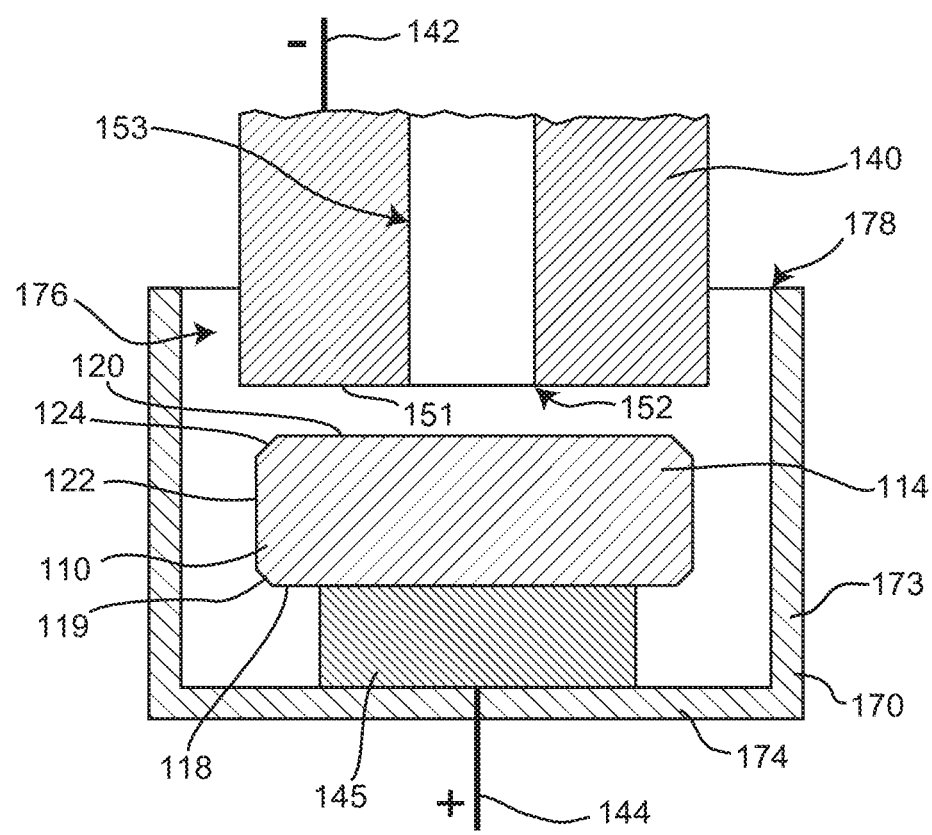
FIG. 10A is a cross-sectional side view of an exemplary superabrasive element disposed near an exemplary electrode assembly and positioned within a processing fixture according to at least one embodiment.
Figure 10B:
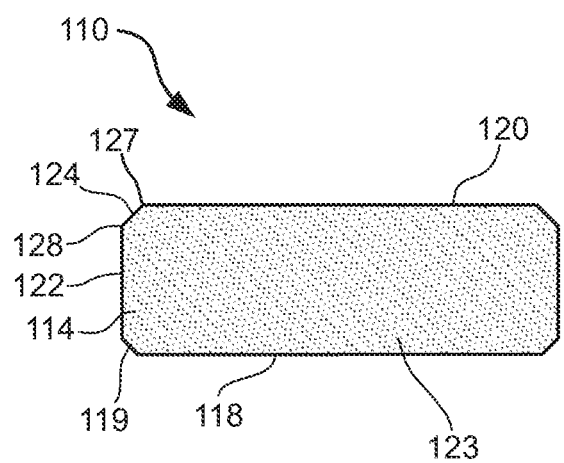
FIG. 10B is a cross-sectional side view of an exemplary leached superabrasive element according to at least one embodiment.
Figure 10C:
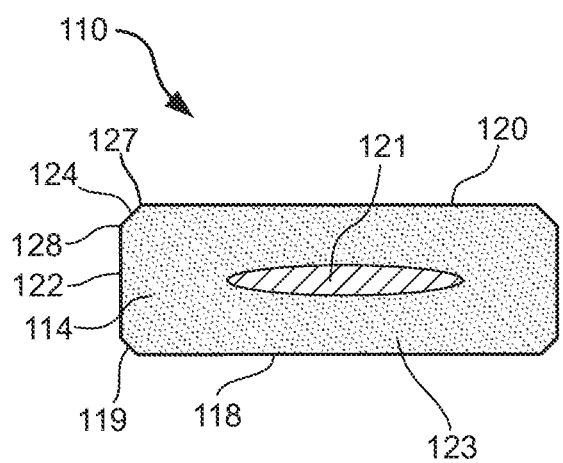
FIG. 10C is a cross-sectional side view of an exemplary leached superabrasive element according to at least one embodiment.

FIGS. 10A-10C show exemplary superabrasive elements 110 and assemblies for leaching superabrasive elements 110. FIG. 10A is a cross-sectional side view of an exemplary leaching assembly according to at least one embodiment. As shown in FIG. 10A, superabrasive element 110 may be disposed near an electrode assembly 140. Superabrasive element 110 may comprise a superabrasive table 114 that is not affixed to or formed upon a substrate (see superabrasive element 110 illustrated in FIGS. 3 and 4). Superabrasive element 110 may comprise a rear surface 118, a superabrasive face 120, and an element side surface 122. Superabrasive element 110 may also comprise a chamfer 124 formed by superabrasive table 114. Chamfer 124 may comprise an angular and/or rounded edge formed between superabrasive side surface 122 and superabrasive face 120. Superabrasive element 110 may also comprise a rear chamfer 119 formed by superabrasive table 114 at the intersection of element side surface 122 and rear surface 118.

In some embodiments, as illustrated in FIG. 10A, superabrasive element 110 may not be surrounded by a protective covering, such as a leaching cup. Optionally, superabrasive element 110 may be at least partially covered by a protective layer, such as a leaching cup and/or a masking layer. Superabrasive element 110 and electrode assembly 140 may be positioned within a processing fixture 170. Processing fixture 170 may have a rear wall 174 and a side wall 173 defining a cavity 176. Rear wall 174 and side wall 173 may have any suitable shape, without limitation. Processing fixture 170 may include an opening 178 opposite rear wall 174. Cavity 176 may contain a suitable processing solution such that at least a portion of superabrasive element 110 is exposed to or is submerged in processing solution. Superabrasive element 110 may be positioned in cavity 176 so that superabrasive element 110 is disposed near electrode assembly 140.

Electrode assembly 140 may comprise any suitable size, shape, and/or geometry, without limitation. According to at least one embodiment, at least a portion of electrode assembly 140 may have a substantially cylindrical shape. In some embodiments, electrode assembly 140 may comprise an electrode formed of an electrically conductive material. For example, at least a portion of electrode assembly 140 disposed near superabrasive element 110 may be substantially composed of a conductive material. In some embodiments, an electrode assembly may include one or more insulated portions, as will be described in greater detail with reference to FIGS. 12-22. Electrode assembly 140 may comprise a suitable electrically conductive material, such as, for example, a metallic, semi-metallic, and/or graphitic material. For example electrode assembly 140 may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

Electrode assembly 140 may have an electrode surface 151 that faces at least a portion of superabrasive table 114. For example, as illustrated in FIG. 10A, electrode surface 151 may comprise a generally planar surface that faces superabrasive face 120 of superabrasive table 114. Electrode surface 151 may also comprise any other suitable surface shape, without limitation, including, for example, a nonplanar, concave, convex, and/or undulating surface. Electrode surface 151 may be positioned substantially parallel or nonparallel to at least a portion of superabrasive table 114, such as superabrasive face 120.

According to at least one embodiment, electrode assembly 140 may include at least one fluid port 152 for conducting (e.g., discharging or drawing) a processing fluid. For example, as shown in FIG. 10A, fluid port 152 may be defined in electrode assembly 140 adjacent to electrode surface 151. Fluid port 152 may be positioned and configured to discharge or draw processing fluid into a gap (see gap G1 illustrated in FIGS. 7 and 8) defined between electrode surface 151 of electrode assembly 140 and superabrasive face 120 of superabrasive table 114 such that the processing fluid passes over at least a portion of superabrasive face 120, chamfer 124, superabrasive side surface 122, rear chamfer 119, and/or rear surface 118. For example, an internal passage 153 that is open to fluid port 152 may be defined within electrode assembly 140. Internal passage 153 may supply a processing fluid from a processing fluid source to fluid port 152 (or vice versa).

According to various embodiments, a charge, voltage, or potential may be applied between superabrasive element 110 and electrode assembly 140 through electrical conductors 144 and 142, respectively. For example, in order to conduct a current through processing solution for processing superabrasive element 110, at least a portion of superabrasive element 110 may be positioned in the processing solution and a charge, voltage, or electrical ground may be applied to at least a portion of superabrasive element 110 (e.g., rear surface 118 of substrate 112) through electrical conductor 144 and an opposite charge, voltage, or electrical ground may be applied to electrode assembly 140 through electrical conductor 142. In some embodiments, as shown in FIG. 10A, superabrasive element 110 may be disposed on an electrode 145, which electrically connects electrical conductor 144 to superabrasive element 110. Electrode 145 may separate superabrasive element 110 from processing fixture 170, thereby facilitating contact between a greater surface area of superabrasive element 110 and the processing solution. Additionally, electrode 145 may facilitate positioning of superabrasive element 110 near electrode assembly 140. Optionally, superabrasive element 110 may be positioned near rear wall 174 of processing fixture 170 and/or may be connected to electrical conductor 144 without electrode 145.

In some embodiments, superabrasive element 110 may be coupled to electrode 145, or optionally, to electrical conductor 144, through brazing, welding, soldering, adhesive bonding, mechanical fastening, and/or any other suitable bonding technique. For example, superabrasive element 110 may be bonded to electrode 145 or electrical conductor 144 by a braze joint (e.g., a carbide forming braze such as a titanium-based braze, a silver containing braze, etc.). In at least one embodiment, such a braze joint may be coated with a protective layer (e.g., paint layer, epoxy layer, etc.) to protect it from the processing solution.

As a processing fluid passes through a gap between superabrasive element 110 and electrode assembly 140 and around each of superabrasive surface 120, chamfer 124, side surface 122, rear chamfer 119, and/or rear surface 118 of superabrasive element 110, the processing fluid may be in electrical communication with each of electrode assembly 140 and superabrasive element 110. When at least a portion of superabrasive element 110 and at least a portion of electrode assembly 140 are exposed to the processing solution flowing around superabrasive element 110 while a voltage is applied between electrode assembly 140 and superabrasive element 110, interstitial materials may be removed from at least a portion of superabrasive element 110.

While FIG. 10A shows a processing fixture 170 having an opening defined at the upper portion of processing fixture 170 near electrode assembly 140, in some embodiments, processing fixture 170 may additionally or alternatively include one or more openings defined in any other suitable portion of processing fixture 170 so as to facilitate the flow of a processing solution with respect to the various surfaces of superabrasive element 110 that are exposed to the processing solution. For example, one or more openings for discharging the processing solution from processing fixture 170 may be defined in at least a portion of rear wall 174 and/or side wall 173 of processing fixture 170.

In at least one embodiment, a positive charge, voltage, or electrical ground may be applied to superabrasive element 110, which acts as an anode, via electrical conductor 144 and electrode 145. An opposite charge, voltage, or electrical ground may be applied to electrode assembly 140 through electrical conductor 142. For example, a negative charge, voltage, or electrical grounding may be applied to electrode assembly 140 such that electrode assembly 140 acts as a cathode. When superabrasive element 110 and electrode assembly 140 are disposed in the flowing processing solution such that at least a portion of superabrasive table 114 and electrode assembly 140 are exposed to the processing solution and a voltage is applied between electrode assembly 140 and superabrasive table 114, interstitial materials may be removed from at least a portion of superabrasive table 114. Superabrasive element 110 may be exposed to or submerged in the processing solution and/or a charge, voltage, or electrical grounding may be applied to the processing solution until a desired level of leaching is obtained.

FIGS. 10B and 10C illustrate superabrasive elements that have been leached to different extents. FIG. 10B shows a superabrasive element 110 that has been leached substantially throughout superabrasive table 114. Accordingly, superabrasive table 114 may have a leached volume 123 that substantially occupies the entire volume of superabrasive table 114. According to various embodiments, at least some of interstitial regions in leached volume 123 may be at least partially filled with interstitial material that is not removed by leaching.

FIG. 10C shows a superabrasive element 110 that has been partially leached. Superabrasive table 114 may include a first volume 121 comprising an interstitial material and a second volume 123 having a lower concentration of the interstitial material than first volume 121. As shown in FIG. 10B, first volume 121 may be surrounded by second volume 123 such that substantially all surface portions (i.e., superabrasive face 120, element side surface 122, chamfer 124, chamfer 119) of superabrasive table 114 are defined by second volume 123, from which the interstitial material has been substantially removed.

Figure 11A:
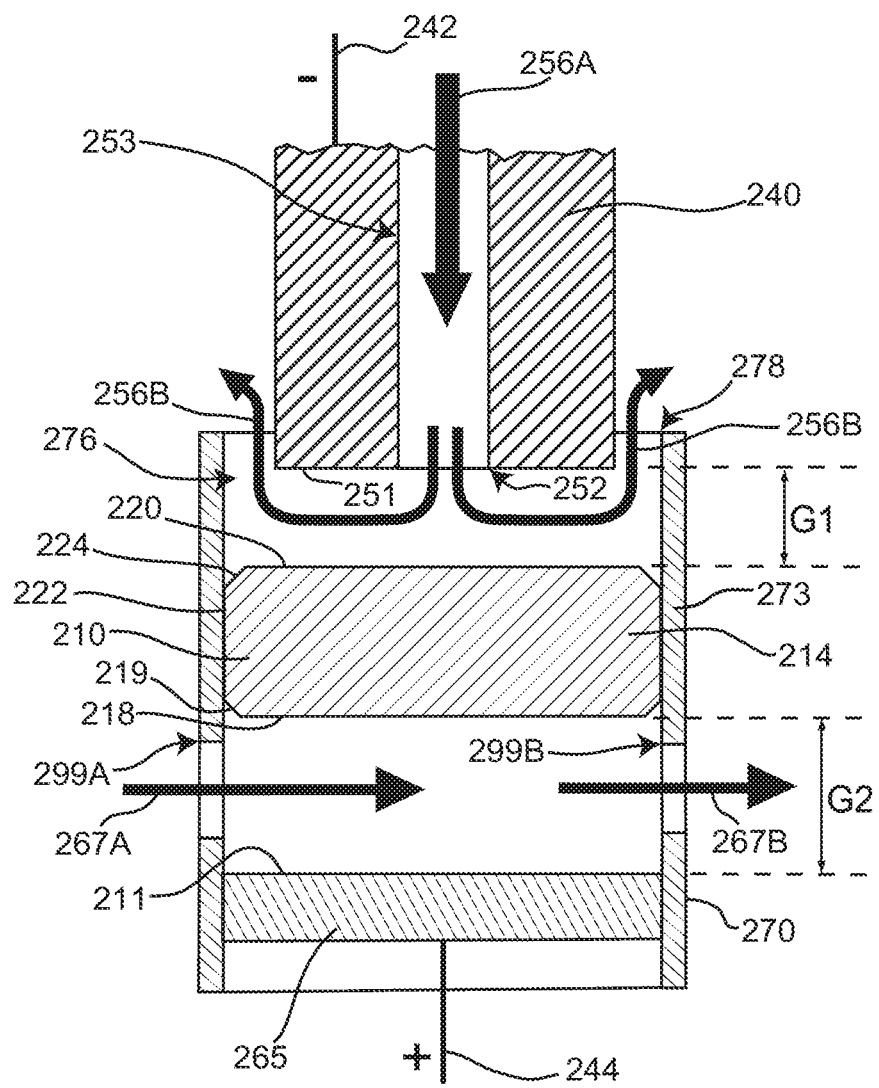
FIG. 11A is a cross-sectional side view of an exemplary superabrasive element disposed near a first electrode assembly and a second electrode assembly and positioned within a processing fixture according to at least one embodiment.

FIG. 11A shows a cross-sectional side view of an exemplary leaching assembly according to various embodiments. As illustrated in FIG. 11A, a superabrasive element 210, a first electrode assembly 240, and a second electrode assembly 265 may be positioned within a processing fixture 270.

Superabrasive element 210 may comprise a superabrasive table 214 that is not affixed to or formed upon a substrate (see superabrasive element 110 illustrated in FIGS. 3 and 4). Superabrasive element 210 may comprise a rear surface 218, a superabrasive face 220, and an element side surface 222. Superabrasive element 210 may also comprise a chamfer 224 formed by superabrasive table 214. Chamfer 224 may comprise an angular and/or rounded edge formed between superabrasive side surface 222 and superabrasive face 220. Superabrasive element 210 may also comprise a rear chamfer 219 formed by superabrasive table 214 at the intersection of element side surface 222 and rear surface 218.

As shown in FIG. 11A, processing fixture 270 may have a side wall 273 defining a cavity 276. Processing fixture 270 may include an opening 278 near first electrode assembly 240. Additionally, processing fixture 270 may include at least one opening, such as openings 299A and 299B, near second electrode assembly 265. While FIG. 11A shows second electrode assembly 265 abutting side wall 273 of processing fixture 270, second electrode assembly 265 may be disposed in any other suitable configuration. For example, second electrode assembly 265 may be disposed away from side wall 273 of processing fixture 270. Accordingly so some embodiments, processing fixture 270 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, processing fixture 270 may comprise polymeric tube formed of PTFE blended with one or more other polymeric materials.

A first processing solution, which is simplistically represented as flowing in general directions 256A and 256B, may be discharged from a fluid port 252 of first electrode assembly 240 such that at least a portion of superabrasive element 210 is exposed to the first processing solution flowing between first electrode assembly 240 and superabrasive table 214. Fluid port 252 may be positioned and configured to discharge or draw the first processing fluid into gap G1 defined between electrode surface 251 of electrode assembly 240 and superabrasive face 220 of superabrasive element 210 such that the first processing fluid passes over at least a portion of superabrasive face 220, chamfer 224, and/or superabrasive side surface 222. For example, an internal passage 253 that is open to fluid port 252 may be defined within electrode assembly 240. Internal passage 253 may supply a processing fluid from a processing fluid source to fluid port 252 (or vice versa).

Superabrasive element 210 may be positioned in cavity 276 so that superabrasive element 210 is positioned abutting or near side wall 273 of processing fixture 270. In some embodiments, a seal member may be disposed between superabrasive element 210 and side wall 273 such that a first processing solution passing over superabrasive face 220 is separated from a second processing solution passing over rear surface 218 of superabrasive element 210. Superabrasive element 210 may be positioned and/or secured within processing fixture 270 using any suitable mechanism, without limitation.

A second processing solution, which is simplistically represented as flowing in general directions 267A and 267B, may be directed between second electrode assembly 265 and superabrasive table 214 from a source external to second electrode assembly 265 such that at least a portion of superabrasive element 210 is exposed to the second processing solution. For example, the second processing solution may be conducted from a fluid source external to fixture 270 through a gap G2 defined between second electrode assembly 265 and superabrasive table 214 via an opening 299A and/or an opening 299B defined in fixture 270.

According to some embodiments, the first and second processing solutions may each comprise a conductive solution (e.g., a conductive aqueous solution, a conductive non-aqueous solution, etc.) in accordance with the processing solutions described in reference to FIG. 9. In at least one embodiment, the first processing solution and the second processing solutions may each comprise different compositions. In various embodiments, the second processing solution, which passes through a gap G2 defined between an electrode surface 211 of second electrode assembly 265 and rear surface 218 of superabrasive element 210, may have a lower conductivity than the first processing solution, which passes through gap G1 defined between an electrode surface 251 of first electrode assembly 240 and superabrasive face 220 of superabrasive element 210.

First electrode assembly 240 and second electrode assembly 265 may each comprise any suitable size, shape, and/or geometry, without limitation. According to at least one embodiment, at least a portion of first electrode assembly 240 and/or at least a portion of second electrode assembly 265 may be generally cylindrically shaped. For example, first electrode assembly 240 may comprise a substantially cylindrical shape having a circular end periphery or non-circular end periphery. In some embodiments, at least a portion of first electrode assembly 240 and/or at least a portion of second electrode assembly 265 may be generally disk-shaped. For example, as shown in in FIG. 11A, second electrode assembly 265 may comprise a substantially disk-shaped electrode.

First electrode assembly 240 and second electrode assembly 265 may each comprise a suitable electrically conductive material, such as, for example, a metallic, semi-metallic, and/or graphitic material. For example first electrode assembly 240 and/or second electrode assembly 265 may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge, voltage, or potential may be applied to first electrode assembly 240 and second electrode assembly 265 through electrical conductors 242 and 244, respectively. For example, in order to conduct a current through the first processing solution, the second processing solution, and superabrasive element 210, the first processing solution may be passed through gap G1 and the second processing solution may be passed through gap G2 while opposite charges are respectively applied to first electrode assembly 240 and second electrode assembly 265. For example, a positive charge, voltage, or potential may be applied to second electrode assembly 265 through electrical conductor 244 such that second electrode assembly 265 acts as an anode. An opposite charge, voltage, or grounding may be applied to first electrode assembly 240 through electrical conductor 242. For example, a negative charge, voltage, or grounding may be applied to first electrode assembly 240 such that first electrode assembly 240 acts as a cathode.

When the first processing solution is passed between superabrasive element 210 and first electrode assembly 240 and the second processing solution is passed between superabrasive element 210 and second electrode assembly 265, and a voltage is applied to the first processing solution, the second processing solution, and superabrasive element 210 via first electrode assembly 240 and second electrode assembly 265, interstitial materials may be removed from at least a portion of superabrasive element 210 by the first processing solution and/or the second processing solution. For example, a metallic material, such as cobalt, present in at least a portion of superabrasive element 210 may be electrolytically oxidized in the presence of an electrical current flowing between first electrode assembly 240, superabrasive element 210, and second electrode assembly 265. The oxidized metallic material may be leached into the first processing solution passing between superabrasive element 210 and first electrode assembly 240 and/or the second processing solution passing between superabrasive element 210 and second electrode assembly 265 as dissolved metal cations, which are removed with the respective flowing processing solutions.

In some embodiments, the second processing solution, which passes through gap G2 defined between electrode surface 211 of second electrode assembly 265 and rear surface 218 of superabrasive element 210, may have a lower conductivity than an interstitial material that is removed from superabrasive element 210. For example, the second processing solution passing through gap G2 may have a lower conductivity than a metal-solvent catalyst material, such as cobalt, that is present in superabrasive element 210. In such a configuration, the path of least electrical resistance through superabrasive element 210 is through the catalyst material present in the superabrasive element 210. Therefore, as catalyst material is leached from superabrasive element 210, electrical current may selectively flow through remaining catalyst material as opposed to flowing through the second processing solution and other materials (e.g., diamond, carbon, graphite) present in superabrasive element 210. Accordingly, the catalyst material may be continually leached from superabrasive element 210 in the presence of an electrical current as the leach depth increases.

Figure 11B:
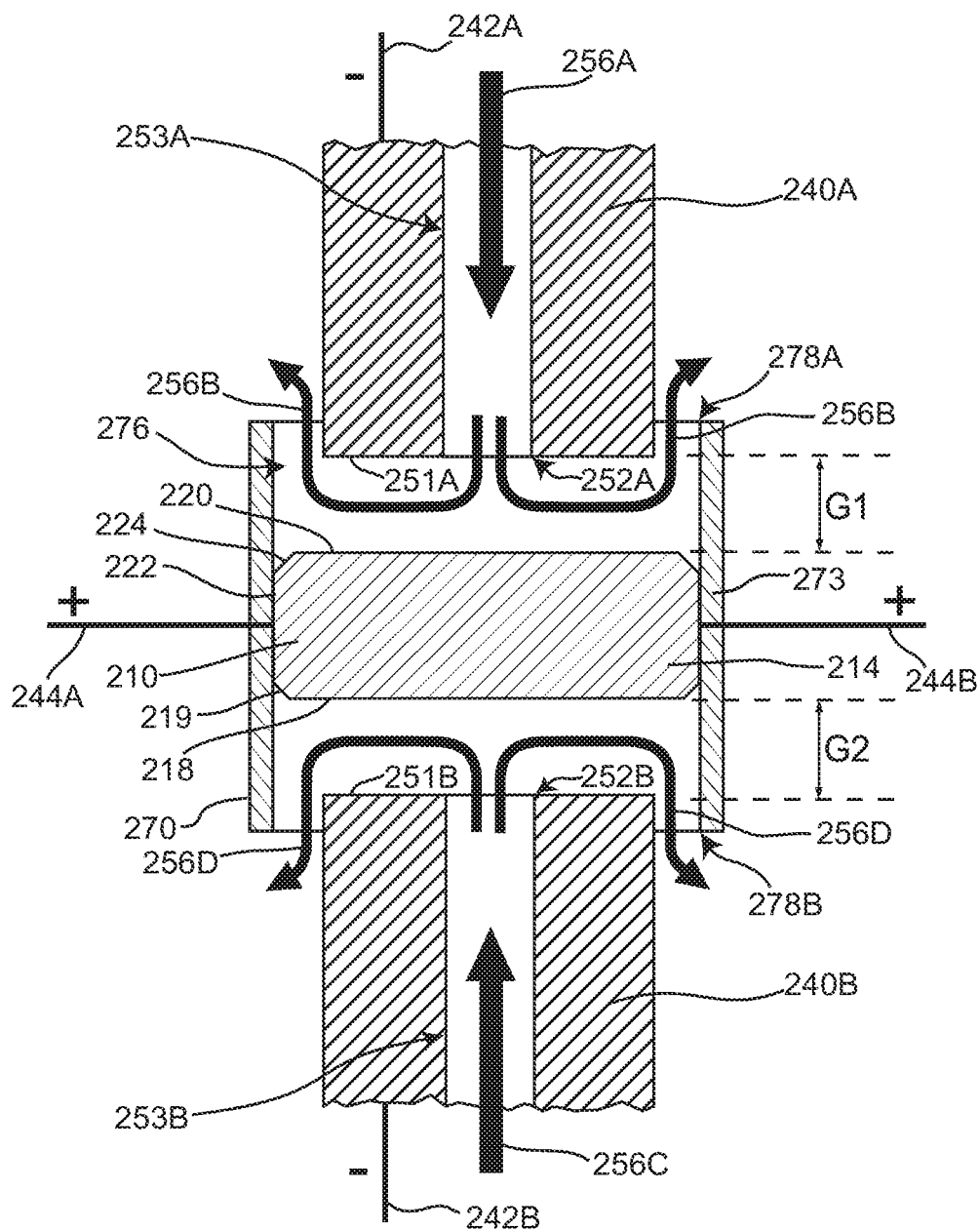
FIG. 11B is a cross-sectional side view of an exemplary superabrasive element disposed near a first electrode assembly and a second electrode assembly and positioned within a processing fixture according to at least one embodiment.

FIG. 11B shows a cross-sectional side view of an exemplary leaching assembly according to various embodiments. As illustrated in FIG. 11B, a superabrasive element 210, a first electrode assembly 240A, and a second electrode assembly 240B may be positioned within a processing fixture 270.

Superabrasive element 210 may comprise a superabrasive table 214 that is not affixed to or formed upon a substrate (see superabrasive element 110 illustrated in FIGS. 3 and 4). Superabrasive element 210 may comprise a rear surface 218, a superabrasive face 220, and an element side surface 222. Superabrasive element 210 may also comprise a chamfer 224 formed by superabrasive table 214. Chamfer 224 may comprise an angular and/or rounded edge formed between superabrasive side surface 222 and superabrasive face 220. Superabrasive element 210 may also comprise a rear chamfer 219 formed by superabrasive table 214 at the intersection of element side surface 222 and rear surface 218.

As shown in FIG. 11B, processing fixture 270 may have a side wall 273 defining a cavity 276. Processing fixture 270 may include a first opening 278A near first electrode assembly 240A. Additionally, processing fixture 270 may include a second opening 278B near second electrode assembly 240B. According so some embodiments, processing fixture 270 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, processing fixture 270 may comprise polymeric tube formed of PTFE blended with one or more other polymeric materials.

A first processing solution, which is simplistically represented as flowing in general directions 256A and 256B, may be discharged from a fluid port 252A of first electrode assembly 240A such that at least a portion of superabrasive element 210 is exposed to the first processing solution flowing between first electrode assembly 240A and superabrasive table 214. Fluid port 252A may be positioned and configured to discharge or draw the first processing fluid into gap G1 defined between electrode surface 251A of electrode assembly 240A and superabrasive face 220 of superabrasive element 210 such that the first processing fluid passes over at least a portion of superabrasive face 220, chamfer 224, and/or superabrasive side surface 222. For example, an internal passage 253A that is open to fluid port 252A may be defined within electrode assembly 240A. Internal passage 253A may supply a processing fluid from a processing fluid source to fluid port 252A (or vice versa).

Superabrasive element 210 may be positioned in cavity 276 so that superabrasive element 210 is positioned abutting or near side wall 273 of processing fixture 270. In some embodiments, a seal member may be disposed between superabrasive element 210 and side wall 273 such that a first processing solution passing over superabrasive face 220 is separated from a second processing solution passing over rear surface 218 of superabrasive element 210. Superabrasive element 210 may be positioned and/or secured within processing fixture 270 using any suitable mechanism, without limitation.

A second processing solution, which is simplistically represented as flowing in general directions 256C and 256D, may be discharged from a fluid port 252B of second electrode assembly 240B such that at least a portion of superabrasive element 210 is exposed to the second processing solution flowing between second electrode assembly 240B and superabrasive element 210. Fluid port 252B may be positioned and configured to discharge or draw the second processing fluid into gap G2 defined between electrode surface 251B of electrode assembly 240B and rear surface 218 of superabrasive element 210 such that the first processing fluid passes over at least a portion of rear surface 218, rear chamfer 219, and/or superabrasive side surface 222. For example, an internal passage 253B that is open to fluid port 252B may be defined within electrode assembly 240B. Internal passage 253B may supply a processing fluid from a processing fluid source to fluid port 252B (or vice versa).

According to some embodiments, the first and second processing solutions may each comprise a conductive solution (e.g., a conductive aqueous solution, a conductive non-aqueous solution, etc.) in accordance with the processing solutions described in reference to FIG. 9. In at least one embodiment, the first processing solution and the second processing solution may each comprise different compositions. In various embodiments, the second processing solution, which passes through a gap G2 defined between an electrode surface 251B of second electrode assembly 240B and rear surface 218 of superabrasive element 210, may have a higher or lower conductivity than the first processing solution, which passes through gap G1 defined between an electrode surface 251A of first electrode assembly 240A and superabrasive face 220 of superabrasive element 210.

First electrode assembly 240A and second electrode assembly 240B may each comprise any suitable size, shape, and/or geometry, without limitation. According to at least one embodiment, at least a portion of first electrode assembly 240A and/or at least a portion of second electrode assembly 240B may be generally cylindrically shaped. For example, first electrode assembly 240A and/or second electrode assembly 240B may comprise a substantially cylindrical shape having a circular end periphery or non-circular end periphery. In some embodiments, at least a portion of first electrode assembly 240A and/or at least a portion of second electrode assembly 240B may be generally disk-shaped.

First electrode assembly 240A and second electrode assembly 240B may each comprise a suitable electrically conductive material, such as, for example, a metallic, semi-metallic, and/or graphitic material. For example first electrode assembly 240A and/or second electrode assembly 240B may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation.

According to various embodiments, a charge, voltage, or potential may be applied to first electrode assembly 240A and second electrode assembly 240B through electrical conductors 242A and 242B, respectively. A charge, voltage, or potential may also be applied to superabrasive elements 210 through electrical conductor 244A and/or 244B. In at least one embodiment, in order to conduct a current through the first processing solution, the second processing solution, and/or superabrasive element 210, the first processing solution may be passed through gap G1 and the second processing solution may be passed through gap G2 while a charge, voltage, or potential is applied to first electrode assembly 240A and second electrode assembly 240B and an opposite charge, voltage, or potential is applied to superabrasive element 210. For example, a positive charge, voltage, or potential may be applied to superabrasive element 210 through electrical conductor 244A and/or 244B such that superabrasive element 210 acts as an anode. An opposite charge, voltage, or grounding may be applied to first electrode assembly 240A and/or second electrode assembly 240B through electrical conductor 242A and/or 242B. For example, a negative charge, voltage, or grounding may be applied to first electrode assembly 240A and second electrode assembly 240B through electrical conductor 242A and 242B, respectively such that first electrode assembly 240A and second electrode assembly 240B each act as a cathode.

When the first processing solution is passed between superabrasive element 210 and first electrode assembly 240A and the second processing solution is passed between superabrasive element 210 and second electrode assembly 240B, and a voltage is applied to the first processing solution and the second processing solution via first electrode assembly 240A, second electrode assembly 240B, and superabrasive element 210, interstitial materials may be removed from at least a portion of superabrasive element 210 by the first processing solution and/or the second processing solution. For example, a metallic material, such as cobalt, present in at least a portion of superabrasive element 210 may be electrolytically oxidized in the presence of an electrical current flowing between first electrode assembly 240A, superabrasive element 210, and second electrode assembly 240B. The oxidized metallic material may be leached into the first processing solution passing between superabrasive element 210 and first electrode assembly 240A and/or the second processing solution passing between superabrasive element 210 and second electrode assembly 240B as dissolved metal ions, which are removed with the respective flowing processing solutions.

Figure 12:
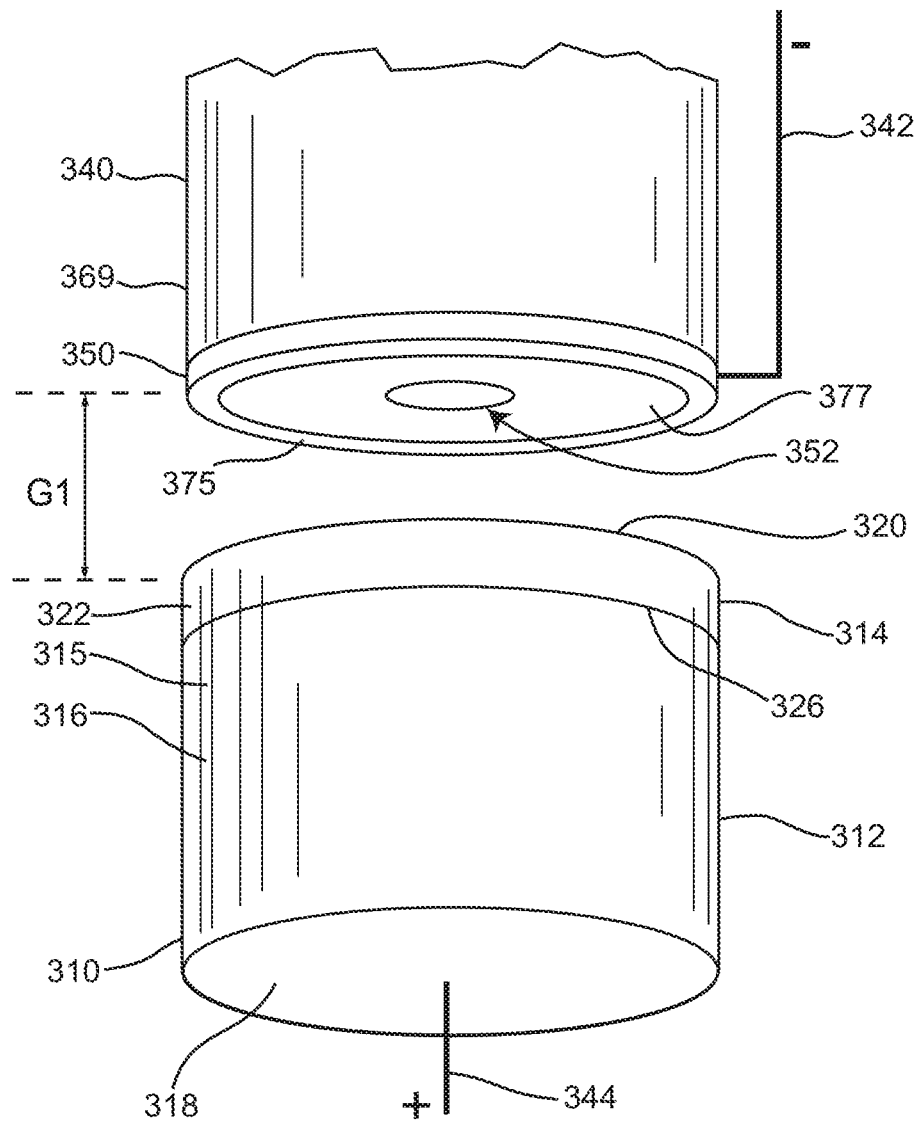
FIG. 12 is a perspective view of an exemplary superabrasive element disposed near an exemplary electrode assembly according to at least one embodiment.
Figure 13:
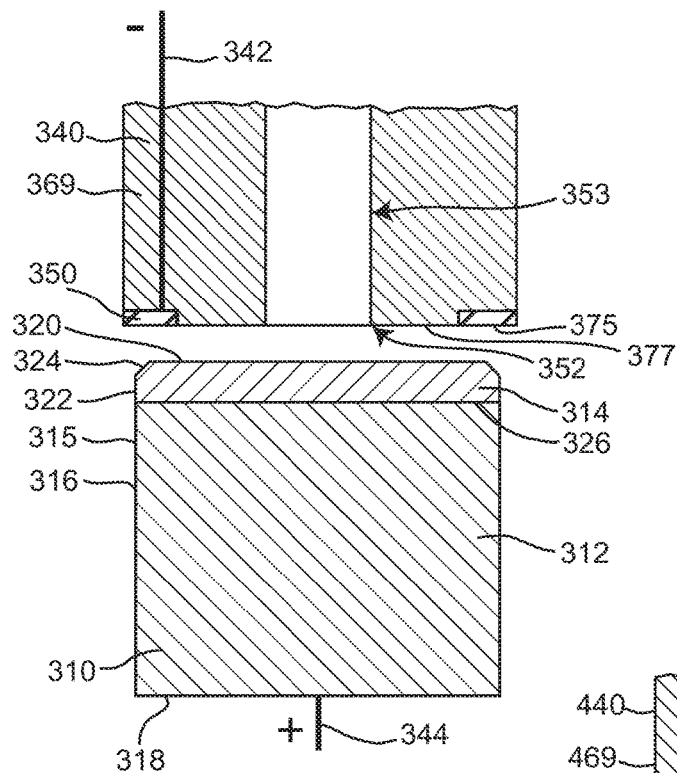
FIG. 13 is a cross-sectional side view of an exemplary superabrasive element disposed near an exemplary electrode assembly according to at least one embodiment.

FIGS. 12 and 13 illustrate an exemplary superabrasive element 310 positioned near an exemplary electrode assembly 340 according to at least one embodiment. As illustrated in FIGS. 12 and 13, superabrasive element 310 may comprise a superabrasive table 314 affixed to or formed upon a substrate 312. Superabrasive table 314 may be affixed to substrate 312 at interface 326, which may be a planar or non-planar interface. Superabrasive element 310 may comprise a rear surface 318, a superabrasive face 320, and an element side surface 315. In some embodiments, element side surface 315 may include a substrate side surface 316 formed by substrate 312 and a superabrasive side surface 322 formed by superabrasive table 314. Rear surface 318 may be formed by substrate 312. Superabrasive element 310 may also comprise a chamfer 324 formed by superabrasive table 314.

Electrode assembly 340 may comprise any suitable size, shape and/or geometry, without limitation. As shown in FIGS. 12 and 13, electrode assembly 340 may include an electrode 350 and an insulation portion 369. According to at least one embodiment, at least a portion of electrode 350 may comprise a substantially annular or ring-shaped body. For example, electrode 350 may comprise a substantially annular ring surrounding a central axis (e.g., central axis 29 shown in FIGS. 1-2). Insulation portion 369 may comprise a substantially non-electrically-conductive material (e.g., having an electrical conductivity that is lower than that of electrode 350).

According to at least one embodiment, electrode assembly 340 may include at least one fluid port 352 for conducting (e.g., discharging or drawing) a processing fluid. For example, as shown in FIGS. 12 and 13, fluid port 352 may be defined in electrode assembly 340 adjacent to insulation surface 377. Fluid port 352 may be positioned and configured to discharge or draw processing fluid into a gap (e.g., gap G1 illustrated in FIG. 7) defined between superabrasive face 320 of superabrasive table 314 and each of electrode surface 375 and insulation surface 377 of electrode assembly 340 such that the processing fluid passes over at least a portion of superabrasive face 320, chamfer 324, and/or superabrasive side surface 322. For example, an internal passage 353 that is open to fluid port 352 may be defined within electrode assembly 340. Internal passage 353 may supply a processing fluid from a processing fluid source to fluid port 352 (or vice versa).

According to various embodiments, a charge, electrical potential, or voltage may be applied between electrode 350 and superabrasive element 310 via electrical conductors (e.g., wires or any suitable electrical conductor) 342 and 344, respectively. In at least one embodiment, electrical conductor 344 may be electrically connected to substrate 312 by being electrically connected to (e.g., positioned abutting) substrate 312. In some embodiments, electrical conductor 344 may be directly connected to superabrasive table 314 by being electrically connected to (e.g., positioned abutting) superabrasive table 314.

As superabrasive element 310 and electrode assembly 340 are exposed to the processing solution such that at least a portion of superabrasive table 314 and electrode 350 are in electrical communication with the processing solution and a voltage is applied between the electrode 350 and superabrasive table 314, interstitial materials may be removed from at least a portion of superabrasive table 314 of superabrasive element 310 exposed to the processing solution. In some embodiments, interstitial materials may be removed to greater depths from surface portions of superabrasive table 314 disposed in relatively closer proximity to electrode 350 than other surface portions of superabrasive table 314. As shown in FIGS. 12 and 13, at least a portion of electrode 350 may comprise a substantially annular or ring-shaped body such that a peripheral region of superabrasive table 314 defining chamfer 324 may be leached to a greater depth than a central region of superabrasive table 314.

FIGS. 14-22 illustrate various superabrasive elements and electrodes in cross-sectional view. The electrodes illustrated in these figures are depicting disk-shaped and/or ring-shaped electrodes (see, e.g., electrode 350 shown in FIG. 13).

Figure 14:
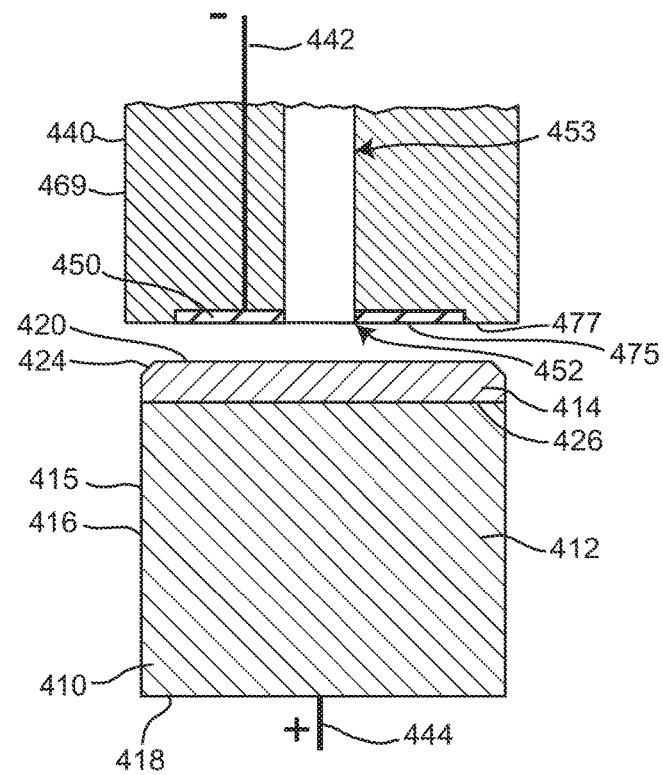
FIG. 14 is a cross-sectional side view of an exemplary superabrasive element disposed near an exemplary electrode assembly according to at least one embodiment.

FIG. 14 illustrates an exemplary superabrasive element 410 positioned near an exemplary electrode assembly 440 according to at least one embodiment. As illustrated in FIG. 14, superabrasive element 410 may comprise a superabrasive table 414 affixed to or formed upon a substrate 412. Superabrasive element 410 may comprise a rear surface 418, a superabrasive face 420, a chamfer 424, and an element side surface 415, which includes a substrate side surface 416 formed by substrate 412 and a superabrasive side surface 422 formed by superabrasive table 414.

Electrode assembly 440 may comprise any suitable size, shape and/or geometry, without limitation. As shown in FIG. 14, electrode assembly 440 may include an electrode 450 and an insulation portion 469. According to at least one embodiment, at least a portion of electrode 450 may comprise a substantially annular or ring-shaped body. For example, electrode 450 may comprise a substantially annular ring surrounding a central axis (e.g., central axis 29 shown in FIGS. 1-2). Insulation portion 469 may comprise a substantially non-electrically-conductive material (e.g., having an electrical conductivity that is lower than that of electrode 450).

According to at least one embodiment, electrode assembly 440 may include at least one fluid port 452 for conducting (e.g., discharging or drawing) a processing fluid. For example, as shown in FIG. 14, fluid port 452 may be defined in electrode assembly 440 adjacent to electrode surface 475. Fluid port 452 may be positioned and configured to discharge or draw processing fluid into a gap (e.g., gap G1 illustrated in FIG. 7) defined between superabrasive face 420 of superabrasive table 414 and each of electrode surface 475 and insulation surface 477 of electrode assembly 440 such that the processing fluid passes over at least a portion of superabrasive face 420, chamfer 424, and/or superabrasive side surface 422. For example, an internal passage 453 defined within electrode assembly 440 may supply a processing fluid from a processing fluid source to fluid port 452 (or vice versa).

According to various embodiments, a charge, voltage, or potential may be applied between electrode 450 and superabrasive element 410 via electrical conductors (e.g., wires or any suitable electrical conductor) 442 and 444, respectively. As superabrasive element 410 and electrode assembly 440 are exposed to the processing solution such that at least a portion of superabrasive table 414 and electrode 450 are in electrical communication with the processing solution and a voltage is applied between electrode 450 and superabrasive table 414, interstitial materials may be removed from at least a portion of superabrasive table 414 of superabrasive element 410 exposed to the processing solution. In some embodiments, interstitial materials may be removed to greater depths from surface portions of superabrasive table 414 disposed in relatively closer proximity to electrode 450 than other surface portions of superabrasive table 414. Accordingly, a central region of superabrasive table 414 adjacent to superabrasive face 420 may be leached to a greater depth than an outer peripheral region adjacent to superabrasive face 420.

Figure 15:
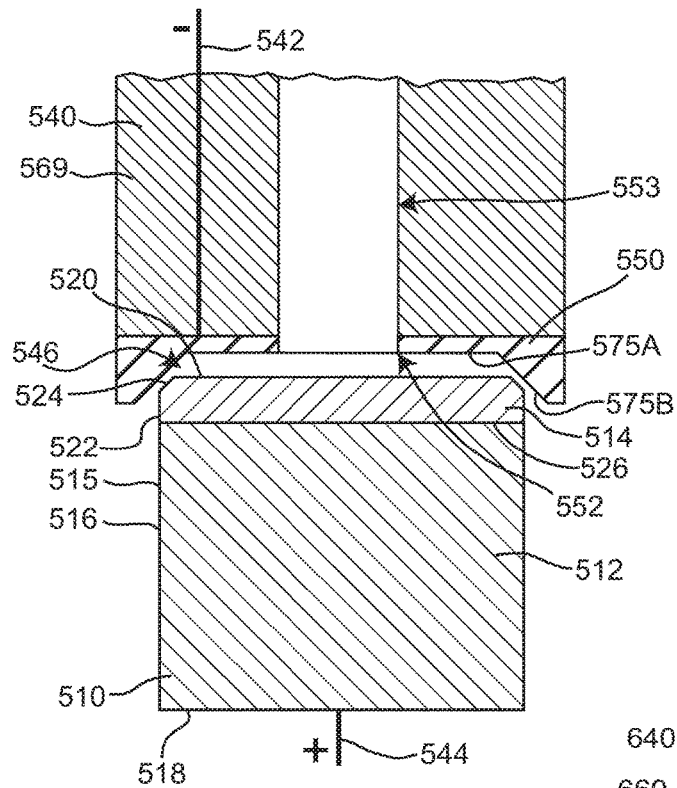
FIG. 15 is a cross-sectional side view of an exemplary superabrasive element disposed near an exemplary electrode assembly according to at least one embodiment.

FIG. 15 illustrates an exemplary superabrasive element 510 positioned near an exemplary electrode assembly 540 according to at least one embodiment. As illustrated in FIG. 15, superabrasive element 510 may comprise a superabrasive table 514 affixed to or formed upon a substrate 512. Superabrasive element 510 may comprise a rear surface 518, a superabrasive face 520, a chamfer 524, and an element side surface 515, which includes a substrate side surface 516 formed by substrate 512 and a superabrasive side surface 522 formed by superabrasive table 514.

Electrode assembly 540 may comprise any suitable size, shape and/or geometry, without limitation. As shown in FIG. 15, electrode assembly 540 may include an electrode 550 and an insulation portion 569. Insulation portion 569 may comprise a substantially non-electrically-conductive material (e.g., having an electrical conductivity that is lower than that of electrode 550). According to at least one embodiment, at least a portion of electrode 550 may comprise a substantially cylindrical shape defining a recess 546. For example, electrode 550 may comprise a substantially cylindrical outer surface, as illustrated in FIG. 15. Recess 546 may be defined within electrode 550 by a first electrode surface 575A and a second electrode surface 575B and may have a diameter that is greater than the outer diameter of element side surface 515 of superabrasive element 510. As shown in FIG. 15, second electrode surface 575B may face chamfer 524 of superabrasive table 514. In some embodiments, second electrode surface 575B may be located nearest to superabrasive table 514 in comparison with other portions of electrode assembly 540. Second electrode surface 575B may be configured so as to maintain a selected gap distance between second electrode surface 575B and chamfer 524. For example, at least a portion of second electrode surface 575B may generally follow a surface contour of chamfer 524. Additionally, second electrode surface 575B may be oriented at substantially the same angle as chamfer 524.

Electrode 550 may be disposed such that at least a portion of recess 546 surrounds at least a portion of superabrasive table 514 of superabrasive element 510, as shown in FIG. 15. Electrode assembly 540 may also include at least one fluid port 552 for conducting (e.g., discharging or drawing) a processing fluid. For example, as shown in FIG. 15, fluid port 552 may be defined in electrode assembly 540 adjacent to first electrode surface 575A. Fluid port 552 may be positioned and configured to discharge or draw processing fluid into a gap (e.g., gap G1 illustrated in FIG. 7) defined between superabrasive table 514 and electrode assembly 540 such that the processing fluid passes over at least a portion of superabrasive face 520, chamfer 524, and/or superabrasive side surface 522. For example, an internal passage 553 defined within electrode assembly 540 may supply a processing fluid from a processing fluid source to fluid port 552 (or vice versa). In other embodiments, fluid port 552 may draw processing fluid into internal passage 553 such that the processing fluid passes over at least a portion of superabrasive face 520.

According to various embodiments, a charge, voltage, or potential may be applied between electrode 550 and superabrasive element 510 via electrical conductors (e.g., wires or any suitable electrical conductor) 542 and 544, respectively. As superabrasive element 510 and electrode assembly 540 are exposed to the processing solution such that at least a portion of superabrasive table 514 and electrode 550 are in electrical communication with the processing solution and a voltage is applied between electrode 550 and superabrasive table 514, interstitial materials may be removed from at least a portion of superabrasive table 514 of superabrasive element 510 exposed to the processing solution. Second electrode surface 575B may be located nearest to chamfer 524 in comparison with other portions of electrode assembly 540. Because second electrode surface 575B is located near chamfer 524, a flow velocity of processing fluid over chamfer 524 may be increased in comparison with other portions of superabrasive table 514 due to the narrower passageway between second electrode surface 575B and chamfer 524. Accordingly, a peripheral region of superabrasive table 514 defining chamfer 524 may be leached to a greater depth than a central region of superabrasive table 514.

Figure 16:
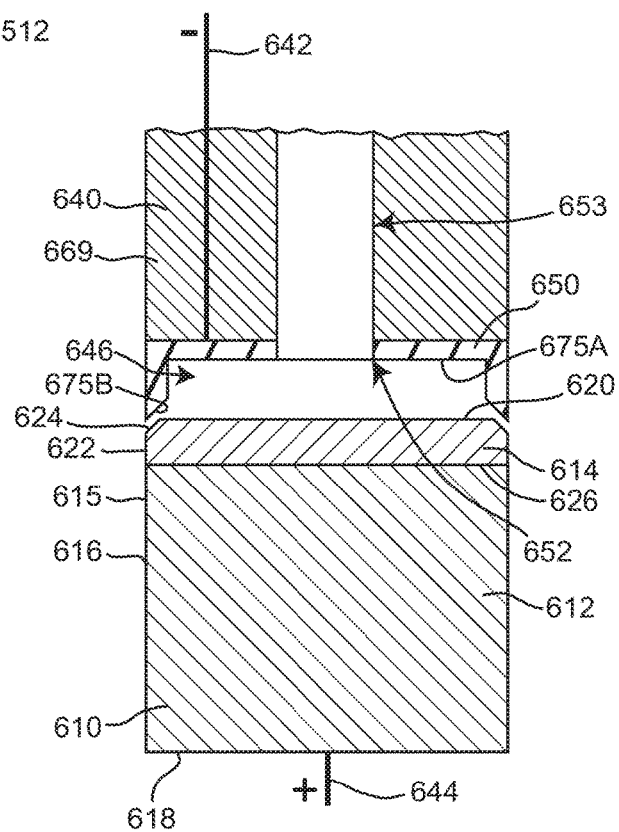
FIG. 16 is a cross-sectional side view of an exemplary superabrasive element disposed near an exemplary electrode assembly according to at least one embodiment.

FIG. 16 illustrates an exemplary superabrasive element 610 positioned near an exemplary electrode assembly 640 according to at least one embodiment. As illustrated in FIG. 16, superabrasive element 610 may comprise a superabrasive table 614 affixed to or formed upon a substrate 612. Superabrasive element 610 may comprise a rear surface 618, a superabrasive face 620, a chamfer 624, and an element side surface 615, which includes a substrate side surface 616 formed by substrate 612 and a superabrasive side surface 622 formed by superabrasive table 614.

Electrode assembly 640 may comprise any suitable size, shape and/or geometry, without limitation. As shown in FIG. 16, electrode assembly 640 may include an electrode 650 and an insulation portion 669. Insulation portion 669 may comprise a substantially non-electrically-conductive material (e.g., having an electrical conductivity that is lower than that of electrode 650). According to at least one embodiment, at least a portion of electrode 650 may comprise a substantially cylindrical shape defining a recess 646. For example, electrode 650 may comprise a substantially cylindrical outer surface, as illustrated in FIG. 16. Recess 646 may be defined within electrode 650 by a first electrode surface 675A, a second electrode surface 675B, and a third electrode surface 675C. As shown in FIG. 16, third electrode surface 675C may face chamfer 624 of superabrasive table 614. In some embodiments, third electrode surface 675C may be located nearest to superabrasive table 614 in comparison with other portions of electrode assembly 640. Third electrode surface 675C may be configured so as to maintain a selected gap distance between third electrode surface 675C and chamfer 624. For example, at least a portion of third electrode surface 675C may generally follow a surface contour of chamfer 624. Additionally, third electrode surface 675C may be oriented at substantially the same angle as chamfer 624.

Electrode assembly 640 may also include at least one fluid port 652 for conducting (e.g., discharging or drawing) a processing fluid. For example, as shown in FIG. 16, fluid port 652 may be defined in electrode assembly 640 adjacent to first electrode surface 675A. Fluid port 652 may be positioned and configured to discharge or draw processing fluid into a gap (e.g., gap G1 illustrated in FIG. 7) defined between superabrasive table 614 and electrode assembly 640 such that the processing fluid passes over at least a portion of superabrasive face 620, chamfer 624, and/or superabrasive side surface 622. For example, an internal passage 653 defined within electrode assembly 640 may supply a processing fluid from a processing fluid source to fluid port 652 (or vice versa).

According to various embodiments, a charge, voltage, or potential may be applied between electrode 650 and superabrasive element 610 via electrical conductors (e.g., wires or any suitable electrical conductor) 642 and 644, respectively. As superabrasive element 610 and electrode assembly 640 are exposed to the processing solution such that at least a portion of superabrasive table 614 and electrode 650 are in electrical communication with the processing solution and a voltage is applied between electrode 650 and superabrasive table 614, interstitial materials may be removed from at least a portion of superabrasive table 614 of superabrasive element 610 exposed to the processing solution. Third electrode surface 675C may be located nearest to chamfer 624 in comparison with other portions of electrode assembly 640. Because third electrode surface 675C is located near chamfer 624, a flow velocity of processing fluid over chamfer 624 may be increased in comparison with other portions of superabrasive table 614 due to the narrower passageway between third electrode surface 675C and chamfer 624. Accordingly, a peripheral region of superabrasive table 614 defining chamfer 624 may be leached to a greater depth than a central region of superabrasive table 614.

FIG. 17 illustrates an exemplary superabrasive element 710 positioned near an exemplary electrode assembly 740 according to at least one embodiment. As illustrated in FIG. 17, superabrasive element 710 may comprise a superabrasive table 714 affixed to or formed upon a substrate 712. Superabrasive element 710 may comprise a rear surface 718, a superabrasive face 720, a chamfer 724, and an element side surface 715, which includes a substrate side surface 716 formed by substrate 712 and a superabrasive side surface 722 formed by superabrasive table 714.

Electrode assembly 740 may comprise any suitable size, shape and/or geometry, without limitation. As shown in FIG. 17, electrode assembly 740 may include an electrode 750 and an insulation portion 769. Insulation portion 769 may comprise a substantially non-electrically-conductive material (e.g., having an electrical conductivity that is lower than that of electrode 750). According to at least one embodiment, at least a portion of electrode 750 may comprise a substantially cylindrical shape with a peripheral recess 748 defined therein and extending circumferentially around at least a peripheral portion of electrode 750. For example, peripheral recess 748 may be defined between a face of electrode 750 located nearest superabrasive element 710 and an outer peripheral surface of electrode 750, as illustrated in FIG. 17.

Electrode assembly 740 may also include at least one fluid port 752 for conducting (e.g., discharging or drawing) a processing fluid. For example, as shown in FIG. 17, fluid port 752 may be defined in electrode assembly 740 by electrode 750. Fluid port 752 may be positioned and configured to discharge or draw processing fluid into a gap (e.g., gap G1 illustrated in FIG. 7) defined between superabrasive face 720 of superabrasive table 714 and electrode surface 775 of electrode assembly 740 such that the processing fluid passes over at least a portion of superabrasive face 720, chamfer 724, and/or superabrasive side surface 722. For example, an internal passage 753 defined within electrode assembly 740 may supply a processing fluid from a processing fluid source to fluid port 752 (or vice versa).

According to various embodiments, a charge, voltage, or potential may be applied between electrode 750 and superabrasive element 710 via electrical conductors (e.g., wires or any suitable electrical conductor) 742 and 744, respectively. As superabrasive element 710 and electrode assembly 740 are exposed to the processing solution such that at least a portion of superabrasive table 714 and electrode 750 are in electrical communication with the processing solution and a voltage is applied between electrode 750 and superabrasive table 714, interstitial materials may be removed from at least a portion of superabrasive table 714 of superabrasive element 710 exposed to the processing solution.

FIG. 18 illustrates an exemplary superabrasive element 810 positioned near an exemplary electrode assembly 840 according to at least one embodiment. As illustrated in FIG. 18, superabrasive element 810 may comprise a superabrasive table 814 affixed to or formed upon a substrate 812. Superabrasive element 810 may comprise a rear surface 818, a superabrasive face 820, a chamfer 824, and an element side surface 815, which includes a substrate side surface 816 formed by substrate 812 and a superabrasive side surface 822 formed by superabrasive table 814.

Electrode assembly 840 may comprise any suitable size, shape and/or geometry, without limitation. As shown in FIG. 18, electrode assembly 840 may include an electrode 850 and an insulation portion 869. Insulation portion 869 may comprise a substantially non-electrically-conductive material (e.g., having an electrical conductivity that is lower than that of electrode 850). Electrode 850 may be annular or ring-shaped and electrical conductor 842 may be electrically connected to electrode 850 at one or more locations. For example, electrode 850 may comprise sections or portions of an annular or ring-shaped body, and electrical conductor 842 may be electrically connected to each section.

According to at least one embodiment, at least a portion of electrode 850 may comprise a substantially tilted annular or ring-shaped body. For example, electrode 850 may comprise an annular ring surrounding a central axis (e.g., central axis 29 shown in FIGS. 1-2) and tilted at an angle, as illustrated in FIG. 18. Electrode 850 may be disposed in a position such that at least a portion of electrode 850 surrounds at least a portion of superabrasive table 814 of superabrasive element 810, such as chamfer 824, as shown in FIG. 18. In some embodiments, electrode 850 may be tilted at substantially the same angle as chamfer 824 such that electrode surface 875 faces chamfer 824. As shown in FIG. 18, electrode surface 875 may face chamfer 824 of superabrasive table 814. In some embodiments, electrode surface 875 may be located nearest to superabrasive table 814 in comparison with other portions of electrode assembly 840. Electrode surface 875 may be configured so as to maintain a selected gap distance between electrode surface 875 and chamfer 824. For example, at least a portion of electrode surface 875 may generally follow a surface contour of chamfer 824. Additionally, electrode surface 875 may be oriented at substantially the same angle as chamfer 824.

Electrode assembly 840 may also include at least one fluid port 852 for conducting (e.g., discharging or drawing) a processing fluid. For example, as shown in FIG. 18, fluid port 852 may be defined in electrode assembly 840 by insulation portion 869 adjacent to insulation surface 877. Fluid port 852 may be positioned and configured to discharge or draw processing fluid into a gap (e.g., gap G1 illustrated in FIG. 7) defined between superabrasive table 814 and electrode assembly 840 such that the processing fluid passes over at least a portion of superabrasive face 820, chamfer 824, and/or superabrasive side surface 822. For example, an internal passage 853 defined within electrode assembly 840 may supply a processing fluid from a processing fluid source to fluid port 852 (or vice versa).

According to various embodiments, a charge, voltage, or potential may be applied between electrode 850 and superabrasive element 810 via electrical conductors (e.g., wires or any suitable electrical conductor) 842 and 844, respectively. As superabrasive element 810 and electrode assembly 840 are exposed to the processing solution such that at least a portion of superabrasive table 814 and electrode 850 are in electrical communication with the processing solution and a voltage is applied between electrode 850 and superabrasive table 814, interstitial materials may be removed from at least a portion of superabrasive table 814 of superabrasive element 810 exposed to the processing solution. In some embodiments, interstitial materials may be removed to greater depths from surface portions of superabrasive table 814 disposed in relatively closer proximity to electrode 850 than other surface portions of superabrasive table 814. Electrode surface 875 may be located nearest to chamfer 824 in comparison with other portions of electrode assembly 840. Because electrode surface 875 is located near chamfer 824, a flow velocity of processing fluid over chamfer 824 may be increased in comparison with other portions of superabrasive table 814 due to the narrower passageway between second electrode surface 875 and chamfer 824. Accordingly, a peripheral region of superabrasive table 814 defining chamfer 824 may be leached to a greater depth than a central region of superabrasive table 814.

Figure 19:
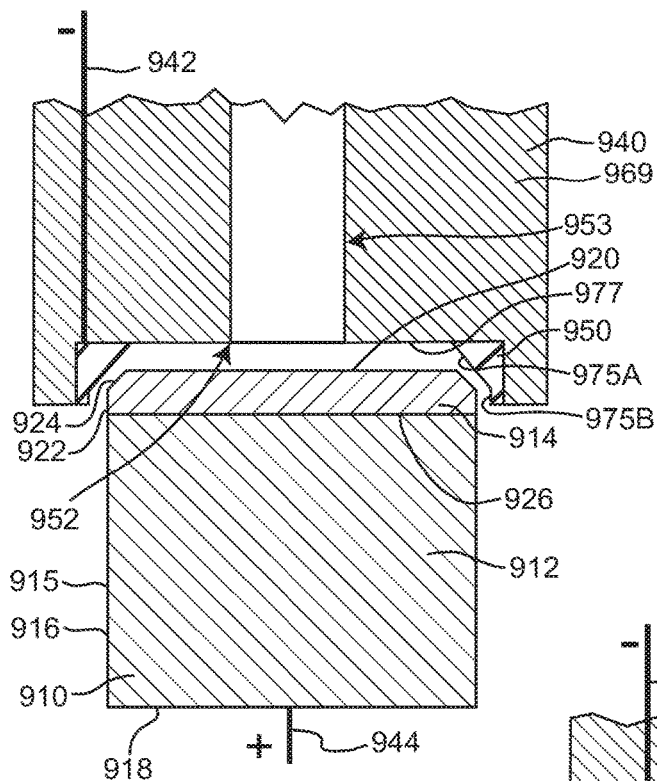
FIG. 19 is a cross-sectional side view of an exemplary superabrasive element disposed near an exemplary electrode assembly according to at least one embodiment.

FIG. 19 illustrates an exemplary superabrasive element 910 positioned near an exemplary electrode assembly 940 according to at least one embodiment. As illustrated in FIG. 19, superabrasive element 910 may comprise a superabrasive table 914 affixed to or formed upon a substrate 912. Superabrasive element 910 may comprise a rear surface 918, a superabrasive face 920, a chamfer 924, and an element side surface 915, which includes a substrate side surface 916 formed by substrate 912 and a superabrasive side surface 922 formed by superabrasive table 914.

Electrode assembly 940 may comprise any suitable size, shape and/or geometry, without limitation. As shown in FIG. 19, electrode assembly 940 may include an electrode 950 and an insulation portion 969. Insulation portion 969 may comprise a substantially non-electrically-conductive material (e.g., having an electrical conductivity that is lower than that of electrode 950). Electrode 950 may be annular or ring-shaped and electrical conductor 942 may be electrically connected to electrode 950 at one or more locations. For example, electrode 950 may comprise sections or portions of an annular or ring-shaped body, and electrical conductor 942 may be electrically connected to each section. In at least one embodiment, electrical conductor 944 may be electrically connected to substrate 912 by being electrically connected to (e.g., positioned abutting) substrate 912. In some embodiments, electrical conductor 944 may be directly connected to superabrasive table 914 by being electrically connected to (e.g., positioned abutting) superabrasive table 914. In at least one embodiment, electrode 950 may have an inner diameter that is greater than the outer diameter of element side surface 915 of superabrasive element 910. Electrode 950 may be disposed in a position such that at least a portion of electrode 950 surrounds at least a portion of superabrasive table 914 of superabrasive element 910 with a first electrode surface 975A facing superabrasive side surface 922 and a second electrode surface 975B facing chamfer 924. As shown in FIG. 19, second electrode surface 975B may face chamfer 924 of superabrasive table 914. In some embodiments, second electrode surface 975B may be located nearest to superabrasive table 914 in comparison with other portions of electrode assembly 940. Second electrode surface 975B may be configured so as to maintain a selected gap distance between second electrode surface 975B and chamfer 924. For example, at least a portion of second electrode surface 975B may generally follow a surface contour of chamfer 924. Additionally, second electrode surface 975B may be oriented at substantially the same angle as chamfer 924.

Electrode assembly 940 may also include at least one fluid port 952 for conducting (e.g., discharging or drawing) a processing fluid. For example, as shown in FIG. 19, fluid port 952 may be defined in electrode assembly 940 by insulation portion 969 adjacent to insulation surface 977. Fluid port 952 may be positioned and configured to discharge or draw processing fluid into a gap (e.g., gap G1 illustrated in FIG. 7) defined between superabrasive table 914 and electrode assembly 940 such that the processing fluid passes over at least a portion of superabrasive face 920, chamfer 924, and/or superabrasive side surface 922. For example, an internal passage 953 defined within electrode assembly 940 may supply a processing fluid from a processing fluid source to fluid port 952 (or vice versa).

According to various embodiments, a charge, voltage, or potential may be applied between electrode 950 and superabrasive element 910 via electrical conductors (e.g., wires or any suitable electrical conductor) 942 and 944, respectively. As superabrasive element 910 and electrode assembly 940 are exposed to the processing solution such that at least a portion of superabrasive table 914 and electrode 950 are in electrical communication with the processing solution and a voltage is applied between electrode 950 and superabrasive table 914, interstitial materials may be removed from at least a portion of superabrasive table 914 of superabrasive element 910 exposed to the processing solution. In some embodiments, interstitial materials may be removed to greater depths from surface portions of superabrasive table 914 disposed in relatively closer proximity to electrode 950 than other surface portions of superabrasive table 914. In some embodiments, second electrode surface 975B may be located nearest to chamfer 924 in comparison with other portions of electrode assembly 940. Because second electrode surface 975B is located near chamfer 924, a flow velocity of processing fluid over chamfer 924 may be increased in comparison with other portions of superabrasive table 914 due to the narrower passageway between second electrode surface 975B and chamfer 924. Accordingly, a peripheral region of superabrasive table 914 defining chamfer 924 may be leached to a greater depth than a central region of superabrasive table 914.

Figure 20:
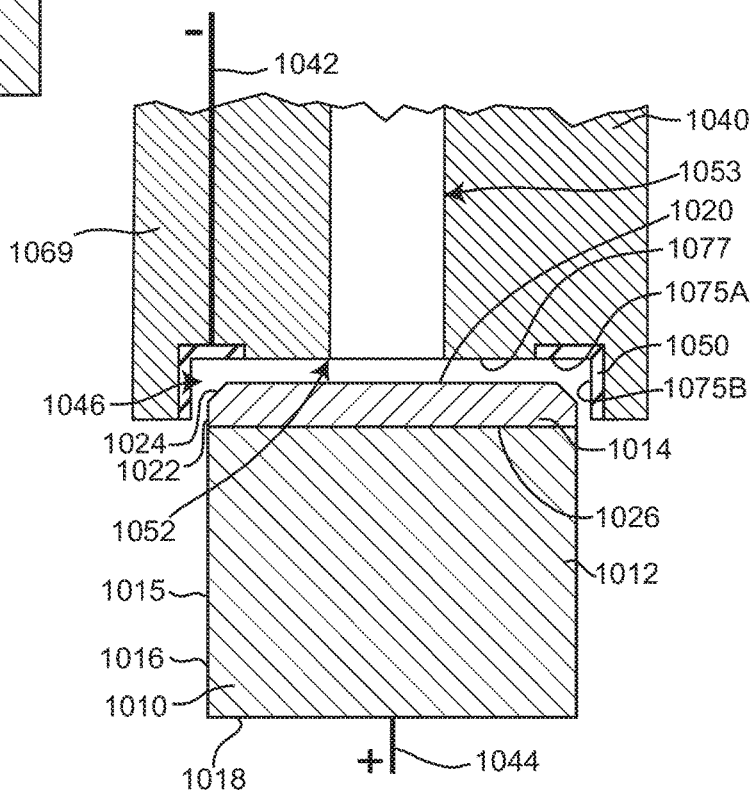
FIG. 20 is a cross-sectional side view of an exemplary superabrasive element disposed near an exemplary electrode assembly according to at least one embodiment.

FIG. 20 illustrates an exemplary superabrasive element 1010 positioned near an exemplary electrode assembly 1040 according to at least one embodiment. As illustrated in FIG. 20, superabrasive element 1010 may comprise a superabrasive table 1014 affixed to or formed upon a substrate 1012. Superabrasive element 1010 may comprise a rear surface 1018, a superabrasive face 1020, a chamfer 1024, and an element side surface 1015, which includes a substrate side surface 1016 formed by substrate 1012 and a superabrasive side surface 1022 formed by superabrasive table 1014.

Electrode assembly 1040 may comprise any suitable size, shape and/or geometry, without limitation. As shown in FIG. 20, electrode assembly 1040 may include an electrode 1050 and an insulation portion 1069. Insulation portion 1069 may comprise a substantially non-electrically-conductive material (e.g., having an electrical conductivity that is lower than that of electrode 1050). Electrode 1050 may be annular or ring-shaped and electrical conductor 1042 may be electrically connected to electrode 1050 at one or more locations. For example, electrode 1050 may comprise sections or portions of an annular or ring-shaped body, and electrical conductor 1042 may be electrically connected to each section. In at least one embodiment, electrical conductor 1044 may be electrically connected to substrate 1012 by being electrically connected to (e.g., positioned abutting) substrate 1012. In some embodiments, electrical conductor 1044 may be directly connected to superabrasive table 1014 by being electrically connected to (e.g., positioned abutting) superabrasive table 1014.

According to at least one embodiment, at least a portion of electrode 1050 may comprise a substantially annular or ring-shaped body and may define a recess 1046, as illustrated in FIG. 20. Recess 1046 may be defined within electrode 1050 by a first electrode surface 1075A and a second electrode surface 1075B and may have a diameter that is greater than the outer diameter of element side surface 1015 of superabrasive element 1010. In at least one embodiment, electrode 1050 may have an inner diameter that is greater than the outer diameter of element side surface 1015 of superabrasive element 1010. Electrode 1050 may be disposed in a position such that at least a portion of recess 1046 of electrode 1050 surrounds at least a portion of superabrasive table 1014 of superabrasive element 1010, as shown in FIG. 20.

Electrode assembly 1040 may also include at least one fluid port 1052 for conducting (e.g., discharging or drawing) a processing fluid. For example, as shown in FIG. 20, fluid port 1052 may be defined in electrode assembly 1040 by insulation portion 1069 adjacent to insulation surface 1077. Fluid port 1052 may be positioned and configured to discharge or draw processing fluid into a gap (e.g., gap G1 illustrated in FIG. 7) defined between superabrasive table 1014 and electrode assembly 1040 such that the processing fluid passes over at least a portion of superabrasive face 1020, chamfer 1024, and/or superabrasive side surface 1022. For example, an internal passage 1053 defined within electrode assembly 1040 may supply a processing fluid from a processing fluid source to fluid port 1052 (or vice versa).

According to various embodiments, a charge, voltage, or potential may be applied between electrode 1050 and superabrasive element 1010 via electrical conductors (e.g., wires or any suitable electrical conductor) 1042 and 1044, respectively. As superabrasive element 1010 and electrode assembly 1040 are exposed to the processing solution such that at least a portion of superabrasive table 1014 and electrode 1050 are in electrical communication with the processing solution and a voltage is applied between electrode 1050 and superabrasive table 1014, interstitial materials may be removed from at least a portion of superabrasive table 1014 of superabrasive element 1010 exposed to the processing solution. In some embodiments, interstitial materials may be removed to greater depths from surface portions of superabrasive table 1014 disposed in relatively closer proximity to electrode 1050 than other surface portions of superabrasive table 1014. Accordingly, a peripheral region of superabrasive table 1014 defining chamfer 1024 may be leached to a greater depth than a central region of superabrasive table 1014.

FIG. 21 illustrates an exemplary superabrasive element 1110 positioned near an exemplary electrode assembly 1140 according to at least one embodiment. As illustrated in FIG. 21, superabrasive element 1110 may comprise a superabrasive table 1114 affixed to or formed upon a substrate 1112. Superabrasive element 1110 may comprise a rear surface 1118, a superabrasive face 1120, a chamfer 1124, and an element side surface 1115, which includes a substrate side surface 1116 formed by substrate 1112 and a superabrasive side surface 1122 formed by superabrasive table 1114.

Electrode assembly 1140 may comprise any suitable size, shape and/or geometry, without limitation. As shown in FIG. 21, electrode assembly 1140 may include a first electrode 1150A having a first electrode surface 1175A, a second electrode 1150B having a second electrode surface 11501B, and an insulation portion 1169 having an insulation surface 1177 extending between first electrode 1150A and second electrode 1150B. Insulation portion 1169 may comprise a substantially non-electrically-conductive material (e.g., having an electrical conductivity that is lower than that of each of first electrode 1150A and a second electrode 1150B). At least a portion of first electrode 1150A and/or second electrode 1150B may be annular or ring-shaped and electrical conductor 1142 may be electrically connected to first electrode 1150A and second electrode 1150B. For example, second electrode 1143 may comprise sections or portions of an annular or ring-shaped body, and electrical conductor 1142 may be electrically connected to each section. In at least one embodiment, electrical conductor 1144 may be electrically connected to substrate 1112 by being electrically connected to (e.g., positioned abutting) substrate 1112. In some embodiments, electrical conductor 1144 may be directly connected to superabrasive table 1114 by being electrically connected to (e.g., positioned abutting) superabrasive table 1114.

Electrode assembly 1140 may also include at least one fluid port 1152 for conducting (e.g., discharging or drawing) a processing fluid. For example, as shown in FIG. 21, fluid port 1152 may be defined in electrode assembly 1140 by first electrode 1150A. Fluid port 1152 may be positioned and configured to discharge or draw processing fluid into a gap (e.g., gap G1 illustrated in FIG. 7) defined between superabrasive table 1114 and electrode assembly 1140 such that the processing fluid passes over at least a portion of superabrasive face 1120, chamfer 1124, and/or superabrasive side surface 1122. For example, an internal passage 1153 defined within electrode assembly 1140 may supply a processing fluid from a processing fluid source to fluid port 1152 (or vice versa).

According to various embodiments, a charge, voltage, or potential may be applied to first electrode 1150A and/or second electrode 1150B and superabrasive element 1110 via electrical conductors (e.g., wires or any suitable electrical conductor) 1142 and 1144, respectively. As superabrasive element 1110 and electrode assembly 1140 are exposed to the processing solution such that at least a portion of superabrasive table 1114, first electrode 1150A, and/or second electrode 1150B are in electrical communication with the processing solution and a voltage is applied between electrode first electrode 1150A and/or second electrode 1150B and superabrasive table 1114, interstitial materials may be removed from at least a portion of superabrasive table 1114 of superabrasive element 1110 exposed to the processing solution. In some embodiments, interstitial materials may be removed to greater depths from surface portions of superabrasive table 1114 disposed in relatively closer proximity to first electrode 1150A and/or second electrode 1150B than other surface portions of superabrasive table 1114.

FIG. 22 illustrates an exemplary superabrasive element 1210 positioned near an exemplary electrode assembly 1240 according to at least one embodiment. As illustrated in FIG. 22, superabrasive element 1210 may comprise a superabrasive table 1214 affixed to or formed upon a substrate 1212. Superabrasive table 1214 may be affixed to substrate 1212 at interface 1226. Superabrasive element 1210 may comprise a rear surface 1218, a superabrasive face 1220, and an element side surface 1215. In some embodiments, element side surface 1215 may include a substrate side surface 1216 formed by substrate 1212 and a superabrasive side surface 1222 formed by superabrasive table 1214. Rear surface 1218 may be formed by substrate 1212. Superabrasive element 1210 may also comprise a chamfer 1224 formed by superabrasive table 1214.

Electrode assembly 1240 may comprise any suitable size, shape and/or geometry, without limitation. As shown in FIG. 22, electrode assembly 1240 may include an electrode 1250, a first insulation layer 1269A, and a second insulation layer 1269B. According to at least one embodiment, first insulation layer 1269A and second insulation layer 1269B may be disposed over select surface portions of electrode 1250 such that at least a portion of electrode 1250 is exposed. For example, a substantially annular or ring-shaped surface portion 1275 of electrode 1250 may be exposed between first insulation layer 1269A and second insulation layer 1269B. As illustrated in FIG. 22, first insulation layer 1269A may be disposed around an outer periphery of electrode 1250 and second insulation layer 1269B may be disposed over a portion of electrode 1250 facing superabrasive element 1210. According to various embodiments, insulation layers may be arranged over any selected surface portions of electrode 1250 so as to leave desired portions of electrode 1250 (e.g., an central surface region) exposed during processing. First insulation layer 1269A and second insulation layer 1269B may each comprise substantially non-electrically-conductive materials (e.g., having electrical conductivities that are lower than that of electrode 1250).

According to at least one embodiment, electrode assembly 1240 may include at least one fluid port 1252 for conducting (e.g., discharging or drawing) a processing fluid. For example, as shown in FIG. 22, fluid port 1252 may be defined in second insulation layer 1269B of electrode assembly 1240 adjacent to insulation surface 1277. Fluid port 1252 may be positioned and configured to discharge or draw processing fluid into a gap (e.g., gap G1 illustrated in FIG. 7) defined between superabrasive table 1214 and electrode assembly 1240 such that the processing fluid passes over at least a portion of superabrasive face 1220, chamfer 1224, and/or superabrasive side surface 1222. For example, an internal passage 1253 may supply a processing fluid from a processing fluid source to fluid port 1252 (or vice versa).

According to various embodiments, a charge, voltage, or potential may be applied between electrode 1250 and superabrasive element 1210 via electrical conductors (e.g., wires or any suitable electrical conductor) 1242 and 1244, respectively. In at least one embodiment, electrical conductor 1244 may be electrically connected to substrate 1212 by being electrically connected to (e.g., positioned abutting) substrate 1212. In some embodiments, electrical conductor 1244 may be directly connected to superabrasive table 1214 by being electrically connected to (e.g., positioned abutting) superabrasive table 1214.

As superabrasive element 1210 and electrode assembly 1240 are exposed to the processing solution such that at least a portion of superabrasive table 1214 and electrode 1250 are in electrical communication with the processing solution and a voltage is applied between exposed surface portion 1275 of electrode 1250 and superabrasive table 1214, interstitial materials may be removed from at least a portion of superabrasive table 1214 of superabrasive element 1210 exposed to the processing solution. In some embodiments, interstitial materials may be removed to greater depths from surface portions of superabrasive table 1214 disposed in relatively closer proximity to the exposed surface portion 1275 of electrode 1250 than other surface portions of superabrasive table 1214. Accordingly, a peripheral region of superabrasive table 1214 at or near chamfer 1224 may be leached to a greater depth than a central region of superabrasive table 1214.

Figure 23:
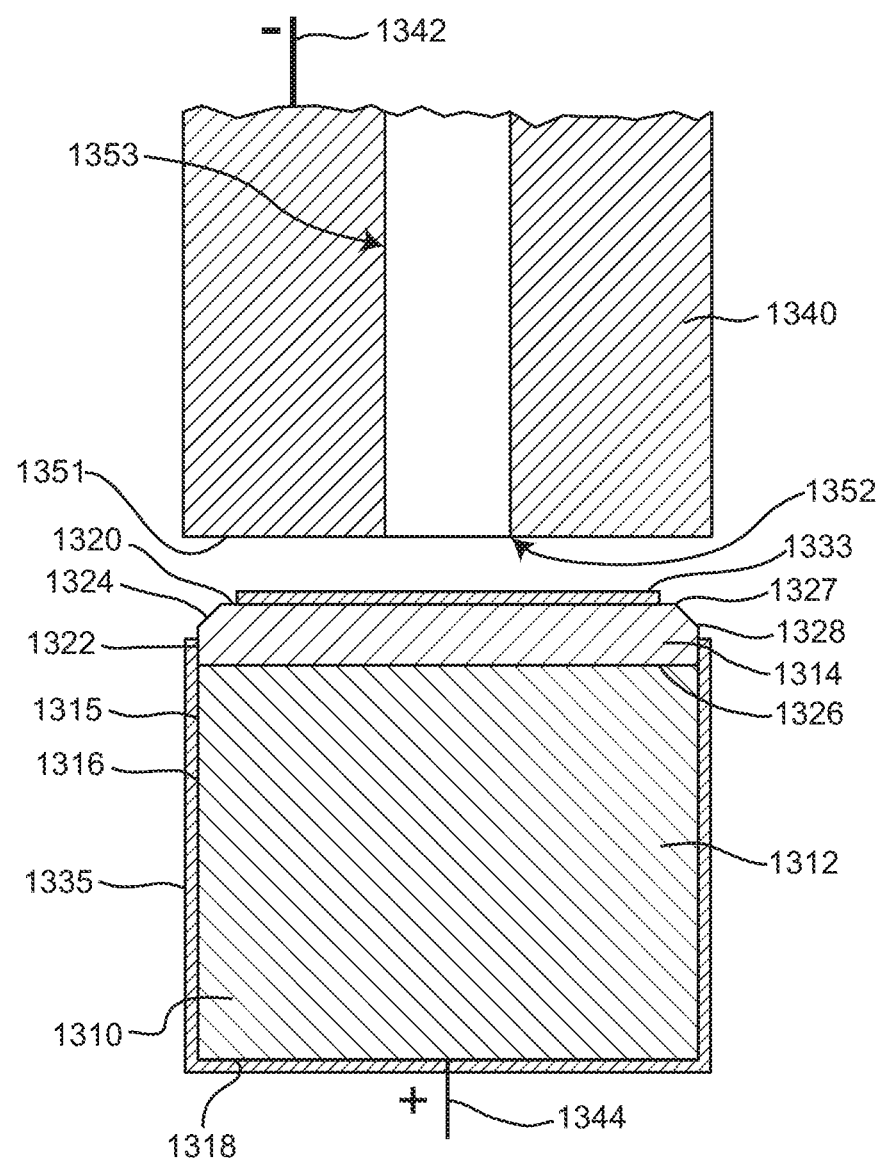
FIG. 23 is a cross-sectional side view of an exemplary superabrasive element coated with a masking layer and disposed near an exemplary electrode assembly according to at least one embodiment.

FIG. 23 shows an exemplary superabrasive element 1310 coated with masking layers and disposed near an exemplary electrode assembly 1340. According to various embodiments, portions of superabrasive element 1310 may be coated or otherwise covered with one or more masking layers that prevent and/or delay a leaching agent from contacting selected regions of superabrasive element 1310 during leaching. For example, a first masking layer 1333 and a second masking layer 1335 may be formed on or disposed abutting at least a portion of superabrasive element 1310.

As illustrated in FIG. 23, superabrasive element 1310 may comprise a superabrasive table 1314 affixed to or formed upon a substrate 1312. Superabrasive table 1314 may be affixed to substrate 1312 at interface 1326. Superabrasive element 1310 may comprise a rear surface 1318, a superabrasive face 1320, and an element side surface 1315, which may include a substrate side surface 1316 formed by substrate 1312 and a superabrasive side surface 1322 formed by superabrasive table 1314. Superabrasive element 1310 may also comprise a chamfer 1324 formed by superabrasive table 1314.

As shown in FIG. 23, first masking layer 1333 may be disposed on at least a portion of superabrasive face 1320, such as a central portion of superabrasive face 1320 surrounding a central axis (e.g., central axis 29 shown in FIGS. 1-2). Second masking layer 1335 may be disposed on at least a portion of element side surface 1315 and rear surface 1318 of superabrasive element 1310 so as to surround at least a portion of superabrasive table 1314 and/or substrate 1312. First masking layer 1333 and second masking layer 1335 may prevent or limit damage to selected portions of superabrasive element 1310 and may provide a desired leach profile when superabrasive element 1310 is leached. For example, first masking layer 1333 and/or second masking layer 1335 may prevent or delay a leaching solution from contacting certain portions of superabrasive element 1310, such as portions of substrate 1312, portions of superabrasive table 1314, or both, during leaching.

In various examples, first masking layer 1333 and/or second masking layer 1335 may comprise one or more materials that are substantially inert and/or otherwise resistant and/or impermeable to acids, bases, and/or other leaching techniques used to leach superabrasive element 1310. Optionally, first masking layer 1333 and/or second masking layer 1335 may comprise a material that breaks down or degrades in the presence of a leaching agent, such as a material that is at least partially degraded (e.g., at least partially dissolved) at a selected rate during exposure to the leaching agent.

In some embodiments, first masking layer 1333 and/or second masking layer 1335 may comprise one or more materials exhibiting significant stability during exposure to a leaching agent. According to various embodiments, first masking layer 1333 and second masking layer 1335 may comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. First masking layer 1333 and second masking layer 1335 may be affixed to superabrasive element 1310 through any suitable mechanism, without limitation, including, for example, direct bonding, bonding via an intermediate layer, such as an adhesive or braze joint, mechanical attachment, such as mechanical fastening, frictional attachment, and/or interference fitting. In some embodiments, first masking layer 1333 and/or second masking layer 1335 may comprise a coating or layer of material that is formed on or otherwise adhered to at least a portion of superabrasive element 1310. In additional embodiments, first masking layer 1333 and/or second masking layer 1335 may comprise a material that is temporarily fixed to superabrasive element 1310. For example, first masking layer 1333 may comprise a polymer member (e.g., o-ring, gasket, disk) that is mechanically held in place (e.g., by clamping) during exposure to a leaching agent.

First masking layer 1333 and second masking layer 1335 may be formed over any suitable portions superabrasive element 1310. For example, as illustrated in FIG. 23, first masking layer 1333 may be formed over a central portion of superabrasive face 1320 about a central axis (e.g., central axis 29 shown in FIGS. 1-2). First masking layer 1333 may be separated from chamfer 1324. For example, first masking layer 1333 may not be directly adjacent to and/or in contact with edge 1327 formed at the intersection of superabrasive face 1320 and chamfer 1324. Second masking layer 1333 may be formed over at least a portion of substrate 1312 and superabrasive table 1314. For example, as shown in FIG. 23, second masking layer 1335 may be formed over rear surface 1318 and substrate side surface 1316 of substrate 1312 so as to substantially surround substrate 1312. Optionally, second masking layer 1335 may be formed over a portion of superabrasive side surface 1322. In some embodiments, second masking layer 1335 may also be separated or spaced a distance from chamfer 1324. For example, second masking layer 1335 may not be directly adjacent to and/or in contact with edge 1328 formed at the intersection of superabrasive side surface 1322 and chamfer 1324.

According to various embodiments, a charge, voltage, or potential may be applied between superabrasive element 1310 and electrode assembly 1340 through electrical conductors (e.g., wires or any suitable electrical conductor) 1344 and 1342, respectively. For example, in order to conduct a current through processing solution for processing superabrasive element 1310, superabrasive element 1310 and electrical conductor 1344 may be exposed the processing solution (e.g., optionally, with a leaching cup 30 or other protective covering) and a charge, voltage, or potential may be applied between at least a portion of substrate 1312 (e.g., rear surface 1318) of superabrasive element 1310 and electrode assembly 1340 through electrical conductor 1344 and electrical conductor 1342. In at least one embodiment, electrical conductor 1344 may be electrically connected to substrate 1312 by being electrically connected to (e.g., positioned abutting) substrate 1312. In some embodiments, electrical conductor 1344 may be directly connected to superabrasive table 1314 by being electrically connected to (e.g., positioned abutting) superabrasive table 1314.

Electrode assembly 1340 may comprise any suitable size, shape, and/or geometry, without limitation. According to at least one embodiment, at least a portion of electrode assembly 1340 may have a substantially cylindrical shape, as illustrated in FIG. 23. In some embodiments, electrode assembly 1340 may include an electrode comprising an electrically conductive material. For example, at least a portion of electrode assembly 1340 disposed near superabrasive element 1310 may be substantially composed of an electrically conductive material. Electrode assembly 1340 may have an outer diameter that is larger than, the same as, or smaller than the outer diameter of element side surface 1315 of superabrasive element 1310. Electrode assembly 1340 may have an electrode surface 1351 that faces at least a portion of superabrasive table 1314.

Electrode assembly 1340 may also include at least one fluid port 1352 for conducting (e.g., discharging or drawing) a processing fluid. For example, as shown in FIG. 23, fluid port 1352 may be defined in electrode assembly 1340 adjacent to electrode surface 1351. Fluid port 1352 may be positioned and configured to discharge or draw processing fluid into a gap (e.g., gap GJ illustrated in FIG. 7) defined between superabrasive table 1314 and electrode assembly 1340 such that the processing fluid passes over at least a portion of superabrasive face 1320, chamfer 1324, and/or superabrasive side surface 1322. For example, an internal passage 1353 defined within electrode assembly 1340 may supply a processing fluid from a processing fluid source to fluid port 1352 (or vice versa).

Electrode assemblies according to any of the configurations disclosed herein may also be utilized in addition to or in place of electrode assembly 1340 for processing superabrasive element 1310. When superabrasive element 1310 and electrode assembly 1340 are exposed to a processing solution and a voltage is applied between electrode assembly 1340 and superabrasive table 1314, interstitial materials may be removed from at least a portion of superabrasive table 1314 of superabrasive element 1310 exposed to the processing solution and disposed near electrode assembly 1340.

The configuration illustrated in FIG. 23 may enable selective leaching of portions of superabrasive element 1310 to form a desired leach profile within superabrasive table 1314. For example, a volume of superabrasive table 1314 adjacent to an uncovered region between first masking layer 1333 and second masking layer 1335 may be leached to a greater depth than surrounding portions of superabrasive table 1314 covered by first masking layer 1333 and second masking layer 1335. The configuration illustrated in FIG. 23 may result in the formation of leached volumes in portions of superabrasive table 1314 located near chamfer 1324 during leaching. In some embodiments, the leached volumes may extend from chamfer 1324 to a region adjacent to and/or abutting interface 1326.

Following exposure to a leaching solution, first masking layer 1333 and/or second masking layer 1335 may be substantially removed from superabrasive table 1314 and/or substrate 1312 using any suitable technique, including, for example, lapping, grinding, and/or removal using suitable chemical agents. According to certain embodiments, first masking layer 1333 and/or second masking layer 1335 may be peeled, cut, ground, lapped, and/or otherwise physically, thermally, or chemically removed from superabrasive element 1310. In some embodiments, following or during removal of first masking layer 1333 and/or second masking layer 1335, one or more surfaces of superabrasive table 1314 and/or substrate 1312 may be processed to form a desired surface texture and/or finish using any suitable technique, including, for example, lapping, grinding, lasing, and/or otherwise physically and/or chemically treating the one or more surfaces.

Figure 24:
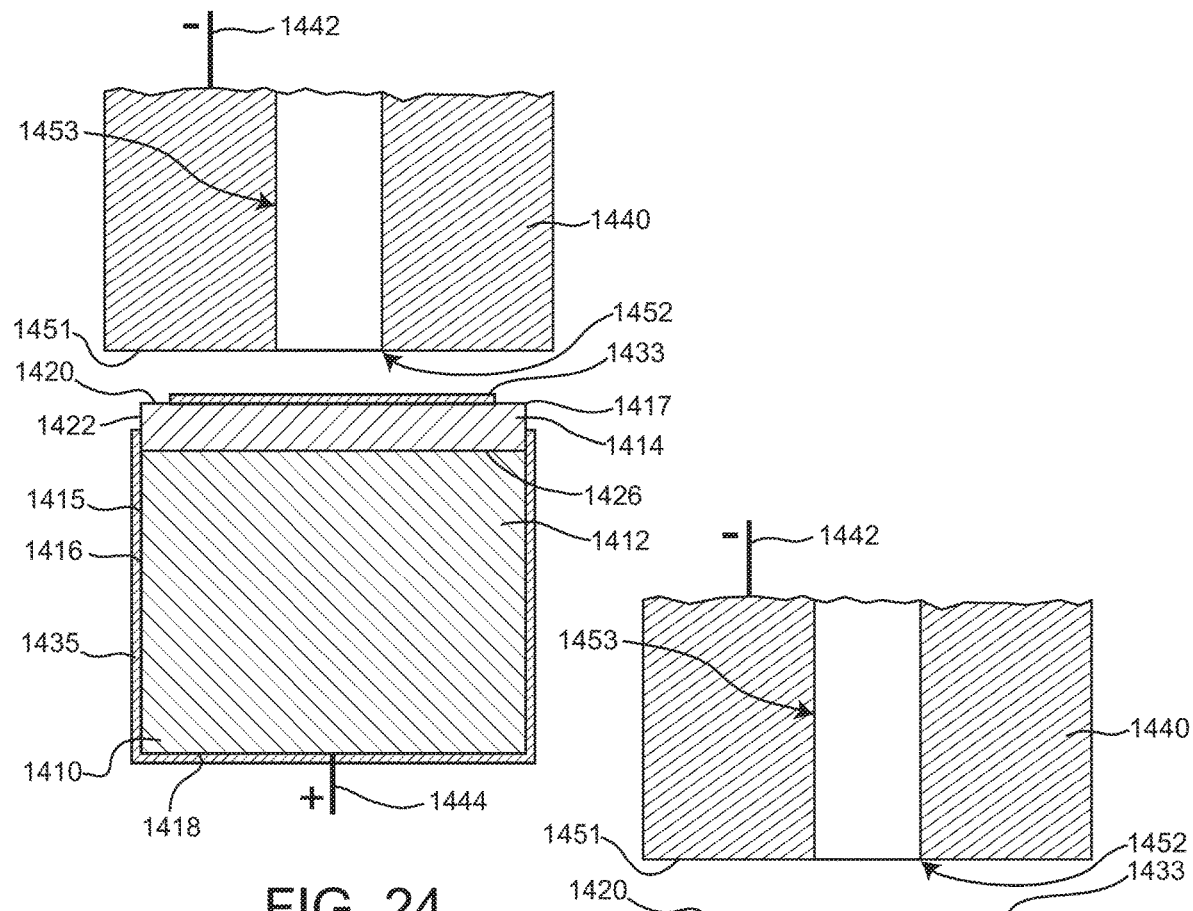
FIG. 24 is a cross-sectional side view of an exemplary superabrasive element coated with a masking layer and disposed near an exemplary electrode assembly according to at least one embodiment.
Figure 25:
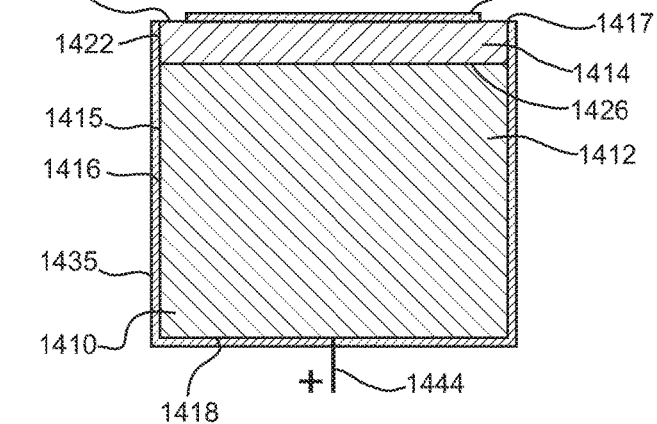
FIG. 25 is a cross-sectional side view of an exemplary superabrasive element coated with a masking layer and disposed near an exemplary electrode assembly according to at least one embodiment.

FIGS. 24 and 25 illustrate masking layers formed over portions of a superabrasive element 1410 comprising a superabrasive table 1414 affixed to or formed upon a substrate 1412. Superabrasive table 1414 may be affixed to substrate 1412 at interface 1426. Superabrasive element 1410 may comprise a rear surface 1418, a superabrasive face 1420, and an element side surface 1415, which may include a substrate side surface 1416 formed by substrate 1412 and a superabrasive side surface 1422 formed by superabrasive table 1414. Superabrasive element 1410 may include an edge 1417 formed at the intersection of superabrasive face 1420 and superabrasive side surface 1422.

A first masking layer 1433 and a second masking layer 1435 may be formed over any suitable portions superabrasive element 1410. For example, as illustrated, in FIG. 24, first masking layer 1433 may be formed over a central portion of superabrasive face 1420 about a central axis (e.g., central axis 29 shown in FIGS. 1-2). First masking layer 1433 may not be directly adjacent to and/or in contact with edge 1417. In additional embodiments, first masking layer 1433 may be formed adjacent to and/or in contact with edge 1417. Second masking layer 1435 may be formed over at least a portion of substrate 1412 and superabrasive table 1414. For example, as shown in FIG. 24, second masking layer 1435 may be formed over rear surface 1418 and substrate side surface 1416 of substrate 1412 so as to substantially surround substrate 1412. Optionally, second masking layer 1435 may be formed over a portion of superabrasive side surface 1422. In some embodiments, second masking layer 1435 may not be directly adjacent to and/or in contact with edge 1417 (e.g., as shown in FIG. 24).

According to various embodiments, a charge, voltage, or potential may be applied between superabrasive element 1410 and electrode assembly 1440 through electrical conductors (e.g., wires or any suitable electrical conductor) 1444 and 1442, respectively. For example, in order to conduct an electrical current through processing solution for processing superabrasive element 1410, superabrasive element 1410 and electrical conductor 1444 may be exposed to the processing solution (e.g., optionally, with a leaching cup 30 or other protective covering) and a charge, voltage, or potential may be applied between at least a portion of substrate 1412 (e.g., rear surface 1418) of superabrasive element 1410 and electrode assembly 1440 through electrical conductor 1444 and electrical conductor 1442. In at least one embodiment, electrical conductor 1444 may be electrically connected to substrate 1412 by being electrically connected to (e.g., positioned abutting) substrate 1412. In some embodiments, electrical conductor 1444 may be directly connected to superabrasive table 1414 by being electrically connected to (e.g., positioned abutting) superabrasive table 1414.

Electrode assembly 1440 may comprise any suitable size, shape, and/or geometry, without limitation. According to at least one embodiment, at least a portion of electrode assembly 1440 may have a substantially cylindrical shape, as illustrated in FIG. 24. In some embodiments, electrode assembly 1440 may include an electrode comprising an electrically conductive material. For example, at least a portion of electrode assembly 1440 disposed near superabrasive element 1410 may be substantially composed of a conductive material. Electrode assembly 1440 may have an outer diameter that is larger than, the same as, or smaller than the outer diameter of element side surface 1415 of superabrasive element 1410. Electrode assembly 1440 may have an electrode surface 1451 that faces at least a portion of superabrasive table 1414.

Electrode assembly 1440 may also include at least one fluid port 1452 for conducting (e.g., discharging or drawing) a processing fluid. For example, as shown in FIG. 24, fluid port 1452 may be defined in electrode assembly 1440 adjacent to electrode surface 1451. Fluid port 1452 may be positioned and configured to discharge or draw processing fluid into a gap (e.g., gap G1 illustrated in FIG. 7) defined between superabrasive table 1414 and electrode assembly 1440 such that the processing fluid passes over at least a portion of superabrasive face 1420, chamfer 1424, and/or superabrasive side surface 1422. For example, an internal passage 1453 defined within electrode assembly 1440 may supply a processing fluid from a processing fluid source to fluid port 1452 (or vice versa).

Electrode assemblies according to any of the configurations disclosed herein may also be utilized in addition to or in place of electrode assembly 1440 for processing superabrasive element 1410. When superabrasive element 1410 and electrode assembly 1440 are disposed in the processing solution such that at least a portion of superabrasive table 1414 and electrode assembly 1440 are exposed to the processing solution and a voltage is applied between electrode assembly 1440 and superabrasive table 1414, interstitial materials may be removed from at least a portion of superabrasive table 1414 of superabrasive element 1410 exposed to the processing solution and disposed near electrode assembly 1440.

FIG. 25 illustrates masking layers formed over portions of a superabrasive element 1410 having an edge 1417 formed at the intersection of superabrasive face 1420 and superabrasive side surface 1422. As illustrated, for example, in FIG. 25, first masking layer 1433 may be formed over a central portion of superabrasive face 1420 about a central axis (e.g., central axis 29 shown in FIGS. 1-2). First masking layer 1433 may not be directly adjacent to and/or in contact with edge 1417. In additional embodiments, first masking layer 1433 may be formed adjacent to and/or in contact with edge 1417. Second masking layer 1435 may be formed over at least a portion of substrate 1412 and superabrasive table 1414. For example, as shown in FIG. 25, second masking layer 1435 may be formed over rear surface 1418 and substrate side surface 1416 of substrate 1412 so as to substantially surround substrate 1412. Optionally, second masking layer 1435 may be formed over a portion of superabrasive side surface 1422. In some embodiments, second masking layer 1435 may be disposed adjacent to and/or in contact with edge 1417, as shown in FIG. 25.

According to various embodiments, a charge, voltage, or potential may be applied between superabrasive element 1410 and electrode assembly 1440 through electrical conductors (e.g., wires or any suitable electrical conductor) 1444 and 1442, respectively. When superabrasive element 1410 and electrode assembly 1440 are disposed in the processing solution such that at least a portion of superabrasive table 1414 and electrode assembly 1440 are exposed to the processing solution and a voltage is applied between electrode assembly 1440 and superabrasive table 1414, interstitial materials may be removed from at least a portion of superabrasive table 1414 of superabrasive element 1410 exposed to the processing solution and disposed near electrode assembly 1440.

Figure 26:
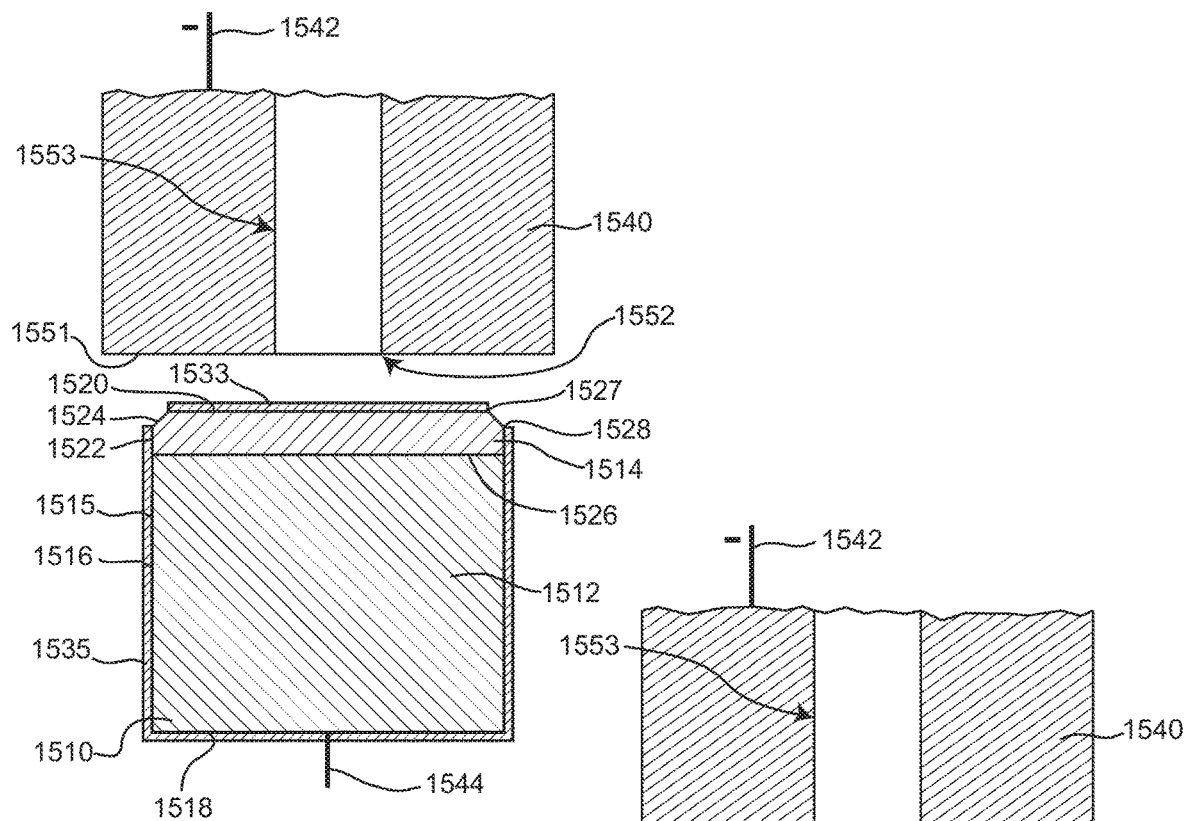
FIG. 26 is a cross-sectional side view of an exemplary superabrasive element coated with a masking layer and disposed near an exemplary electrode assembly according to at least one embodiment.
Figure 27:
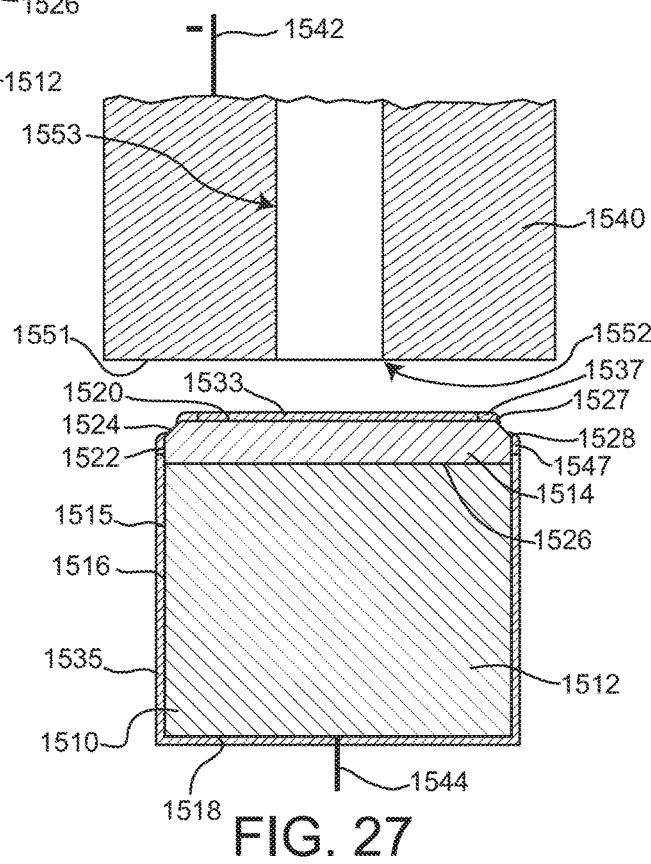
FIG. 27 is a cross-sectional side view of an exemplary superabrasive element coated with a plurality of masking layers and disposed near an exemplary electrode assembly according to at least one embodiment.

FIGS. 26 and 27 show an exemplary superabrasive elements 1510 coated with masking layers and disposed near an exemplary electrode assemblies 1540. According to various embodiments, portions of superabrasive element 1510 may be coated or otherwise covered with one or more masking layers that prevent and/or delay a leaching agent from contacting selected regions of superabrasive element 1510 during leaching. For example, a first masking layer 1533 and, optionally, a second masking layer 1535 may be formed on or disposed abutting at least a portion of superabrasive element 1510.

Superabrasive element 1510 may comprise a superabrasive table 1514 affixed to or formed upon a substrate 1512. Superabrasive table 1514 may be affixed to substrate 1512 at interface 1526. Superabrasive element 1510 may comprise a rear surface 1518, a superabrasive face 1520, and an element side surface 1515, which may include a substrate side surface 1516 formed by substrate 1512 and a superabrasive side surface 1522 formed by superabrasive table 1514. Superabrasive element 1510 may also comprise a chamfer 1524 formed by superabrasive table 1514.

According to some embodiments, first masking layer 1533 and/or second masking layer 1535 may be disposed adjacent to and/or in contact with at least a portion of chamfer 1524. For example, as illustrated in FIG. 26, first masking layer 1533 may substantially cover superabrasive face 1520 such that first masking layer 1533 is formed adjacent to edge 1527 of superabrasive table 1514. Optionally, second masking layer 1535 may substantially cover superabrasive side surface 1522 such that second masking layer 1535 is formed adjacent to edge 1528 of superabrasive table 1514. In some embodiments, first masking layer 1533 and/or second masking layer 1535 may be formed over at least a portion chamfer 1524.

According to various embodiments, a charge, voltage, or potential may be applied between superabrasive element 1510 and electrode assembly 1540 through electrical conductors (e.g., wires or any suitable electrical conductor) 1544 and 1542, respectively. For example, in order to conduct an electrical current through processing solution for processing superabrasive element 1510, superabrasive element 1510 and electrical conductor 1544 may be exposed to the processing solution (e.g., optionally, with a leaching cup 30 or other protective covering) and a charge, voltage, or potential may be applied between at least a portion of substrate 1512 (e.g., rear surface 1518) of superabrasive element 1510 and electrode assembly 1540 through electrical conductor 1544 and electrical conductor 1542. In at least one embodiment, electrical conductor 1544 may be electrically connected to substrate 1512 by being electrically connected to (e.g., positioned abutting) substrate 1512. In some embodiments, electrical conductor 1544 may be directly connected to superabrasive table 1514 by being electrically connected to (e.g., positioned abutting) superabrasive table 1514.

Electrode assembly 1540 may comprise any suitable size, shape, and/or geometry, without limitation. According to at least one embodiment, at least a portion of electrode assembly 1540 may have a substantially cylindrical shape, as illustrated in FIG. 26. In some embodiments, electrode assembly 1540 may include an electrode comprising an electrically conductive material. For example, at least a portion of electrode assembly 1540 disposed near superabrasive element 1510 may be substantially composed of a conductive material. Electrode assembly 1540 may have an outer diameter that is larger than, the same as, or smaller than the outer diameter of element side surface 1515 of superabrasive element 1510. Electrode assembly 1540 may have an electrode surface 1551 that faces at least a portion of superabrasive table 1514.

Electrode assembly 1540 may also include at least one fluid port 1552 for conducting (e.g., discharging or drawing) a processing fluid. For example, as shown in FIG. 26, fluid port 1552 may be defined in electrode assembly 1540 adjacent to electrode surface 1551. Fluid port 1552 may be positioned and configured to discharge or draw processing fluid into a gap (e.g., gap G1 illustrated in FIG. 7) defined between superabrasive table 1514 and electrode assembly 1540 such that the processing fluid passes over at least a portion of superabrasive face 1520, chamfer 1524, and/or superabrasive side surface 1522. For example, an internal passage 1553 defined within electrode assembly 1540 may supply a processing fluid from a processing fluid source to fluid port 1552 (or vice versa).

Electrode assemblies according to any of the configurations disclosed herein may also be utilized in addition to or in place of electrode assembly 1540 for processing superabrasive element 1510. When superabrasive element 1510 and electrode assembly 1540 are disposed in the processing solution such that at least a portion of superabrasive table 1514 and electrode assembly 1540 are exposed to the processing solution and a voltage is applied between electrode assembly 1540 and superabrasive table 1514, interstitial materials may be removed from at least a portion of superabrasive table 1514 of superabrasive element 1510 exposed to the processing solution and disposed near electrode assembly 1540. Accordingly, a peripheral region of superabrasive table 1514 defining at least chamfer 1524 may be leached to a greater depth than a central region of superabrasive table 1514.

FIG. 27 is a cross-sectional side view of an exemplary superabrasive element 1510 coated with masking layers according to at least one embodiment. As shown in FIG. 27, superabrasive element 1510 may be coated with various masking layers that prevent and/or delay a leaching agent from contacting selected regions of superabrasive element 1510 during leaching. According to some embodiments, a first protective masking layer 1533 and a second protective masking layer 1535 may be formed on at least a portion of superabrasive element 1510. Optionally, a first at-least-partially-degrading masking layer 1537 and a second at-least-partially-degrading masking layer 1547 may be formed on at least a portion of superabrasive element 1510.

As illustrated in FIG. 27, superabrasive element 1510 may comprise a superabrasive table 1514 affixed to or formed upon a substrate 1512. Superabrasive table 1514 may be affixed to substrate 1512 at interface 1526. Superabrasive element 1510 may comprise a rear surface 1518, a superabrasive face 1520, and an element side surface 1515, which may include a substrate side surface 1516 formed by substrate 1512 and a superabrasive side surface 1522 formed by superabrasive table 1514. Superabrasive element 1510 may also comprise a chamfer 1524 formed by superabrasive table 1514.

As shown in FIG. 27, first protective masking layer 1533 may be formed on at least a portion of superabrasive face 1520, such as a central portion of superabrasive face 1520 surrounding a central axis (e.g., central axis 29 shown in FIGS. 1-2). Second protective masking layer 1535 may be formed on at least a portion of element side surface 1515 and rear surface 1518 of superabrasive element 1510 so as to surround at least a portion of superabrasive table 1514 and/or substrate 1512. First protective masking layer 1533 and second protective masking layer 1535 may prevent or limit damage to selected portions of superabrasive element 10 and may provide a desired leach profile when superabrasive element 1510 is leached. For example, first protective masking layer 1533 and/or second protective masking layer 1535 may prevent or delay a leaching solution from contacting certain portions of superabrasive element 1510, such as portions of substrate 1512, portions of superabrasive table 1514, or both, during leaching. In various examples, first protective masking layer 1533 and/or second protective masking layer 1535 may comprise one or more materials that are substantially inert and/or otherwise resistant and/or impermeable to acids, bases, and/or other leaching methods used to leach superabrasive element 1510.

First at-least-partially-degrading masking layer 1537 may be formed on at least a portion of superabrasive element 1510 adjacent to first protective masking layer 1533. For example, first at-least-partially-degrading masking layer 1537 may be formed on portions of superabrasive face 1520 and/or chamfer 1524. Second at-least-partially-degrading masking layer 1547 may be formed on at least a portion of superabrasive element 1510 adjacent to second protective masking layer 1535. For example, second at-least-partially-degrading masking layer 1547 may be formed on portions of superabrasive side surface 1522 and/or chamfer 1524. As shown in FIG. 27, first at-least-partially-degrading masking layer 1537 may be separated from second at-least-partially-degrading masking layer 1547. For example, a space between first at-least-partially-degrading masking layer 1537 and second at-least-partially-degrading masking layer 1547 may be formed over at least a portion of superabrasive table 1514, such as, for example, at least a portion of chamfer 1524. Optionally, a space between first at-least-partially-degrading masking layer 1537 and second at-least-partially-degrading masking layer 1547 may also be formed over a portion of superabrasive face 1520 and/or superabrasive side surface 1522.

According to at least one embodiment, first at-least-partially-degrading masking layer 1537 and/or second at-least-partially-degrading masking layer 1547 may comprise a material that breaks down in the presence of a leaching agent. First at-least-partially-degrading masking layer 1537 and/or second at-least-partially-degrading masking layer 1547 may comprise, for example, a polymeric material that breaks down at a desired rate during exposure to the leaching agent. As first at-least-partially-degrading masking layer 1537 and second at-least-partially-degrading masking layer 1547 disintegrate or otherwise degrade during leaching, portions of superabrasive element 1510 that were covered by first at-least-partially-degrading masking layer 1537 and second at-least-partially-degrading masking layer 1547 may become exposed to the leaching agent. According to additional embodiments, first at-least-partially-degrading masking layer 1537 and/or second at-least-partially-degrading masking layer 1547 may comprise a material that is more permeable to a leaching agent than first protective masking layer 1533 and/or second protective masking layer 1535. In at least one embodiment, first at-least-partially-degrading masking layer 1537 and/or second at-least-partially-degrading masking layer 1547 may be not substantially degrade when exposed to a leaching agent but may be semi-permeable or permeable to the leaching agent.

First protective masking layer 1533, second protective masking layer 1535, first at-least-partially-degrading masking layer 1537, and second at-least-partially-degrading masking layer 1547 may each comprise any suitable material, including metals, alloys, polymers, carbon allotropes, oxides, carbides, glass materials, ceramics, composites, membrane materials (e.g. permeable or semi-permeable materials), and/or any combination of the foregoing, without limitation. Further, first protective masking layer 1533, second protective masking layer 1535, first at-least-partially-degrading masking layer 1537, and second at-least-partially-degrading masking layer 1547 may be affixed to superabrasive element 1510 through any suitable mechanism, without limitation, including, for example, direct bonding, bonding via an intermediate layer, such as an adhesive or braze joint, mechanical attachment, such as mechanical fastening, frictional attachment, and/or interference fitting.

The configuration illustrated in FIG. 27 may enable selective leaching of portions of superabrasive element 1510 to form a desired leach profile within superabrasive table 1514. For example, a volume of superabrasive table 1514 adjacent to an uncovered region between first at-least-partially-degrading masking layer 1537 and second at-least-partially-degrading masking layer 1547 may be leached to a greater depth than surrounding portions of superabrasive table 1514. As first at-least-partially-degrading masking layer 1537 and second at-least-partially-degrading masking layer 1547 are degraded during leaching, portions of superabrasive table 1514 that were covered by first at-least-partially-degrading masking layer 1537 and second at-least-partially-degrading masking layer 1547 may subsequently be exposed to the leaching agent. Accordingly, volumes of superabrasive table 1514 adjacent to the regions previously covered by first at-least-partially-degrading masking layer 1537 and second at-least-partially-degrading masking layer 1547 may be exposed to the leaching agent upon degradation of first at-least-partially-degrading masking layer 1537 and second at-least-partially-degrading masking layer 1547.

Accordingly, the regions of superabrasive table 1514 that were originally adjacent to first at-least-partially-degrading masking layer 1537 and second at-least-partially-degrading masking layer 1547 may have a shallower leach depth than regions of superabrasive table 1514 that were adjacent to the uncovered region between first at-least-partially-degrading masking layer 1537 and second at-least-partially-degrading masking layer 1547. For example, the configuration illustrated in FIG. 27 may result in a leach profile having a maximum leach depth in the volume of superabrasive table 1514 adjacent to a central portion of chamfer 1524.

According to various embodiments, a charge, voltage, or potential may be applied between superabrasive element 1510 and electrode assembly 1540 through electrical conductors (e.g., wires or any suitable electrical conductor)

1544 and 1542, respectively. When superabrasive element 1510 and electrode assembly 1540 are disposed in the processing solution such that at least a portion of superabrasive table 1514 and electrode assembly 1540 are exposed to the processing solution and a voltage is applied between electrode assembly 1540 and superabrasive table 1514, interstitial materials may be removed from at least a portion of superabrasive table 1514 of superabrasive element 1510 exposed to the processing solution and disposed near electrode assembly 1540. Accordingly, a peripheral region of superabrasive table 1514 defining chamfer 1524 may be leached to a greater depth than a central region of superabrasive table 1514.

Figure 28:
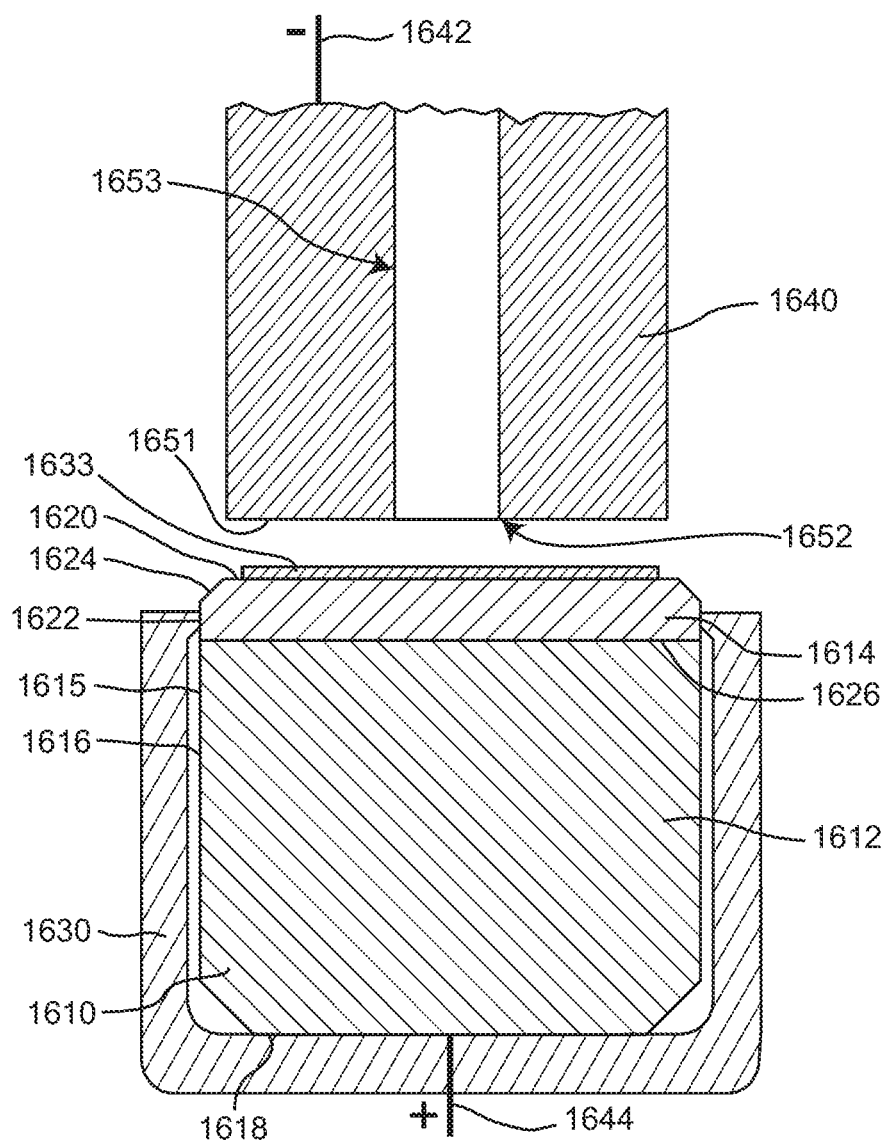
FIG. 28 is a cross-sectional side view of an exemplary superabrasive element coated with a masking layer, positioned within a protective leaching cup, and disposed near an exemplary electrode assembly according to at least one embodiment.

FIG. 28 is a cross-sectional side view of an exemplary superabrasive element 1610 coated with a masking layer and positioned within a leaching cup 1630 according to at least one embodiment. As illustrated in FIG. 28, a masking layer 1633 may be formed on or disposed adjacent to at least a portion of superabrasive face 1620, such as a central portion of superabrasive face 1620 surrounding a central axis (e.g., central axis 29 shown in FIGS. 1-2). According to at least one embodiment, masking layer 1633 may comprise one or more materials that are substantially inert, resistant to, and/or impermeable to acids, bases, and/or other leaching methods used to leach superabrasive element 1610.

As illustrated in FIG. 28, superabrasive element 1610 may comprise a superabrasive table 1614 affixed to or formed upon a substrate 1612. Superabrasive table 1614 may be affixed to substrate 1612 at interface 1626. Superabrasive element 1610 may comprise a rear surface 1618, a superabrasive face 1620, and an element side surface 1615, which may include a substrate side surface 1616 formed by substrate 1612 and a superabrasive side surface 1622 formed by superabrasive table 1614. Superabrasive element 1610 may also comprise a chamfer 1624 formed by superabrasive table 1614.

As shown in FIG. 28, superabrasive element 1610 may be positioned within protective leaching cup 1630 such that protective leaching cup 1630 surrounds at least a portion of superabrasive element 1610, including substrate 1612. When superabrasive element 1610 is positioned within protective leaching cup 1630, at least a portion of superabrasive element 1610, such as superabrasive table 1614 and/or substrate 1612, may be positioned adjacent to and/or contacting a portion of protective leaching cup 1630. For example, protective leaching cup 1630 may be configured to contact at least a portion of element side surface 1615 of superabrasive element 1610, forming a seal between protective leaching cup 1630 and superabrasive element 1610 that is partially or fully impermeable to various fluids, such as a leaching material (e.g., a leaching solution).

Protective leaching cup 1630 may be formed of any suitable material, without limitation. For example, protective leaching cup 1630 may comprise a flexible, elastic, malleable, and/or otherwise deformable material configured to surround and/or contact at least a portion of superabrasive element 1610. Protective leaching cup 1630 may prevent or limit damage to superabrasive element 1610 when at least a portion of superabrasive element 1610 is leached. For example, protective leaching cup 1630 may prevent a leaching solution from chemically or electrically contacting and/or damaging certain portions of superabrasive element 1610, such as portions of substrate 1612, portions of superabrasive table 1614, or both, during leaching.

In various embodiments, protective leaching cup 1630 may comprise one or more materials that are substantially inert and/or otherwise resistant to acids, bases, and/or other leaching methods used to leach superabrasive element 1610. In some embodiments, protective leaching cup 1630 may comprise one or more materials exhibiting significant chemical and/or mechanical stability at various temperatures and/or pressures. In some embodiments, protective leaching cup 1630 may include one or more polymeric materials, such as, for example, nylon, polytetrafluoroethylene (PTFE), polyethylene, polypropylene, rubber, silicone, and/or other polymers, and/or a combination of any of the foregoing, without limitation. For example, protective leaching cup 1630 may comprise PTFE blended with one or more other polymeric materials. Protective leaching cup 1630 may be formed using any suitable technique. For example, protective leaching cup 1630 may comprise a polymeric material that is shaped through a molding process (e.g., injection molding, blow molding, compression molding, drawing, etc.) and/or a machining process (e.g., grinding, lapping, milling, boring, etc.).

In at least one embodiment, protective leaching cup 1630 may comprise a material that is configured to conform to an exterior portion of superabrasive element 1610. For example, protective leaching cup 1630 may include a malleable and/or elastically deformable material that conforms to an exterior shape of a portion of superabrasive table 1614 abutting protective leaching cup 1630, such as superabrasive side surface 1622. According to some embodiments, protective leaching cup 1630 may comprise a material, such as a polymeric material (e.g., elastomer, rubber, plastic, etc.), that conforms to surface imperfections of superabrasive side surface 1622 and/or substrate side surface 1616. Heat and/or pressure may be applied to protective leaching cup 1630 to cause a portion of protective leaching cup 1630 abutting superabrasive side surface 1622 to more closely conform to superabrasive side surface 1622. Accordingly, a seal between superabrasive side surface 1622 and a portion of protective leaching cup 1630 abutting superabrasive side surface 1622 may be improved, thereby inhibiting passage of a leaching agent between superabrasive element 1610 and protective leaching cup 1630.

When superabrasive element 1610 is positioned within protective leaching cup 1630, at least a portion of superabrasive element 1610, such as superabrasive table 1614 and/or substrate 1612, may be positioned adjacent to and/or contacting a portion of protective leaching cup 1630. For example, at least a portion of a seal region of protective leaching cup 1630 may be configured to contact at least a portion of element side surface 1615 of superabrasive element 1610, forming a seal between protective leaching cup 1630 and superabrasive element 1610 that is partially or fully impermeable to various fluids, such as a leaching agent. As shown in FIG. 28, superabrasive element 1610 may be positioned within protective leaching cup 1630 so that at least a portion of the seal region of protective leaching cup 1630 contacts and forms a seal with at least a portion of element side surface 1615, such as at least a portion of superabrasive side surface 1622 and/or at least a portion of substrate side surface 1616.

According to various embodiments, a charge, voltage, or potential may be applied between superabrasive element 1610 and electrode assembly 1640 through electrical conductors (e.g., wires or any suitable electrical conductor) 1644 and 1642, respectively. For example, in order to conduct a current through a processing solution for processing superabrasive element 1610, superabrasive element 1610 and electrical conductor 1644 may be positioned in the processing solution (e.g., optionally, with a leaching cup 30 or other protective covering) and a charge, voltage, or potential may be applied between at least a portion of substrate 1612 (e.g., rear surface 1618) of superabrasive element 1610 and electrode assembly 1640 through electrical conductor 1644 and electrical conductor 1642. In at least one embodiment, electrical conductor 1644 may be electrically connected to substrate 1612 by being electrically connected to (e.g., positioned abutting) substrate 1612. In some embodiments, electrical conductor 1644 may be directly connected to superabrasive table 1614 by being electrically connected to (e.g., positioned abutting) superabrasive table 1614.

Electrode assembly 1640 may comprise any suitable size, shape, and/or geometry, without limitation. According to at least one embodiment, at least a portion of electrode assembly 1640 may have a substantially cylindrical shape, as illustrated in FIG. 28. In some embodiments, electrode assembly 1640 may include an electrode comprising an electrically conductive material. For example, at least a portion of electrode assembly 1640 disposed near superabrasive element 1610 may be substantially composed of a conductive material. Electrode assembly 1640 may have an outer diameter that is larger than, the same as, or smaller than the outer diameter of element side surface 1615 of superabrasive element 1610. Electrode assembly 1640 may have an electrode surface 1651 that faces at least a portion of superabrasive table 1614.

Electrode assembly 1640 may also include at least one fluid port 1652 for conducting (e.g., discharging or drawing) a processing fluid. For example, as shown in FIG. 28, fluid port 1652 may be defined in electrode assembly 1640 adjacent to electrode surface 1651. Fluid port 1652 may be positioned and configured to discharge or draw processing fluid into a gap (e.g., gap G1 illustrated in FIG. 7) defined between superabrasive table 1614 and electrode assembly 1640 such that the processing fluid passes over at least a portion of superabrasive face 1620, chamfer 1624, and/or superabrasive side surface 1622. For example, an internal passage 1653 defined within electrode assembly 1640 may supply a processing fluid from a processing fluid source to fluid port 1652 (or vice versa). Electrode assemblies according to any of the configurations disclosed herein may also be utilized in addition to or in place of electrode assembly 1640 for processing superabrasive element 1610.

Superabrasive element 1610 may comprise any suitable size, shape, and/or geometry, without limitation. For example, superabrasive element 1610 may comprise a substantially cylindrical or non-cylindrical outer surface surrounding a central axis (e.g., central axis 29 shown in FIGS. 1-2) of superabrasive element 1610. Electrode assembly 1640 may have an outer diameter that is larger than, the same as, or smaller than the outer diameter of element side surface 1615 of superabrasive element 1610, as shown in FIG. 28. When superabrasive element 1610 and electrode assembly 1640 are exposed to the processing solution such that at least a portion of superabrasive table 1614 and electrode assembly 1640 are exposed to the processing solution and a voltage is applied between electrode assembly 1640 and superabrasive table 1614, interstitial materials may be removed from at least a portion of superabrasive table 1614 of superabrasive element 1610 exposed to the processing solution and disposed near electrode assembly 1640.

The configuration illustrated in FIG. 28 may enable selective leaching of portions of superabrasive element 1610 to form a desired leach profile within superabrasive table 1614. For example, a volume of superabrasive table 1614 adjacent to an uncovered region between masking layer 1633 and the seal region of protective leaching cup 1630 may be leached to a greater depth than surrounding portions of superabrasive table 1614 covered by masking layer 1633 or the seal region. Leaching such a configuration may result in the formation of leached volumes of selected size and/or shape in portions of superabrasive table 1614 located near chamfer 1624 during leaching.

Figure 29:
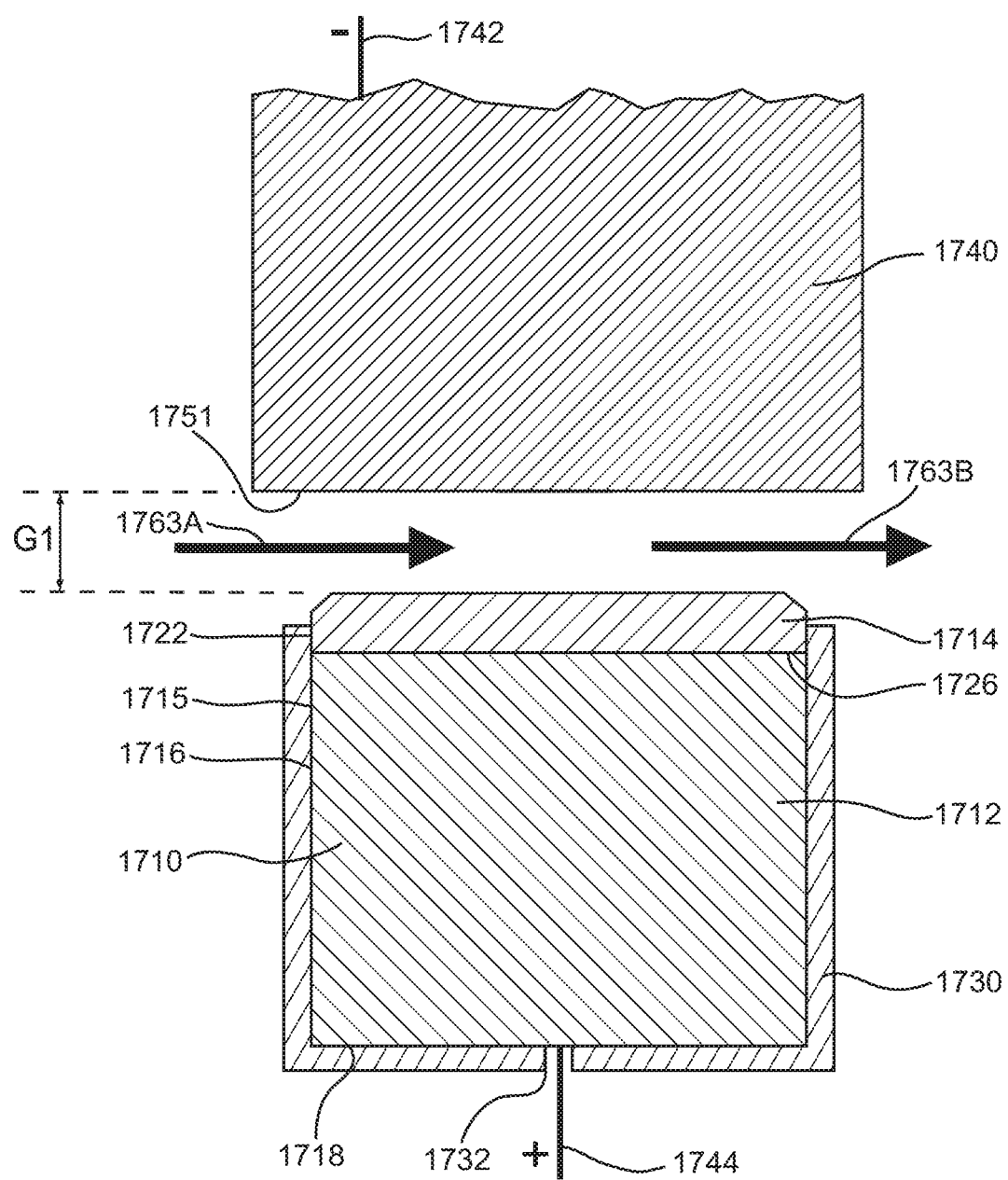
FIG. 29 is a cross-sectional side view of an exemplary superabrasive element disposed near an exemplary electrode assembly according to at least one embodiment.

FIG. 29 is a cross-sectional side view of an exemplary leaching assembly according to at least one embodiment. As illustrated in FIG. 29, a superabrasive element 1710 may be positioned within a protective leaching cup 1730 and disposed near electrode assembly 1740.

As illustrated in FIG. 29, superabrasive element 1710 may comprise a superabrasive table 1714 affixed to or formed upon a substrate 1712. Superabrasive table 1714 may be affixed to substrate 1712 at interface 1726, which may be a planar or non-planar interface. Superabrasive element 1710 may comprise a rear surface 1718, a superabrasive face 1720, and an element side surface 1715. In some embodiments, element side surface 1715 may include a substrate side surface 1716 formed by substrate 1712 and a superabrasive side surface 1722 formed by superabrasive table 1714. Rear surface 1718 may be formed by substrate 1712. Superabrasive element 1710 may also comprise a chamfer 1724 formed by superabrasive table 1714.

Electrode assembly 1740 may comprise any suitable size, shape, and/or geometry, without limitation. According to at least one embodiment, at least a portion of electrode assembly 1740 may be generally cylindrically shaped. For example, electrode assembly 1740 may comprise a substantially cylindrical shape having a circular or non-circular periphery. Electrode assembly 1740 may comprise a suitable electrically conductive material, such as, for example, a metallic, semi-metallic, and/or graphitic material. For example electrode assembly 1740 may include, without limitation, copper, tungsten carbide, cobalt, zinc, iron, platinum, palladium, niobium, graphite, graphene, nichrome, gold, silver, alloys thereof, any suitable metallic material, and/or any other suitable electrically conductive material, without limitation. Electrode assembly 1740 may have an electrode surface 1751 that faces at least a portion of superabrasive table 1714.

As shown in FIG. 29, a processing solution, which is simplistically represented as flowing in general directions 1763A and 1763B, may be directed through a gap G1 defined between electrode surface 1751 of electrode assembly 1740 and superabrasive table 1714 such that at least a portion of superabrasive table 1714 of superabrasive element 1710 is exposed to the flowing processing solution. In some embodiments, the processing fluid may pass through gap G1 so as to flow across superabrasive table 1714 in general direction 1763A and 1763B. In some embodiments, direction 1763A and/or 1763B may be substantially parallel to electrode surface 1751 and/or superabrasive surface 1720. The processing fluid may be directed through gap G1 in any suitable manner. For example, the processing fluid may be directed to gap G1 from one or more sources, such as one or more fluid delivery ports that are disposed separate from electrode assembly 1740.

The processing fluid may be directed through gap G1 at any suitable flow rate, without limitation. For example, the processing fluid may be directed through gap G1 at a flow of between approximately 1 L/min and approximately 100 L/min. In certain embodiments, the processing fluid may be directed through gap G1 at a flow of between approximately 2 L/min and approximately 40 L/min. In at least one embodiment, the processing fluid may be directed through gap G1 at a flow of between approximately 5 L/min and approximately 20 L/min. In various embodiments, a flow rate of the processing fluid directed through gap G1 may be changed one or more times while superabrasive element 10 is exposed to or is submerged in the processing solution. For example, the flow rate may be changed one or more time as a magnitude of electrical current and/or voltage between electrode assembly 40 and superabrasive table 14 is changed during processing of superabrasive element 10. In some embodiments, the flow rate may be increased one or more times during leaching of superabrasive table 14. Any of the flow rates disclosed herein may be employed relative to any of the embodiments disclosed herein.

According to various embodiments, a charge, voltage, or potential may be applied between superabrasive element 1710 and electrode assembly 1740 through electrical conductors 1744 and 1742, respectively. For example, in order to conduct a current through the processing solution for processing superabrasive element 1710, at least a portion of superabrasive element 1710 may be positioned in the processing solution and a charge, voltage, or potential may be applied to at least a portion of superabrasive element 1710 (e.g., rear surface 1718 of substrate 1712) through electrical conductor 1744. For example, at least a portion of superabrasive element 1710 may act as an anode and electrode assembly 1740 may act as a cathode. In at least one embodiment, electrical conductor 1744 may be electrically connected to substrate 1712 by being electrically connected to (e.g., positioned abutting) substrate 1712. In some embodiments, electrical conductor 1744 may be directly connected to superabrasive table 1714 by being electrically connected to (e.g., positioned abutting and/or disposed at least partially within) superabrasive table 1714.

When the processing solution is passed between superabrasive element 1710 and electrode assembly 1740 such that at least a portion of superabrasive table 1714 and electrode assembly 1740 are exposed to the processing solution and a voltage is applied between electrode assembly 1740 and superabrasive table 1714, interstitial materials may be removed from at least a portion of superabrasive table 1714 by the processing solution. For example, a metallic material, such as cobalt, present in at least a portion of superabrasive table 1714 may be electrolytically oxidized in the presence of an electrical current flowing between superabrasive element 1710 and electrode assembly 1740. The oxidized metallic material may be leached into the processing solution as dissolved metal cations, which are removed with the flowing processing solution.

In additional embodiments, a voltage with opposite polarity to the polarity shown in FIG. 29 may be applied to superabrasive element 1710 such that at least a portion of superabrasive element 1710 acts as a cathode and electrode assembly 1740 acts as an anode. A metallic material present in superabrasive table 1714 may be reduced to form metal anions that are dissolved in the processing solution.

FIGS. 30-41B show superabrasive elements having exemplary leach profiles that may be obtained by exemplary leach apparatuses disclosed herein.

Figure 30:
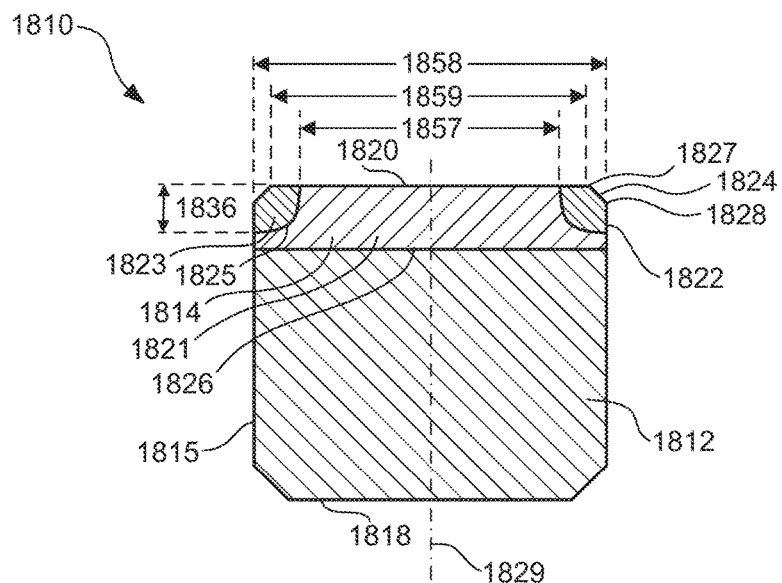
FIG. 30 is a cross-sectional side view of an exemplary superabrasive element according to at least one embodiment.

FIG. 30 shows a cross-sectional side view of an exemplary superabrasive element 1810 according to at least one embodiment. As illustrated in FIG. 30, superabrasive element 1810 may comprise a superabrasive table 1814 affixed to or formed upon a substrate 1812. Superabrasive table 1814 may be affixed to substrate 1812 at interface 1826. Superabrasive element 1810 may comprise a rear surface 1818, a superabrasive face 1820, and an element side surface 1815, which may include a substrate side surface 1816 formed by substrate 1812 and a superabrasive side surface 1822 formed by superabrasive table 1814. Superabrasive element 1810 may also comprise a chamfer 1824 formed by superabrasive table 1814.

As illustrated in FIG. 30, superabrasive table 1814 may include a first volume 1821 comprising an interstitial material and a second volume 1823 having a lower concentration of the interstitial material than first volume 1821. Portions of superabrasive table 1814, such as second volume 1823 may be leached or otherwise processed to remove interstitial materials, such as a metal-solvent catalyst, from the interstitial regions. Second volume 1823 may be applied during leaching of superabrasive table 1812 according to any suitable leaching technique. For example, second volume 1823 may be selectively leached by disposing portions of superabrasive table 1814 of superabrasive element 1810 near an electrode during an electrochemical leaching process (e.g., electrochemical leaching discussed in reference to FIG. 9). In some embodiments, superabrasive element 1810 may first be leached, after which portions of superabrasive element 1810 may be removed to modify the shape of first volume 1821 and/or second volume 1823 according to one or more methods discussed herein.

A transition region 1825 may extend between first volume 1821 and second volume 1823. Transition region 1825 may include amounts of metal-solvent catalyst varying between an amount of metal-solvent catalyst in first volume 1821 and an amount of metal-solvent catalyst in second volume 1823. As illustrated in FIG. 30, first volume 1821 may be located adjacent to a central portion of superabrasive face 1820. For example, first volume 1821 may be disposed about central axis 1829. First volume 1821 may extend between interface 1826 and superabrasive face 1820 with first volume 1821 forming at least a portion of superabrasive face 1820 such that the central portion of superabrasive face 1820 located about central axis 1829 is defined by first volume 1821, as shown in FIG. 30. In some embodiments, first volume 1821 and superabrasive face 1820 may be separated by a thin layer of leached polycrystalline diamond material located adjacent to a central region of superabrasive face 1820.

Second volume 1823 may be formed around at least a portion of first volume 1821. For example, second volume 1823 may comprise an annular volume surrounding at least a portion of first volume 1821 such that an outer portion of superabrasive face 1820 relative to central axis 1829 is defined by second volume 1823. As shown in FIG. 30, second volume 1823 may be located adjacent to superabrasive face 1820 and/or chamfer 1824 so as to at least partially surround a portion of first volume 1821 that is also adjacent to superabrasive face 1820. Second volume 1823 may be located adjacent to element side surface 1815. In one embodiment, second volume 1823 may be separated from interface 1826 between substrate 1812 and superabrasive table 1814 so as to prevent damage to substrate 1812 by a leaching solution used to form second volume 1823.

First volume 1821, second volume 1823, and transition region 1825 may be formed to any suitable size and/or shape within superabrasive table 1814, without limitation. For example, transition region 1825 may extend along a generally straight, angular, curved, and/or variable (e.g., zigzag, undulating) profile between first volume 1821 and second volume 1823. In various embodiments, transition region 1825 may comprise a relatively narrow region between first volume 1821 and second volume 1823, while transition region 1825 may optionally comprise a relatively wider region between first volume 1821 and second volume 1823.

As shown in FIG. 30, second volume 1823 may have a depth 1836 from superabrasive face 1820 in a direction substantially perpendicular to superabrasive face 1820. Second volume 1823 may comprise a generally annular-shaped volume defined between a first diameter 1857 and a second diameter 1858 surrounding central axis 1829. The portion of first volume 1821 surrounded by second volume 1823 may be generally defined by first diameter 1857. Second diameter 1858 may represent a diameter of element side surface 1815. Edge 1827 formed at the intersection of chamfer 1824 and superabrasive face 1820 may be located at a third diameter 1859 relative to central axis 1829.

Second volume 1823 may be leached to any suitable depth from superabrasive face 1820, chamfer 1824, and/or superabrasive side surface 1822, without limitation. According to some embodiments, second volume 1823 may have a leach depth greater than or equal to approximately 200 µm as measured in a substantially perpendicular direction from at least one of superabrasive face 1820, chamfer 1824, and/or superabrasive side surface 1822. In various embodiments, second volume 1823 may have a leach depth between approximately 200 µm and approximately 1200 µm (e.g., approximately 200 µm, 250 µm, 300 µm, 350 µm, 400 µm, 450 µm, 500 µm, 550 µm, 600 µm, 650 µm, 700 µm, 750 µm, 800 µm, 850 µm, 900 µm, 950 µm, 1000 µm, 1050 µm, 1100 µm, 1150 µm, or 1200 µm) as measured in a substantially perpendicular direction from at least one of superabrasive face 1820, chamfer 1824, and/or superabrasive side surface 1822. According to at least one embodiment, a depth of second volume 1823 as measured from a center portion of chamfer 1824 may be between approximately 200 µm and 700 µm.

Superabrasive elements 1810 having superabrasive table 1814 comprising first volume 1821 and second volume 1823 may exhibit properties of increased thermal stability, fatigue resistance, strength, and/or wear resistance. Such properties may be enhanced by the shape, size, and/or locations of first volume 1821, second volume 1823, and/or transition region 1825 of superabrasive table 1814. Accordingly, the superabrasive element configuration illustrated in FIG. 30, as well as other configurations illustrated and described herein, may provide significant resistance to undesired spalling, cracking, and/or thermal damage of superabrasive portions, such as superabrasive table 1814, of the superabrasive elements during drilling.

Figures 31, 32:
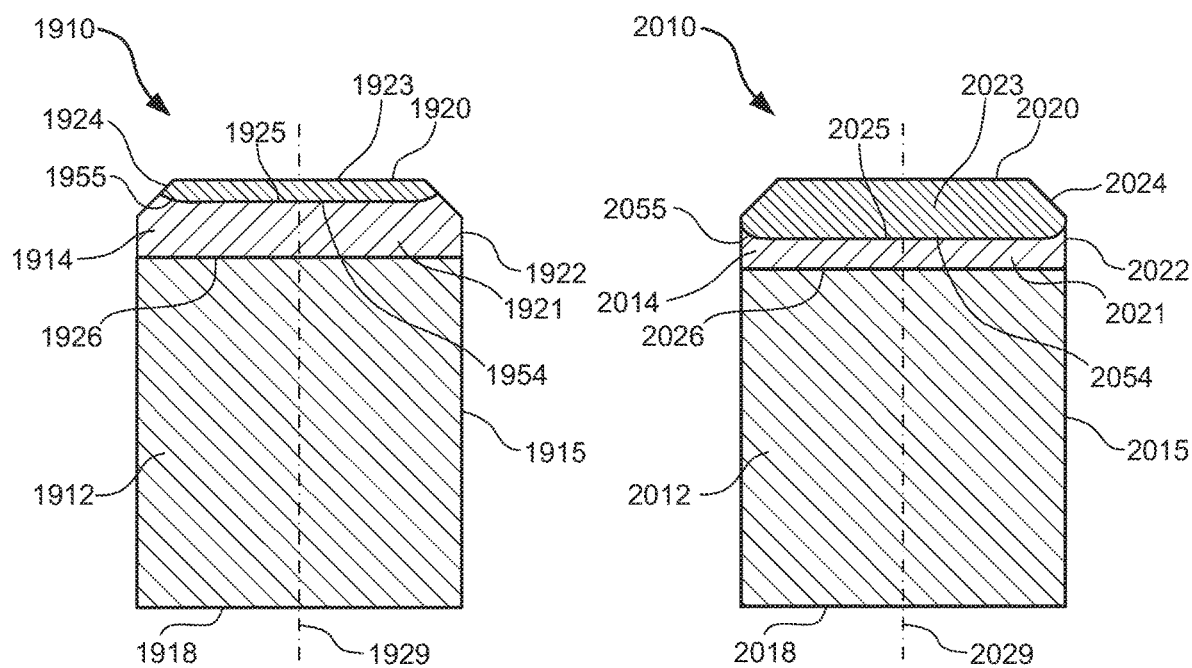
FIG. 31 is a cross-sectional side view of an exemplary superabrasive element according to at least one embodiment.
FIG. 32 is a cross-sectional side view of an exemplary superabrasive element according to at least one embodiment.

FIG. 31 shows a cross-sectional side view of an exemplary superabrasive element 1910 according to at least one embodiment. As illustrated in FIG. 31, superabrasive element 1910 may comprise a superabrasive table 1914 affixed to or formed upon a substrate 1912. Superabrasive table 1914 may be affixed to substrate 1912 at interface 1926. Superabrasive element 1910 may comprise a rear surface 1918, a superabrasive face 1920, and an element side surface 1915, which may include a substrate side surface 1916 formed by substrate 1912 and a superabrasive side surface 1922 formed by superabrasive table 1914. Superabrasive element 1910 may also comprise a chamfer 1924 formed by superabrasive table 1914.

Superabrasive element 1910 may include a first volume 1921 comprising an interstitial material and a second volume 1923 having a lower concentration of the interstitial material than first volume 1921. Portions of superabrasive table 1914, such as second volume 1923, may be leached or otherwise processed to remove interstitial materials, such as a metal-solvent catalyst, from the interstitial regions. A transition region 1925 may extend between first volume 1921 and second volume 1923 so as to form a boundary between at least a portion of first volume 1921 and second volume 1923. Transition region 1925 may include amounts of an interstitial material varying between an amount of the interstitial material in first volume 1921 and an amount of the interstitial material in second volume 1923. In other embodiments, the boundary may be well-defined (i.e., transition region 1925 may be relatively thin compared to a depth of second volume 1923).

Transition region 1925 located between first volume 1921 and second volume 1923 may extend along any suitable profile within superabrasive table 1914. For example, as illustrated in FIG. 31, sloped boundary portion 1955 of transition region 1925 may extend between chamfer 1924 and central boundary portion 1954 along any suitable profile, including, for example, a generally straight, angular, curved, and/or variable (e.g., zigzag, undulating) profile. According to at least one embodiment, superabrasive element 1910 may be processed such that transition region 1925 intersects or extends to chamfer 1924 and/or a surface region adjacent to chamfer 1924 (e.g., superabrasive side surface 1922). Accordingly, as shown in FIG. 31, second volume 1923 may be located directly adjacent to a central portion of superabrasive face 1920. For example, second volume 1923 may be disposed about central axis 1929. A portion of first volume 1921, such as a portion adjacent to chamfer 1924, may peripherally surround at least a portion of second volume 1923.

FIG. 32 shows a cross-sectional side view of an exemplary superabrasive element 2010 according to at least one embodiment. As illustrated in FIG. 32, superabrasive element 2010 may comprise a superabrasive table 2014 affixed to or formed upon a substrate 2012. Superabrasive table 2014 may be affixed to substrate 2012 at interface 2026. Superabrasive element 2010 may comprise a rear surface 2018, a superabrasive face 2020, and an element side surface 2015, which may include a substrate side surface 2016 formed by substrate 2012 and a superabrasive side surface 2022 formed by superabrasive table 2014. Superabrasive element 2010 may also comprise a chamfer 2024 formed by superabrasive table 2014.

Superabrasive element 2010 may include a first volume 2021 comprising an interstitial material and a second volume 2023 having a lower concentration of the interstitial material than first volume 2021. Portions of superabrasive table 2014, such as second volume 2023, may be leached or otherwise processed to remove interstitial materials, such as a metal-solvent catalyst, from the interstitial regions. A transition region 2025 may extend between first volume 2021 and second volume 2023 so as to form a boundary between at least a portion of first volume 2021 and second volume 2023. Transition region 2025 may include amounts of an interstitial material varying between an amount of the interstitial material in first volume 2021 and an amount of the interstitial material in second volume 2023. In other embodiments, the boundary may be well-defined (i.e., transition region 2025 may be relatively thin compared to a depth of second volume 2023).

In some embodiments, as illustrated in FIG. 32, sloped boundary portion 2055 of transition region 2025 may extend between superabrasive side surface 2022 and central boundary portion 2054 along any suitable profile, including, for example, a generally straight, angular, curved, and/or variable (e.g., zigzag, undulating) profile. According to at least one embodiment, superabrasive element 2010 may be processed such that transition region 2025 intersects or extends to superabrasive side surface 2022 below chamfer 2024.

FIGS. 33-41B show cross-sectional views of superabrasive elements comprising superabrasive tables having exemplary leach profiles that may be obtained by exemplary leach apparatuses and/or methods disclosed herein. While superabrasive elements illustrated in FIGS. 33-41B shown as superabrasive tables without a substrate, the leach profiles illustrated in these figures may be formed on and/or within superabrasive elements (e.g., superabrasive element 10 shown in FIGS. 1-2) comprising a superabrasive element bonded to a substrate. According to some embodiments, the superabrasive elements illustrated in FIGS. 33-41B may be formed by leaching a superabrasive element comprising a substrate and a superabrasive table according to any of the techniques described herein and subsequently separating (e.g., by lapping, grinding, wire EDM, etc.) the superabrasive table from the substrate. Alternatively, a superabrasive element may be formed with a substrate, the substrate may be removed, and then the superabrasive table may be leached.

Figure 33:
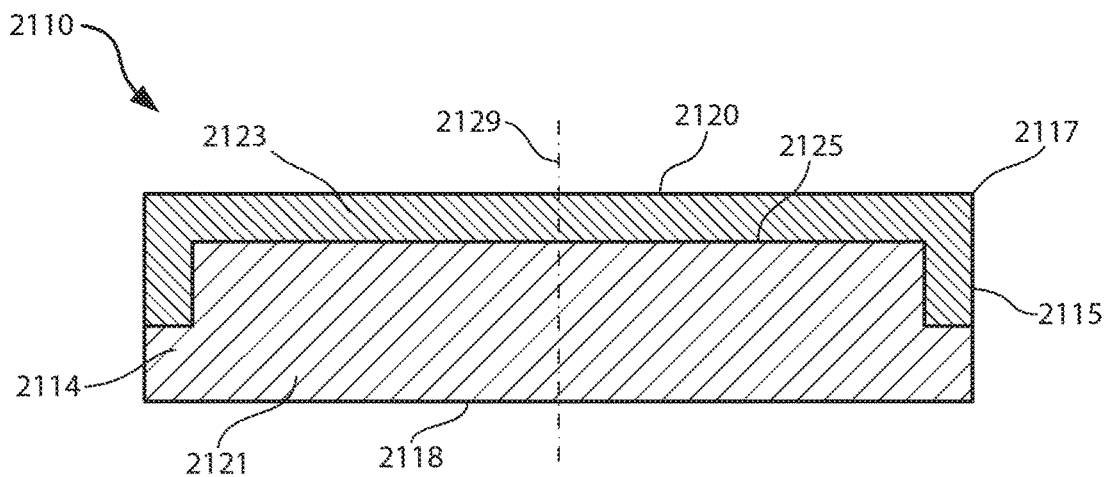
FIG. 33 is a cross-sectional side view of an exemplary superabrasive element according to at least one embodiment.

FIG. 33 shows an exemplary superabrasive element 2110 comprising a superabrasive table 2114 having a rear surface 2118, a superabrasive face 2120, and an element side surface 2115. Superabrasive element 2110 may comprise an edge 2117 (i.e., sloped or angled) and/or any other suitable surface shape at the intersection of element side surface 2115 and superabrasive face 2120, including, without limitation, an arcuate surface (e.g., a radius, an ovoid shape, or any other rounded shape), a sharp edge, multiple chamfers/radii, a honed edge, and/or combinations of the foregoing. Element side surface 2115 of superabrasive element 2110 may radially surround a central axis 2129 of superabrasive element 2110.

Superabrasive element 2110 may include a first volume 2121 comprising an interstitial material and a second volume 2123 having a lower concentration of the interstitial material than first volume 2121. Portions of superabrasive table 2114, such as second volume 2123, may be leached or otherwise processed to remove interstitial materials, such as a metal-solvent catalyst, from the interstitial regions. A transition region 2125 may extend between first volume 2121 and second volume 2123 so as to form a boundary between form a boundary between at least a portion of first volume 2121 and second volume 2123. Transition region 2125 may include amounts of an interstitial material varying between an amount of the interstitial material in first volume 2121 and an amount of the interstitial material in second volume 2123. In other embodiments, the boundary may be well-defined (i.e., transition region 2125 may be relatively thin compared to a depth of second volume 2123).

As shown in FIG. 33, first volume 2121 may extend between rear surface 2118 and transition region 2125. Second volume 2123 may be formed adjacent to a substantial portion of superabrasive face 2120. Transition region 2125 bordering second volume 2123 may extend in a direction generally parallel to superabrasive face 2120. Optionally, a portion of second volume 2123 may extend along at least a portion of element side surface 2115 so as to radially surround at least a portion of first volume 2121. A portion of transition region 2125 may extend in a direction generally parallel to element side surface 2115. According to some embodiments, transition region 2125 may have a substantially consistent thickness along element side surface 2115 and/or along superabrasive face 2120.

Figure 34:
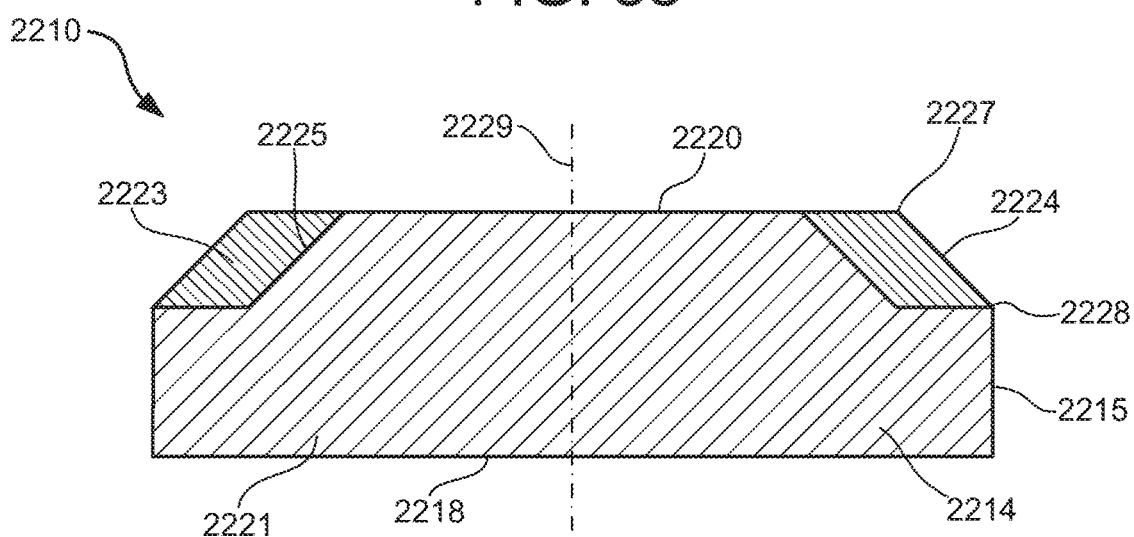
FIG. 34 is a cross-sectional side view of an exemplary superabrasive element according to at least one embodiment.

FIG. 34 shows an exemplary superabrasive element 2210 comprising a superabrasive table 2214 having a rear surface 2218, a superabrasive face 2220, and an element side surface 2215. Superabrasive table 2214 may also form a chamfer 2224 and one or more cutting edges, such as edge 2227 and edge 2228, adjacent to chamfer 2224. Element side surface 2215 of superabrasive element 2210 may radially surround a central axis 2229 of superabrasive element 2210.

Superabrasive element 2210 may include a first volume 2221 comprising an interstitial material and a second volume 2223 having a lower concentration of the interstitial material than first volume 2221. Portions of superabrasive table 2214, such as second volume 2223, may be leached or otherwise processed to remove interstitial materials, such as a metal-solvent catalyst, from the interstitial regions. A transition region 2225 may extend between first volume 2221 and second volume 2223 so as to form a boundary between at least a portion of first volume 2221 and second volume 2223. Transition region 2225 may include amounts of an interstitial material varying between an amount of the interstitial material in first volume 2221 and an amount of the interstitial material in second volume 2223. In other embodiments, the boundary may be well-defined (i.e., transition region 2225 may be relatively thin compared to a depth of second volume 2223).

As shown in FIG. 34, second volume 2223 may be formed adjacent to chamfer 2224 and superabrasive face 2220, and transition region 2225 may extend from superabrasive face 2220 to edge 2228 formed at the intersection of chamfer 2224 and element side surface 2215, with a portion of transition region 2225 extending generally parallel to chamfer 2224.

Figure 35:
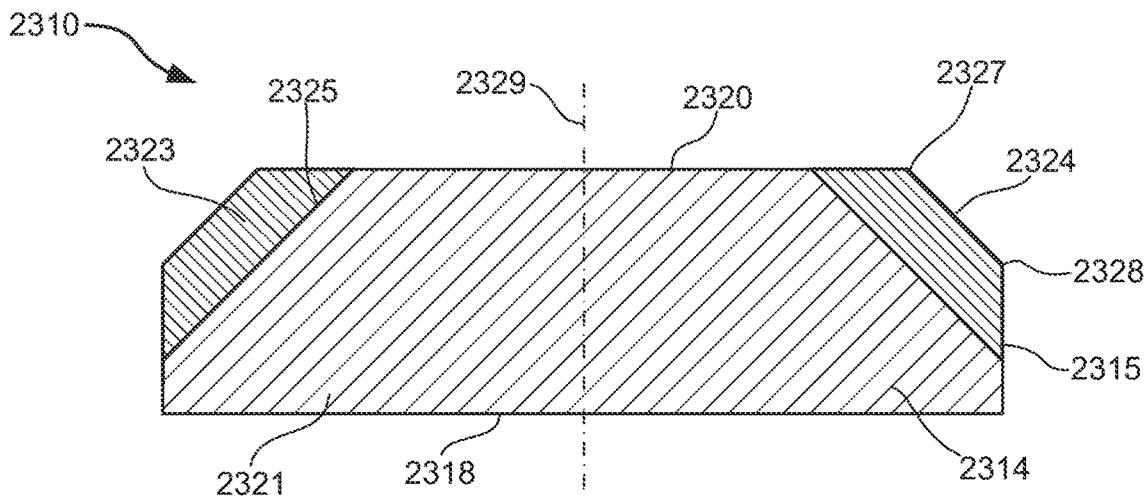
FIG. 35 is a cross-sectional side view of an exemplary superabrasive element according to at least one embodiment.

FIG. 35 shows an exemplary superabrasive element 2310 comprising a superabrasive table 2314 having a rear surface 2318, a superabrasive face 2320, and an element side surface 2315. Superabrasive table 2314 may also form a chamfer 2324 and one or more cutting edges, such as edge 2327 and edge 2328, adjacent to chamfer 2324. Element side surface 2315 of superabrasive element 2310 may radially surround a central axis 2329 of superabrasive element 2310.

Superabrasive element 2310 may include a first volume 2321 comprising an interstitial material and a second volume 2323 having a lower concentration of the interstitial material than first volume 2321. Portions of superabrasive table 2314, such as second volume 2323, may be leached or otherwise processed to remove interstitial materials, such as a metal-solvent catalyst, from the interstitial regions. A transition region 2325 may extend between first volume 2321 and second volume 2323 so as to form a boundary between at least a portion of first volume 2321 and second volume 2323. Transition region 2325 may include amounts of an interstitial material varying between an amount of the interstitial material in first volume 2321 and an amount of the interstitial material in second volume 2323. In other embodiments, the boundary may be well-defined (i.e., transition region 2325 may be relatively thin compared to a depth of second volume 2323).

As shown in FIG. 35, second volume 2323 may be formed adjacent to chamfer 2324, superabrasive face 2320, and element side surface 2315, and transition region 2325 may extend generally parallel to chamfer 2324 from superabrasive face 2320 to element side surface 2315.

Figure 36:
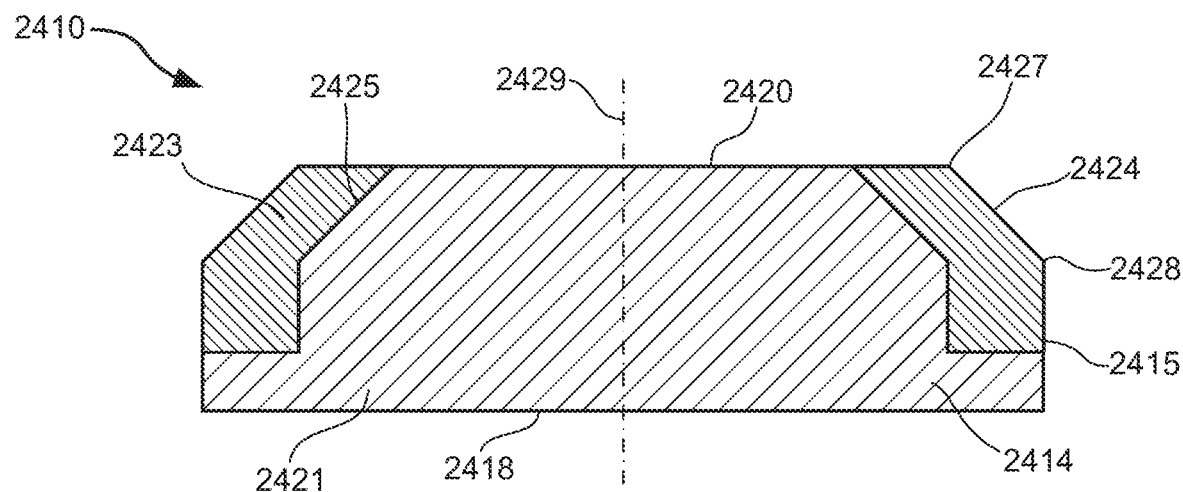
FIG. 36 is a cross-sectional side view of an exemplary superabrasive element according to at least one embodiment.

FIG. 36 shows an exemplary superabrasive element 2410 comprising a superabrasive table 2414 having a rear surface 2418, a superabrasive face 2420, and an element side surface 2415. Superabrasive table 2414 may also form a chamfer 2424 and one or more cutting edges, such as edge 2427 and edge 2428, adjacent to chamfer 2424. Element side surface 2415 of superabrasive element 2410 may radially surround a central axis 2429 of superabrasive element 2410.

Superabrasive element 2410 may include a first volume 2421 comprising an interstitial material and a second volume 2423 having a lower concentration of the interstitial material than first volume 2421. Portions of superabrasive table 2414, such as second volume 2423, may be leached or otherwise processed to remove interstitial materials, such as a metal-solvent catalyst, from the interstitial regions. A transition region 2425 may extend between first volume 2421 and second volume 2423 so as to form a boundary between at least a portion of first volume 2421 and second volume 2423. Transition region 2425 may include amounts of an interstitial material varying between an amount of the interstitial material in first volume 2421 and an amount of the interstitial material in second volume 2423. In other embodiments, the boundary may be well-defined (i.e., transition region 2425 may be relatively thin compared to a depth of second volume 2423).

As shown in FIG. 36, second volume 2423 may be formed adjacent to chamfer 2424, superabrasive face 2420, and element side surface 2415, and transition region 2425 may extend from superabrasive face 2420 to element side surface 2415, with a portion of transition region 2425 extending generally parallel to chamfer 2424 and another portion of transition region 2425 extending generally parallel to element side surface 2415.

Figure 37:
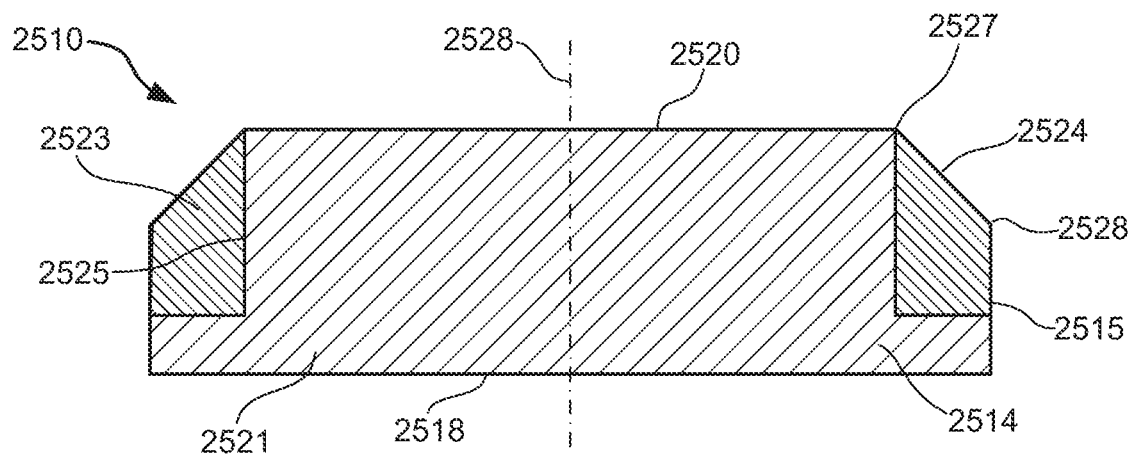
FIG. 37 is a cross-sectional side view of an exemplary superabrasive element according to at least one embodiment.

FIG. 37 shows an exemplary superabrasive element 2510 comprising a superabrasive table 2514 having a rear surface 2518, a superabrasive face 2520, and an element side surface 2515. Superabrasive table 2514 may also form a chamfer 2524 and one or more cutting edges, such as edge 2527 and edge 2528, adjacent to chamfer 2524. Element side surface 2515 of superabrasive element 2510 may radially surround a central axis 2529 of superabrasive element 2510.

Superabrasive element 2510 may include a first volume 2521 comprising an interstitial material and a second volume 2523 having a lower concentration of the interstitial material than first volume 2521. Portions of superabrasive table 2514, such as second volume 2523, may be leached or otherwise processed to remove interstitial materials, such as a metal-solvent catalyst, from the interstitial regions. A transition region 2525 may extend between first volume 2521 and second volume 2523 so as to form a boundary between at least a portion of first volume 2521 and second volume 2523. Transition region 2525 may include amounts of an interstitial material varying between an amount of the interstitial material in first volume 2521 and an amount of the interstitial material in second volume 2523. In other embodiments, the boundary may be well-defined (i.e., transition region 2525 may be relatively thin compared to a depth of second volume 2523).

As shown in FIG. 37, second volume 2523 may be formed adjacent to chamfer 2524 and element side surface 2515, and transition region 2525 may extend from edge 2527 formed at the intersection of chamfer 2524 and superabrasive face 2520 to element side surface 2515, with a portion of transition region 2525 extending generally parallel to element side surface 2515.

Figure 38A:
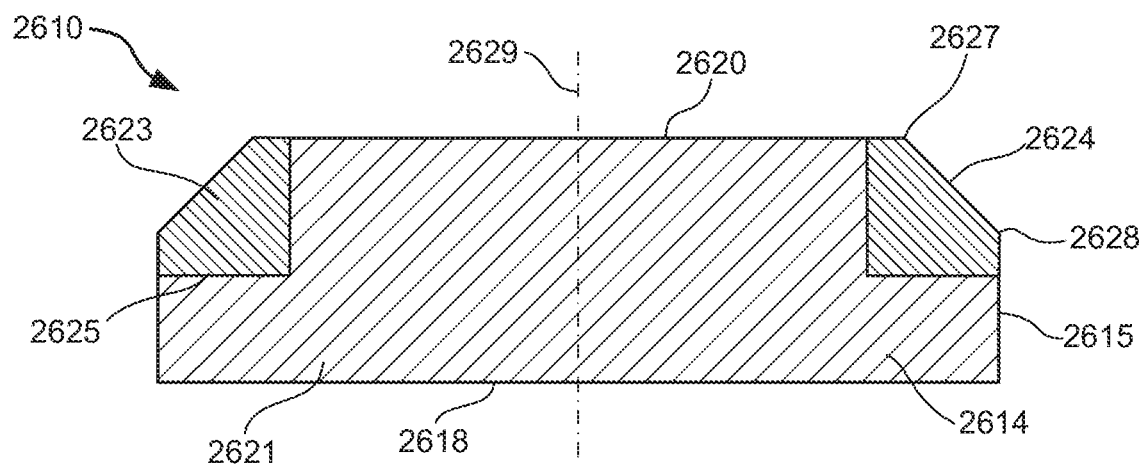
FIG. 38A is a cross-sectional side view of an exemplary superabrasive element according to at least one embodiment.

FIG. 38A shows an exemplary superabrasive element 2610 comprising a superabrasive table 2614 having a rear surface 2618, a superabrasive face 2620, and an element side surface 2615. Superabrasive table 2614 may also form a chamfer 2624 and one or more cutting edges, such as edge 2627 and edge 2628, adjacent to chamfer 2624. Element side surface 2615 of superabrasive element 2610 may radially surround a central axis 2629 of superabrasive element 2610.

Superabrasive element 2610 may include a first volume 2621 comprising an interstitial material and a second volume 2623 having a lower concentration of the interstitial material than first volume 2621. Portions of superabrasive table 2614, such as second volume 2623, may be leached or otherwise processed to remove interstitial materials, such as a metal-solvent catalyst, from the interstitial regions. A transition region 2625 may extend between first volume 2621 and second volume 2623 so as to form a boundary between at least a portion of first volume 2621 and second volume 2623. Transition region 2625 may include amounts of an interstitial material varying between an amount of the interstitial material in first volume 2621 and an amount of the interstitial material in second volume 2623. In other embodiments, the boundary may be well-defined (i.e., transition region 2625 may be relatively thin compared to a depth of second volume 2623).

As shown in FIG. 38A, second volume 2623 may be formed adjacent to chamfer 2624 and transition region 2625 may extend adjacent to chamfer 2624 between superabrasive face 2620 and element side surface 2615. Transition region 2625 may extend along any suitable profile between, without limitation. According to some embodiments, transition region 2625 may comprise an angular profile, as illustrated in FIG. 38A. A thickness or depth of second volume 2623, as measured perpendicular to a surface of chamfer 2624, may be maximum generally near the center of chamfer 2624.

Figure 38B:
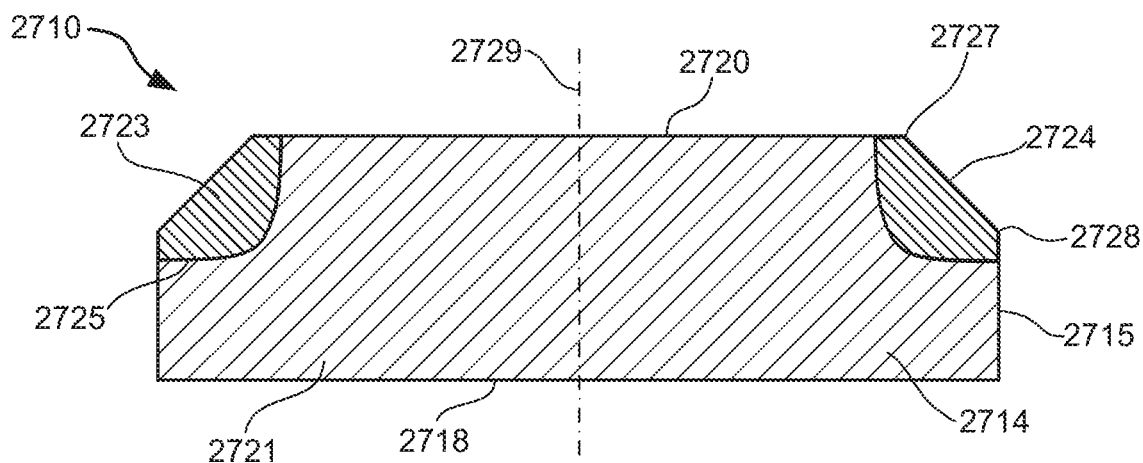
FIG. 38B is a cross-sectional side view of an exemplary superabrasive element according to at least one embodiment.

FIG. 38B shows an exemplary superabrasive element 2710 comprising a superabrasive table 2714 having a rear surface 2718, a superabrasive face 2720, and an element side surface 2715. Superabrasive table 2714 may also form a chamfer 2724 and one or more cutting edges, such as edge 2727 and edge 2728, adjacent to chamfer 2724. Element side surface 2715 of superabrasive element 2710 may radially surround a central axis 2729 of superabrasive element 2710.

Superabrasive element 2710 may include a first volume 2721 comprising an interstitial material and a second volume 2723 having a lower concentration of the interstitial material than first volume 2721. Portions of superabrasive table 2714, such as second volume 2723, may be leached or otherwise processed to remove interstitial materials, such as a metal-solvent catalyst, from the interstitial regions. A transition region 2725 may extend between first volume 2721 and second volume 2723 so as to form a boundary between at least a portion of first volume 2721 and second volume 2723. Transition region 2725 may include amounts of an interstitial material varying between an amount of the interstitial material in first volume 2721 and an amount of the interstitial material in second volume 2723. In other embodiments, the boundary may be well-defined (i.e., transition region 2725 may be relatively thin compared to a depth of second volume 2723).

As shown in FIG. 38B, second volume 2723 may be formed adjacent to chamfer 2724 and transition region 2725 may extend adjacent to chamfer 2724 between superabrasive face 2720 and element side surface 2715. Transition region 2725 may extend along any suitable profile between, without limitation. According to some embodiments, transition region 2725 may comprise an arcuate profile, as illustrated in FIG. 38B. A thickness or depth of second volume 2723, as measured perpendicular to a surface of chamfer 2724, may be maximum generally near the center of chamfer 2724.

Figure 39:
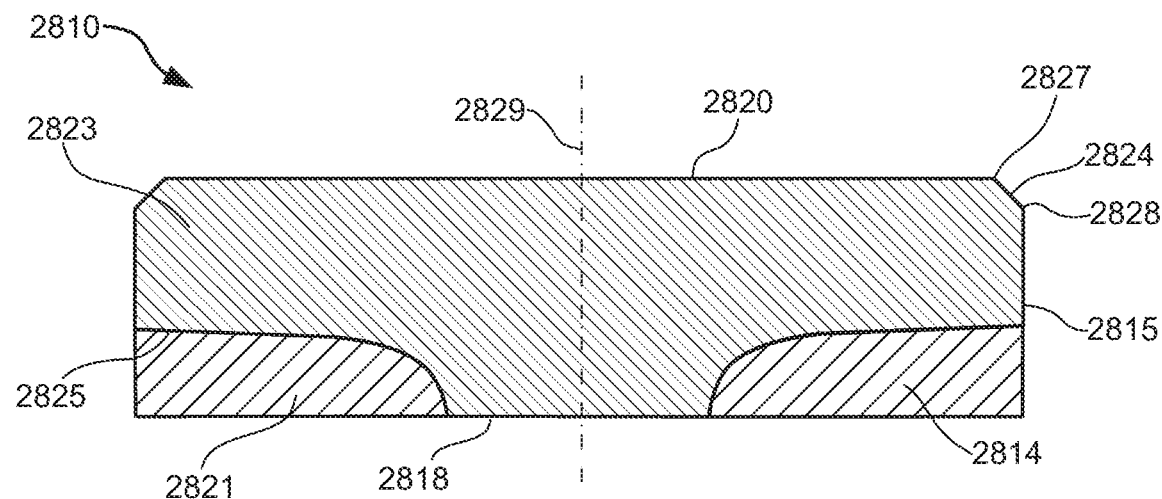
FIG. 39 is a cross-sectional side view of an exemplary superabrasive element according to at least one embodiment.

FIG. 39 shows an exemplary superabrasive element 2810 comprising a superabrasive table 2814 having a rear surface 2818, a superabrasive face 2820, and an element side surface 2815. Superabrasive table 2814 may also form a chamfer 2824 and one or more cutting edges, such as edge 2827 and edge 2828, adjacent to chamfer 2824. Element side surface 2815 of superabrasive element 2810 may radially surround a central axis 2829 of superabrasive element 2810.

Superabrasive element 2810 may include a first volume 2821 comprising an interstitial material and a second volume 2823 having a lower concentration of the interstitial material than first volume 2821. Portions of superabrasive table 2814, such as second volume 2823, may be leached or otherwise processed to remove interstitial materials, such as a metal-solvent catalyst, from the interstitial regions. A transition region 2825 may extend between first volume 2821 and second volume 2823 so as to form a boundary between at least a portion of first volume 2821 and second volume 2823. Transition region 2825 may include amounts of an interstitial material varying between an amount of the interstitial material in first volume 2821 and an amount of the interstitial material in second volume 2823. In other embodiments, the boundary may be well-defined (i.e., transition region 2825 may be relatively thin compared to a depth of second volume 2823).

As shown in FIG. 39, second volume 2823 may be formed adjacent to superabrasive surface 2820, chamfer 2824, element side surface 2815, and rear surface 2818. Transition region 2825 may extend from element side surface 2815 to rear surface 2818. Transition region 2825 may extend along any suitable profile between superabrasive face 2820 and element side surface 2815, without limitation. Transition region 2825 may comprise, for example, a profile that generally slopes between superabrasive face 2820 and element side surface 2815. For example, transition region 2825 may extend from a region of element side surface 2815 near edge 2828 to a region of superabrasive face 2820 disposed apart from edge 2827. According to some embodiments, as shown in FIG. 39, the generally annular-shaped second volume 2823 may comprise a generally ring-shaped volume that is not symmetric but is irregular in one or more dimensions. For example, second volume 2823 may vary in leach depth and/or profile shape, as defined by transition region 2825, at different peripheral regions about central axis 2829.

Figure 40:
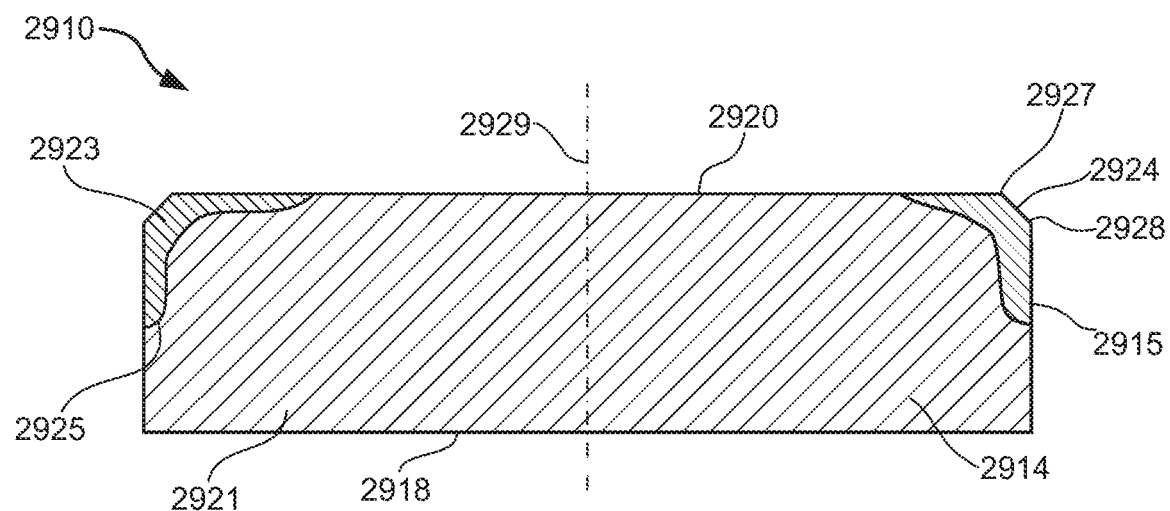
FIG. 40 is a cross-sectional side view of an exemplary superabrasive element according to at least one embodiment.

FIG. 40 shows an exemplary superabrasive element 2910 comprising a superabrasive table 2914 having a rear surface 2918, a superabrasive face 2920, and an element side surface 2915. Superabrasive table 2914 may also form a chamfer 2924 and one or more cutting edges, such as edge 2927 and edge 2928, adjacent to chamfer 2924. Element side surface 2915 of superabrasive element 2910 may radially surround a central axis 2929 of superabrasive element 2910.

Superabrasive element 2910 may include a first volume 2921 comprising an interstitial material and a second volume 2923 having a lower concentration of the interstitial material than first volume 2921. Portions of superabrasive table 2914, such as second volume 2923, may be leached or otherwise processed to remove interstitial materials, such as a metal-solvent catalyst, from the interstitial regions. A transition region 2925 may extend between first volume 2921 and second volume 2923 so as to form a boundary between at least a portion of first volume 2921 and second volume 2923. Transition region 2925 may include amounts of an interstitial material varying between an amount of the interstitial material in first volume 2921 and an amount of the interstitial material in second volume 2923. In other embodiments, the boundary may be well-defined (i.e., transition region 2925 may be relatively thin compared to a depth of second volume 2923).

As shown in FIG. 40, second volume 2923 may be formed adjacent to chamfer 2924 and transition region 2925 may extend from superabrasive face 2920 to element side surface 2915. Transition region 2925 may extend along any suitable profile between superabrasive face 2920 and element side surface 2915, without limitation. Transition region 2925 may comprise, for example, a profile that generally slopes between superabrasive face 2920 and element side surface 2915. For example, transition region 2925 may extend from a region of element side surface 2915 near edge 2928 to a region of superabrasive face 2920 disposed apart from edge 2927. According to some embodiments, as shown in FIG. 40, the generally annular-shaped second volume 2923 may comprise a generally ring-shaped volume that is not symmetric but is irregular in one or more dimensions. For example, second volume 2923 may vary in leach depth and/or profile shape, as defined by transition region 2925, at different peripheral regions about central axis 2929.

Figure 41A:
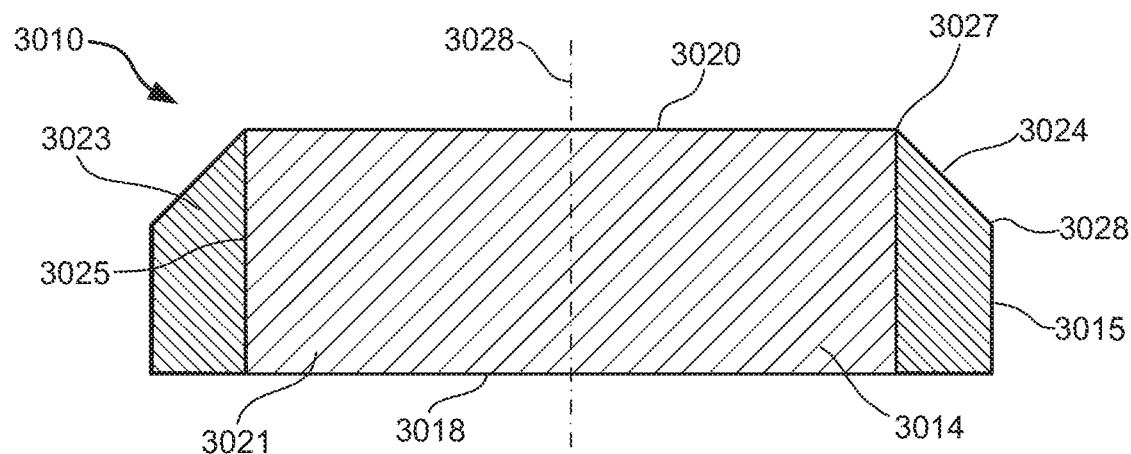
FIG. 41A is a cross-sectional side view of an exemplary superabrasive element according to at least one embodiment.

FIG. 41A shows an exemplary superabrasive element 3010 comprising a superabrasive table 3014 having a rear surface 3018, a superabrasive face 3020, and an element side surface 3015. Superabrasive table 3014 may also form a chamfer 3024 and one or more cutting edges, such as edge 3027 and edge 3028, adjacent to chamfer 3024. Element side surface 3015 of superabrasive element 3010 may radially surround a central axis 3029 of superabrasive element 3010.

Superabrasive element 3010 may include a first volume 3021 comprising an interstitial material and a second volume 3023 having a lower concentration of the interstitial material than first volume 3021. Portions of superabrasive table 3014, such as second volume 3023, may be leached or otherwise processed to remove interstitial materials, such as a metal-solvent catalyst, from the interstitial regions. A transition region 3025 may extend between first volume 3021 and second volume 3023 so as to form a boundary between at least a portion of first volume 3021 and second volume 3023. Transition region 3025 may include amounts of an interstitial material varying between an amount of the interstitial material in first volume 3021 and an amount of the interstitial material in second volume 3023. In other embodiments, the boundary may be well-defined (i.e., transition region 3025 may be relatively thin compared to a depth of second volume 3023).

As shown in FIG. 41A, second volume 3023 may be formed adjacent to chamfer 3024, superabrasive face 3020, and element side surface 3015, and transition region 3025 may extend from superabrasive face 3020 to rear surface 3018 (or to an interface between superabrasive table 3014 and an adjacent substrate), with transition region 3025 extending generally parallel to element side surface 3015.

Figure 41B:
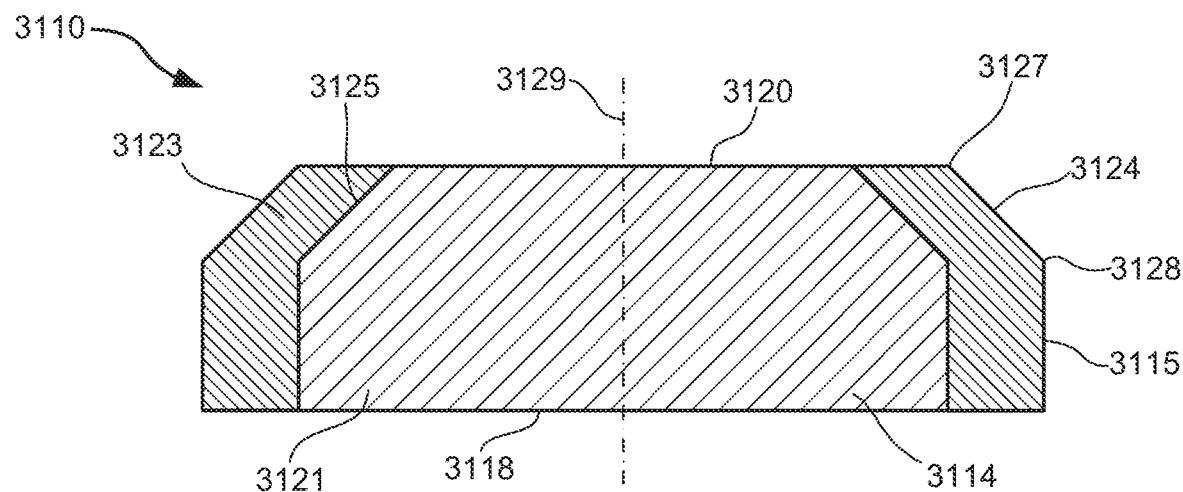
FIG. 41B is a cross-sectional side view of an exemplary superabrasive element according to at least one embodiment.

FIG. 41B shows an exemplary superabrasive element 3110 comprising a superabrasive table 3114 having a rear surface 3118, a superabrasive face 3120, and an element side surface 3115. Superabrasive table 3114 may also form a chamfer 3124 and one or more cutting edges, such as edge 3127 and edge 3128, adjacent to chamfer 3124. Element side surface 3115 of superabrasive element 3110 may radially surround a central axis 3129 of superabrasive element 3110.

Superabrasive element 3110 may include a first volume 3121 comprising an interstitial material and a second volume 3123 having a lower concentration of the interstitial material than first volume 3121. Portions of superabrasive table 3114, such as second volume 3123, may be leached or otherwise processed to remove interstitial materials, such as a metal-solvent catalyst, from the interstitial regions. A transition region 3125 may extend between first volume 3121 and second volume 3123 so as to form a boundary between at least a portion of first volume 3121 and second volume 3123. Transition region 3125 may include amounts of an interstitial material varying between an amount of the interstitial material in first volume 3121 and an amount of the interstitial material in second volume 3123. In other embodiments, the boundary may be well-defined (i.e., transition region 3125 may be relatively thin compared to a depth of second volume 3123).

As shown in FIG. 41B, second volume 3123 may be formed adjacent to chamfer 3124, superabrasive face 3120, and element side surface 3115, and transition region 3125 may extend from superabrasive face 3120 to rear surface 3118 (or to an interface between superabrasive table 3114 and an adjacent substrate).

Figure 42:
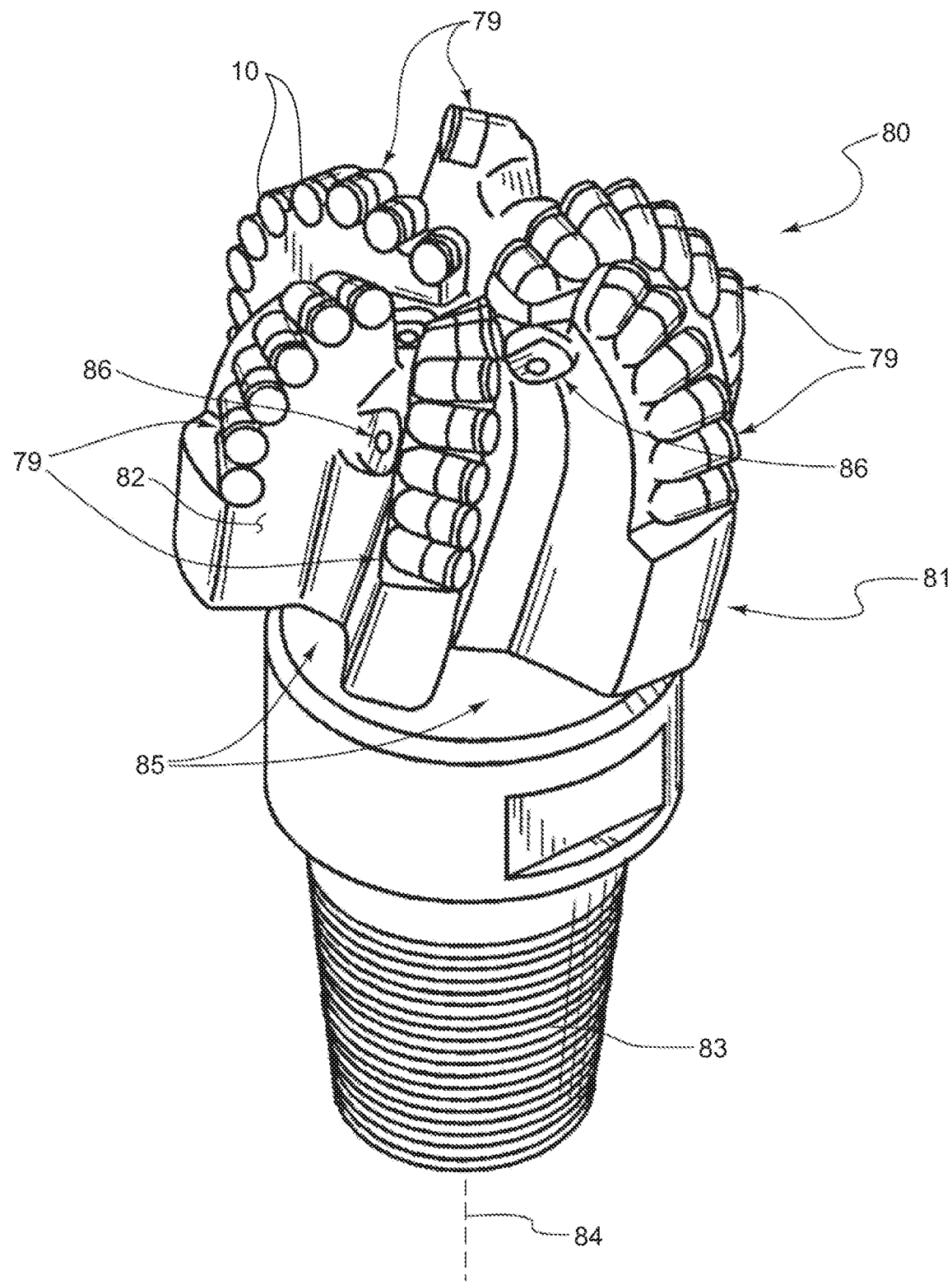
FIG. 42 is a perspective view of an exemplary drill bit according to at least one embodiment.

FIG. 42 is a perspective view of an exemplary drill bit 80 according to at least one embodiment. Drill bit 80 may represent any type or form of earth-boring or drilling tool, including, for example, a rotary drill bit. As illustrated in FIG. 42, drill bit 80 may comprise a bit body 81 having a longitudinal axis 84. Bit body 81 may define a leading end structure for drilling into a subterranean formation by rotating bit body 81 about longitudinal axis 84 and applying weight to bit body 81. Bit body 81 may include radially and longitudinally extending blades 79 with leading faces 82 and a threaded pin connection 83 for connecting bit body 81 to a drill string.

At least one superabrasive element according to any of the embodiments disclosed herein may be coupled to bit body 81. For example, as shown in FIG. 42, a plurality of superabrasive elements 10 may be coupled to blades 79. Drill bit 80 may utilize any of the disclosed superabrasive elements 10 as cutting elements. Circumferentially adjacent blades 79 may define so-called junk slots 85 therebetween. Junk slots 85 may be configured to channel debris, such as rock or formation cuttings, away from superabrasive elements 10 during drilling. Drill bit 80 may also include a plurality of nozzle cavities 86 for communicating drilling fluid from the interior of drill bit 80 to superabrasive elements 10.

FIG. 42 depicts an example of a drill bit 80 that employs at least one cutting element 10. Drill bit 80 may represent any number of earth-boring tools or drilling tools, including, for example, core bits, roller-cone bits, fixed-cutter bits, eccentric bits, bicenter bits, reamers, reamer wings, and/or any other downhole tools comprising superabrasive cutting elements and/or discs, without limitation. Superabrasive elements 10 disclosed herein may also be utilized in applications other than cutting technology. For example, embodiments of superabrasive elements 10 disclosed herein may also form all or part of heat sinks, wire dies, bearing elements, cutting elements, cutting inserts (e.g., on a roller cone type drill bit), machining inserts, or any other article of manufacture, as known in the art. According to some examples, superabrasive elements 10, as disclosed herein, may be employed in medical device applications, including, without limitation, hip joints, back joints, or any other suitable medical joints. Thus, superabrasive elements 10, as disclosed herein, may be employed in any suitable article of manufacture. Other examples of articles of manufacture that may incorporate superabrasive elements as disclosed herein may be found in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

In additional embodiments, a rotor and a stator, such as a rotor and a stator used in a thrust bearing apparatus, may each include at least one superabrasive element according to the embodiments disclosed herein. By way of example U.S. Pat. Nos. 4,410,054; 4,560,014; 5,364,192; 5,368,398; and 5,480,233, the disclosure of each of which is incorporated herein, in its entirety, by this reference, disclose subterranean drilling systems that include bearing apparatuses utilizing superabrasive elements 10 as disclosed herein.

Figure 43:
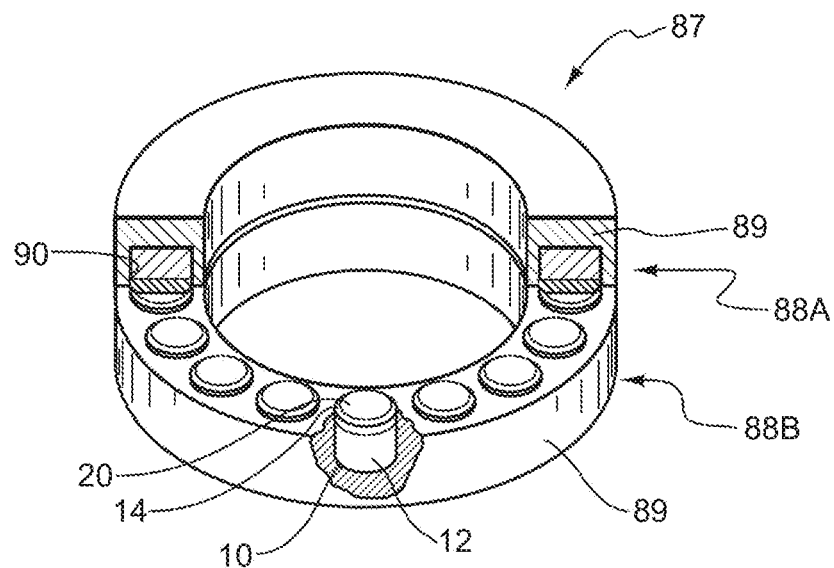
FIG. 43 is a partial cut-away perspective view of an exemplary thrust bearing apparatus according to at least one embodiment.

FIG. 43 is partial cross-sectional perspective view of an exemplary thrust-bearing apparatus 87 according to at least one embodiment. Thrust-bearing apparatus 87 may utilize any of the disclosed superabrasive elements 10 as bearing elements. Thrust-bearing apparatus 87 may also include bearing assemblies 88A and 88B. Each of bearing assembly 88A and 88B may include a support ring 89 fabricated from a material, such as steel, stainless steel, or any other suitable material, without limitation.

Each support ring 89 may include a plurality of recesses 90 configured to receive corresponding superabrasive elements 10. Each superabrasive element 10 may be mounted to a corresponding support ring 89 within a corresponding recess 90 by brazing, welding, press-fitting, using fasteners, or any another suitable mounting technique, without limitation. In at least one embodiment, one or more of superabrasive elements 10 may be configured according to any of the superabrasive element embodiments described herein. For example, each superabrasive element 10 may include a substrate 12 and a superabrasive table 14 comprising a PCD material. Each superabrasive table 14 may form a superabrasive face 20 that is utilized as a bearing surface.

Superabrasive faces 20 of bearing assembly 88A may bear against opposing superabrasive faces 20 of bearing assembly 88B in thrust-bearing apparatus 87, as illustrated in FIG. 43. For example, bearing assembly 88A of thrust-bearing apparatus 87 may be termed a "rotor." The rotor may be operably coupled to a rotational shaft. Bearing assembly 88B of thrust-bearing apparatus 87 may be held substantially stationary relative to the bearing assembly 88A and may be termed a "stator."

Figure 44:
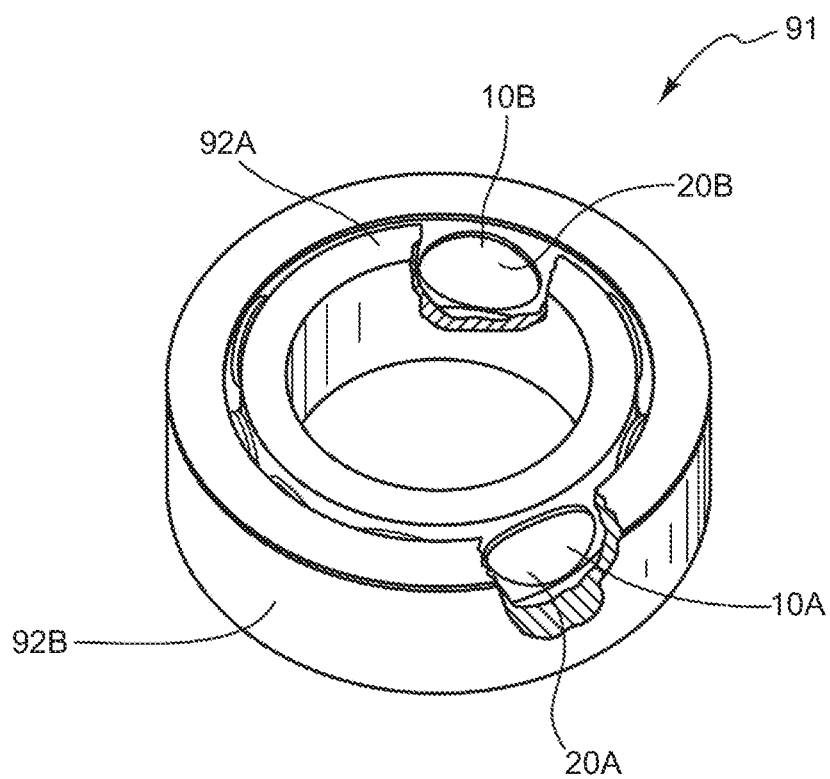
FIG. 44 is a partial cut-away perspective view of an exemplary radial bearing apparatus according to at least one embodiment.

FIG. 44 is a perspective view of a radial bearing apparatus 91 according to another embodiment. Radial bearing apparatus 91 may utilize any of the disclosed superabrasive element embodiments as bearing elements 10A and 10B. Radial bearing apparatus 91 may include an inner race 92A positioned generally within an outer race 92B. Inner race 92A may include a plurality of bearing elements 10A affixed thereto, and outer race 92B may include a plurality of corresponding bearing elements 10B affixed thereto. One or more of bearing elements 10A and 10B may be configured in accordance with any of the superabrasive element embodiments disclosed herein.

Inner race 92A may be positioned generally within outer race 92B. Thus, inner race 92A and outer race 92B may be configured such that bearing surfaces 20A defined by bearing elements 10A and bearing surfaces 20B defined by bearing elements 10B may at least partially contact one another and move relative to one another as inner race 92A and outer race 92B rotate relative to each other. According to various embodiments, thrust-bearing apparatus 87 and/or radial bearing apparatus 91 may be incorporated into a subterranean drilling system.

Figure 45:
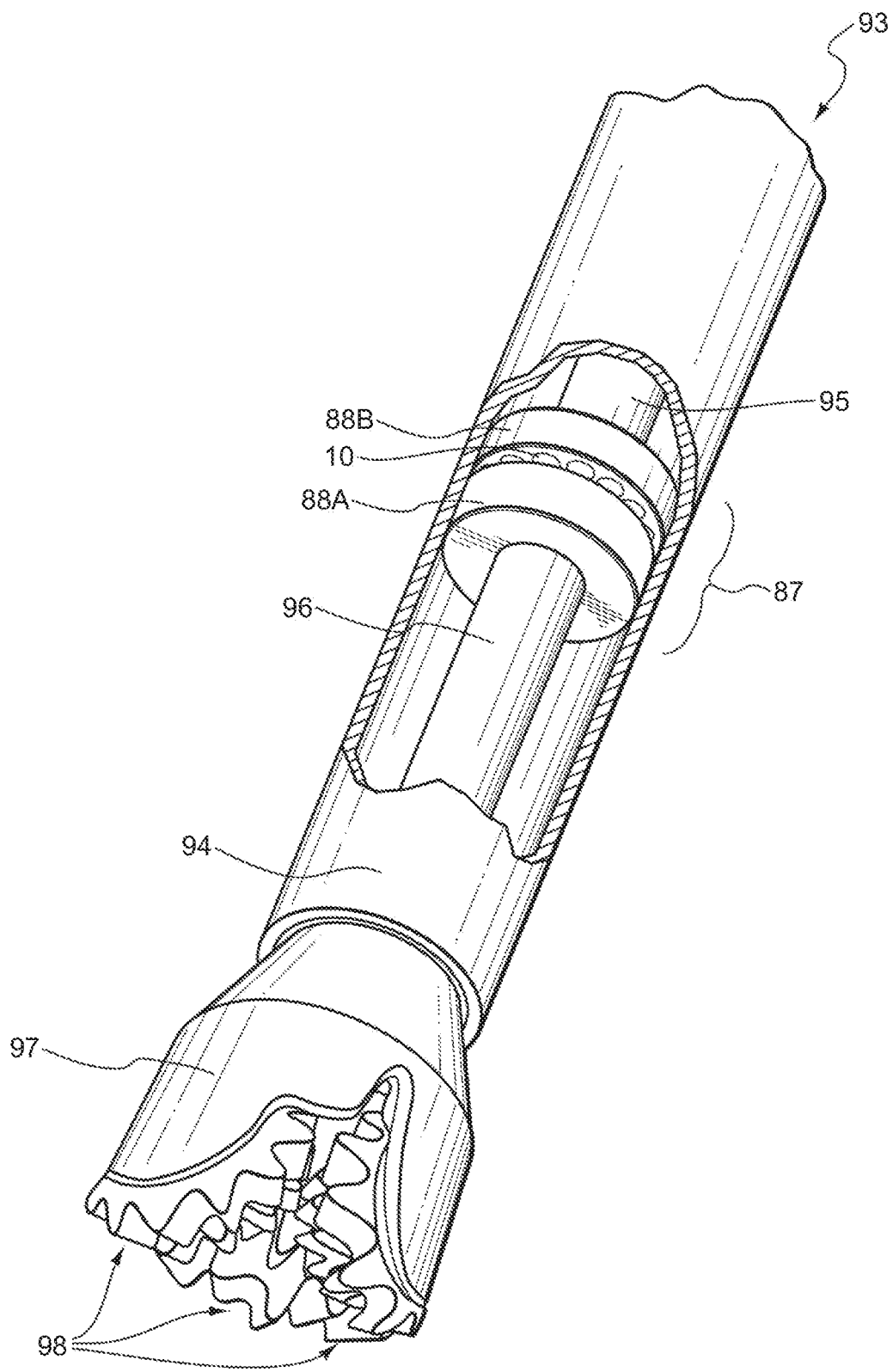
FIG. 45 is a partial cut-away perspective view of an exemplary subterranean drilling system according to at least one embodiment.

FIG. 45 is a partial cross-sectional perspective view of an exemplary subterranean drilling system 93 that includes a thrust-bearing apparatus 87, as shown in FIG. 43, according to at least one embodiment. The subterranean drilling system 93 may include a housing 94 enclosing a downhole drilling motor 95 (i.e., a motor, turbine, or any other suitable device capable of rotating an output shaft, without limitation) that is operably connected to an output shaft 96.

The thrust-bearing apparatus 87 shown in FIG. 43 may be operably coupled to downhole drilling motor 95. A rotary drill bit 97, such as a rotary drill bit configured to engage a subterranean formation and drill a borehole, may be connected to output shaft 96. As illustrated in FIG. 45, rotary drill bit 97 may be a roller cone bit comprising a plurality of roller cones 98. According to additional embodiments, rotary drill bit 97 may comprise any suitable type of rotary drill bit, such as, for example, a so-called fixed-cutter drill bit. As a borehole is drilled using rotary drill bit 97, pipe sections may be connected to subterranean drilling system 93 to form a drill string capable of progressively drilling the borehole to a greater depth within a subterranean formation.

A thrust-bearing assembly 88A in thrust-bearing apparatus 87 may be configured as a rotor that is attached to output shaft 96 and a thrust-bearing assembly 88B in thrust-bearing apparatus 87 may be configured as a stator. During a drilling operation using subterranean drilling system 93, the rotor may rotate in conjunction with output shaft 96 and the stator may remain substantially stationary relative to the rotor.

According to various embodiments, drilling fluid may be circulated through downhole drilling motor 95 to generate torque and effect rotation of output shaft 96 and rotary drill bit 97 attached thereto so that a borehole may be drilled. A portion of the drilling fluid may also be used to lubricate opposing bearing surfaces of superabrasive elements 10 on thrust-bearing assemblies 88A and 88B.

Figure 46:
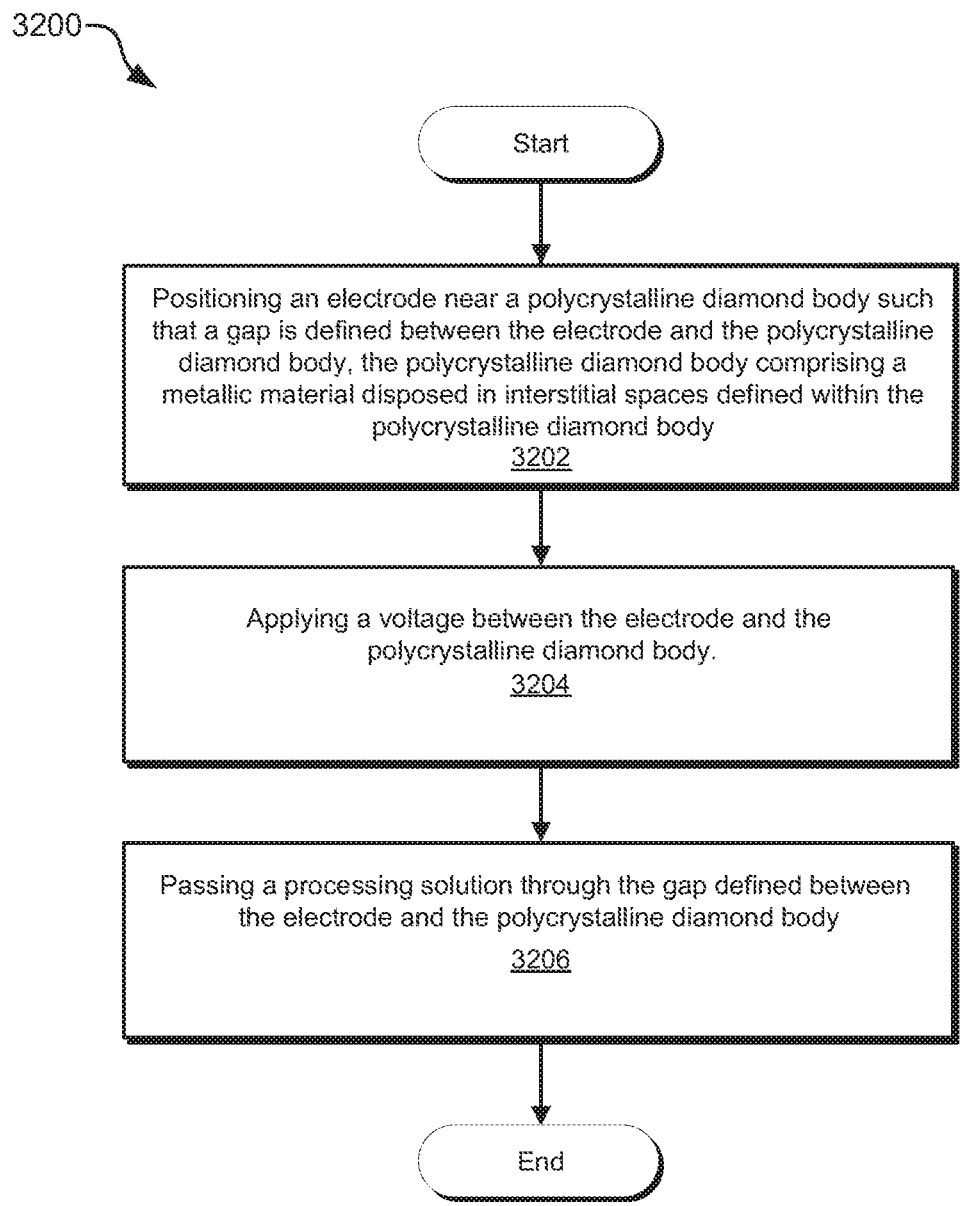
FIG. 46 is a flow diagram of an exemplary method of processing a polycrystalline diamond element according to at least one embodiment.

FIG. 46 illustrates an exemplary method 3200 for processing a polycrystalline diamond element according to at least one embodiment. As shown in FIG. 46, an electrode may be positioned near a polycrystalline diamond body such that a gap is defined between the electrode and the polycrystalline diamond body, the polycrystalline diamond body comprising a metallic material disposed in interstitial spaces defined within the polycrystalline diamond body (process 3202). In some embodiments, for example, an electrode assembly 40 may be positioned near a superabrasive element 10 comprising a superabrasive table 14 and a substrate 12 such that a gap G1 is defined between electrode surface 51 of electrode assembly 40 and superabrasive face 20 of superabrasive table 14 as illustrated in FIGS. 7 and 8.

A voltage may be applied between the electrode and the polycrystalline diamond body (process 3204). For example, as shown in FIGS. 7-9, a voltage and polarity may be applied to electrode assembly 40 through an electrical conductor 42, and to superabrasive element 10 through an electrical conductor 44. In at least one embodiment, electrical conductor 44 may be electrically connected to substrate 12 by being electrically connected to (e.g., positioned abutting) substrate 12. In some embodiments, electrical conductor 44 may be directly connected to superabrasive table 14 by being electrically connected to (e.g., positioned abutting) superabrasive table 14.

A processing solution may be passed or flowed through the gap defined between the electrode and the polycrystalline diamond body (process 3206). For example, as shown in FIGS. 8 and 9, fluid port 52 may be positioned and configured to discharge or draw processing fluid into gap G1 defined between electrode surface 51 of electrode assembly 40 and superabrasive face 20 of superabrasive table 14 such that the processing fluid passes or flows over at least a portion of superabrasive face 20, chamfer 24, and/or superabrasive side surface 22.

Figure 47:
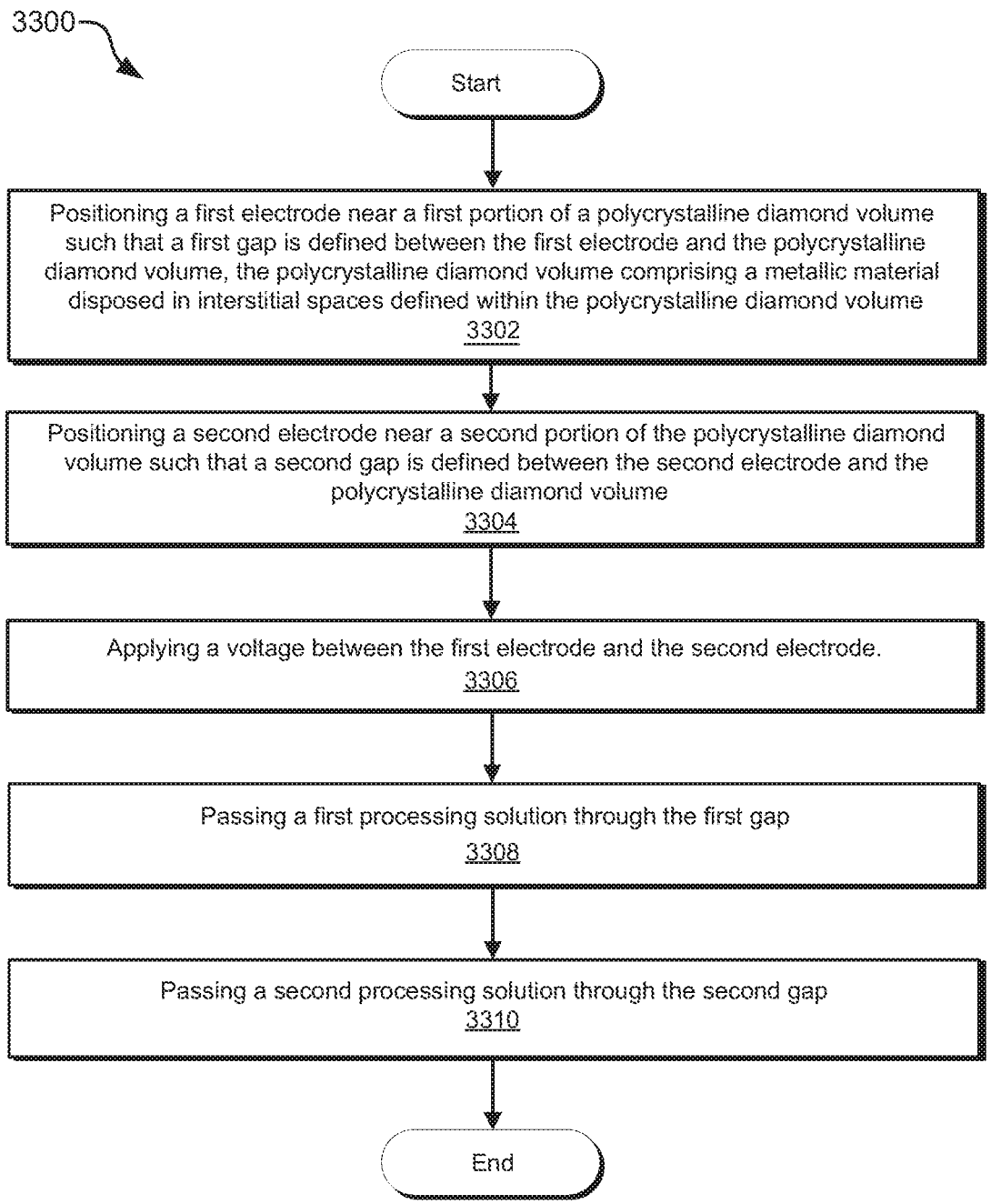
FIG. 47 is a flow diagram of an exemplary method of processing a polycrystalline diamond element according to at least one embodiment.

FIG. 47 illustrates an exemplary method 3300 for processing a polycrystalline diamond element according to at least one embodiment. As shown in FIG. 47, a first electrode may be positioned near a first portion of a polycrystalline diamond volume such that a first gap is defined between the first electrode and the polycrystalline diamond volume, the polycrystalline diamond volume comprising a metallic material disposed in interstitial spaces defined within the polycrystalline diamond volume (process 3302). For example, as illustrated in FIG. 11A, first electrode assembly 240 may be positioned near a superabrasive element 210 such that a first gap G1 is defined between electrode surface 251 of electrode assembly 240 and superabrasive face 220 of superabrasive element 210.

A second electrode may be positioned near a second portion of the polycrystalline diamond volume such that a second gap is defined between the second electrode and the polycrystalline diamond volume (process 3304). For example, a second electrode assembly 265 may be positioned near a superabrasive element 210 such that a second gap G2 is defined between electrode surface 211 of second electrode assembly 265 and rear surface 218 of superabrasive element 210, as shown in FIG. 11A.

A voltage may be applied between the first electrode and the second electrode (process 3306). For example, as shown in FIG. 11A, a negative charge, voltage, or potential may be applied to first electrode assembly 240 through an electrical conductor 242.

A first processing solution may be passed through the first gap (process 3308). For example, as shown in FIG. 11A, fluid port 252 may be positioned and configured to discharge or draw a first processing fluid into first gap G1 defined between electrode surface 251 of first electrode assembly 240 and superabrasive face 220 of superabrasive element 210 such that the first processing fluid passes over at least a portion of superabrasive face 220 and/or chamfer 224.

A second processing solution may be passed through the second gap (process 3310). For example, a second processing fluid may be discharged into second gap G2 defined between electrode surface 211 of second electrode assembly 265 and rear surface 218 of superabrasive element 210 such that the second processing fluid passes over at least a portion of rear surface 218 and/or rear chamfer 219, as illustrated in FIG. 11A.

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an." as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of processing a polycrystalline diamond body, the method comprising:
   positioning an electrode near a polycrystalline diamond body such that a gap is defined between the electrode and the polycrystalline diamond body, the polycrystalline diamond body comprising a metallic material disposed in interstitial spaces defined within the polycrystalline diamond body;
   applying a voltage between the electrode and the polycrystalline diamond body, wherein the electrode is a cathode and the polycrystalline diamond body is an anode;

pumping a processing solution to cause flow of the processing solution within an internal passage extending through the electrode and discharge of the processing solution from the internal passage toward the diamond body.

2. The method of claim 1, wherein the processing solution is in electrical communication with each of the electrode and the polycrystalline diamond body during the application of the voltage.

3. The method of claim 1, wherein the processing solution leaches the metallic material from interstitial spaces within at least a volume of the polycrystalline diamond body.

4. The method of claim 1, wherein the processing solution comprises am aqueous electrolyte solution having an electrolyte concentration between about 0.01M and about 3M.

5. The method of claim 1, wherein the processing solution comprises an electrolyte component selected from the group consisting of acetic acid, ammonium chloride, arsenic acid, ascorbic acid, carboxylic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and combinations thereof.

6. The method of claim 1, wherein the processing solution comprises at least one of an ion, a salt, and an ester of a component selected from the group consisting of acetic acid, ammonium chloride, arsenic acid, ascorbic acid, carboxylic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and combinations thereof.

7. The method of claim 1, wherein the electrode comprises a material selected from the group consisting of copper, tungsten carbide, cobalt, zinc, iron, platinum, palladium, niobium, graphite, graphene, nichrome, gold, silver, and combinations thereof.

8. The method of claim 1, wherein the processing solution comprises a metal salt.

9. The method of claim 1, further comprising the step of disposing a masking layer over a least a portion of the polycrystalline diamond body.

10. A method of processing a polycrystalline diamond body, the method comprising:
  positioning an electrode near a polycrystalline diamond body such that a gap is defined between the electrode and the polycrystalline diamond body, the polycrystalline diamond body comprising a metallic material disposed in interstitial spaces defined within the polycrystalline diamond body;
  applying a voltage between the electrode and the polycrystalline diamond body, wherein the electrode is a cathode and the polycrystalline diamond body is an anode;
  pumping a processing solution to cause flow of the processing solution into an internal passage extending through the electrode in a vertical direction toward the polycrystalline diamond body and discharge of the processing solution at an opposing end of the internal passage extending through the electrode and into and along the gap, the processing solution being discharged at a flow rate of between approximately 1 L/min and approximately 100 L/min.

11. The method of claim 10, wherein the processing solution is in electrical communication with each of the electrode and the polycrystalline diamond body during the application of the voltage.

12. The method of claim 10, wherein the processing solution leaches the metallic material from interstitial spaces within at least a volume of the polycrystalline diamond body.

13. The method of claim 10, wherein the electrode does not directly contact the polycrystalline diamond body.

14. The method of claim 10, wherein the processing solution comprises am aqueous electrolyte solution.

15. The method of claim 10, wherein the processing solution comprises an electrolyte component selected from the group consisting of acetic acid, ammonium chloride, arsenic acid, ascorbic acid, carboxylic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and combinations thereof.

16. The method of claim 10, wherein the processing solution comprises at least one of an ion, a salt, and an ester of a component selected from the group consisting of acetic acid, ammonium chloride, arsenic acid, ascorbic acid, carboxylic acid, citric acid, formic acid, hydrobromic acid, hydrofluoric acid, hydroiodic acid, lactic acid, malic acid, nitric acid, oxalic acid, phosphoric acid, propionic acid, pyruvic acid, succinic acid, tartaric acid, and combinations thereof.

17. The method of claim 10, wherein the processing solution comprises a metal salt.

18. The method of claim 10, further comprising the step of disposing a masking layer over a least a portion of the polycrystalline diamond body.

19. The method of claim 12, further comprising the step of generating a pressure of about 0.5 bar to about 20 bar of the processing solution.

20. A method of processing a polycrystalline diamond body, the method comprising:
  positioning an electrode near a polycrystalline diamond body such that a gap is defined between the electrode and the polycrystalline diamond body, the polycrystalline diamond body comprising a metallic material disposed in interstitial spaces defined within the polycrystalline diamond body;
  applying a voltage between the electrode and the polycrystalline diamond body, wherein the electrode is a cathode and the polycrystalline diamond body is an anode;
  pumping a processing solution to cause pressurized flow of the processing solution within an internal passage extending through the electrode and discharge of the processing solution, wherein the pumping comprises creating a pressure of about 0.5 bar to about 20 bar.

* * * * *